United States Patent
Murakami et al.

(10) Patent No.: US 6,847,591 B1
(45) Date of Patent: Jan. 25, 2005

(54) MAGNETIC HEAD DEVICE AND RECORDING REPRODUCING APPARATUS

(75) Inventors: Yutaka Murakami, Osaka (JP); Osamu Mizuno, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/673,919
(22) PCT Filed: Feb. 21, 2000
(86) PCT No.: PCT/JP00/00986
§ 371 (c)(1),
(2), (4) Date: Oct. 23, 2000
(87) PCT Pub. No.: WO00/51116
PCT Pub. Date: Aug. 31, 2000

(30) Foreign Application Priority Data

Feb. 25, 1999 (JP) .......................... 11-047410
Mar. 26, 1999 (JP) .......................... 11-083313
Dec. 17, 1999 (JP) .......................... 11-359724

(51) Int. Cl.$^7$ .......................... G11B 11/10; G11B 21/21
(52) U.S. Cl. .......................... 369/13.2; 360/245
(58) Field of Search .......................... 369/13.2, 13.21; 360/244.2, 244.9, 245, 245.3, 245.4, 245.5, 245.7

(56) References Cited

U.S. PATENT DOCUMENTS

| | | | |
|---|---|---|---|
| 3,349,384 A | 10/1967 | Kohn | |
| 4,189,759 A | 2/1980 | Bauck et al. | |
| 4,328,521 A | 5/1982 | Pexton et al. | |
| 4,343,025 A | 8/1982 | Kronfeld et al. | |
| 4,724,500 A | 2/1988 | Dalziel | |
| 5,126,903 A | 6/1992 | Matsuzaki | |
| 5,184,263 A | 2/1993 | Fukakusa et al. | |
| 5,367,419 A * | 11/1994 | Kazama | .................. 360/245.7 |
| 5,467,237 A | 11/1995 | Takahashi | |
| 5,590,095 A | 12/1996 | Chaya | .................. 369/13 |
| 5,604,719 A | 2/1997 | Kakimoto et al. | .................. 369/13 |
| 5,657,300 A | 8/1997 | Takahashi | |
| 5,663,937 A | 9/1997 | Takahashi | .................. 369/83 |
| 5,710,745 A | 1/1998 | Getreuer | |
| 5,910,867 A | 6/1999 | Takahashi | |
| 5,963,402 A | 10/1999 | Egawa et al. | |
| 6,084,747 A | 7/2000 | Takahashi | .................. 360/104 |
| 6,088,202 A * | 7/2000 | Kabasawa et al. | .................. 360/245.7 |
| 6,212,044 B1 * | 4/2001 | Murakami et al. | .................. 360/244.9 |
| 6,233,121 B1 * | 5/2001 | Pan | .................. 360/245.7 |
| 6,417,996 B1 * | 7/2002 | Budde | .................. 360/245.7 |

FOREIGN PATENT DOCUMENTS

| | | |
|---|---|---|
| EP | 544302 | 6/1993 |
| EP | 566998 | 10/1993 |

(List continued on next page.)

Primary Examiner—Brian E. Miller
(74) Attorney, Agent, or Firm—Merchant & Gould, P.C.

(57) ABSTRACT

A head main body (12) is supported at a free end of a cantilevered suspension (14). The head main body (12) has a first holding portion (5) that is substantially in parallel to an information recording medium (1), and the suspension (14) has a second holding portion (6) that is substantially in parallel to the information recording medium (1) and is located near the free end of the suspension (14). When a magnetic head device is not used, the head main body (12) is spaced away from the information recording medium (1). At this time, when an external shock is applied, the first holding portion (5) and the second holding portion (6) contact each other, thereby preventing a permanent deformation of the suspension (14). It is possible to reduce a displacement amount against a shock when the head main body (12) is spaced away from the information recording medium (1). Consequently, a spacing amount of the magnetic head main body (12) can be reduced. As a result, it becomes possible to make a thinner optomagnetic recording/reproducing apparatus.

9 Claims, 51 Drawing Sheets

FOREIGN PATENT DOCUMENTS

| | | |
|---|---|---|
| EP | 592219 | 4/1994 |
| EP | 714094 | 5/1996 |
| JP | 63-191384 | 8/1988 |
| JP | 63-244432 | 10/1988 |
| JP | 3-104003 | 5/1991 |
| JP | 4-31469 | 3/1992 |
| JP | 4-254904 | 9/1992 |
| JP | 5-128616 | 5/1993 |
| JP | 5-250750 | 9/1993 |
| JP | 5-314404 | 11/1993 |
| JP | 5-325293 | 12/1993 |
| JP | 6-60585 | 3/1994 |
| JP | 6-176429 | 6/1994 |
| JP | 7-129908 | 5/1995 |
| JP | 7-210915 | 8/1995 |
| JP | 9-245449 | 9/1997 |
| JP | 10-255205 | 9/1998 |
| JP | 10-261249 | 9/1998 |
| JP | 10-269503 | 10/1998 |
| JP | 10-269721 | 10/1998 |
| JP | 10-312502 | 11/1998 |
| JP | 2000-132803 | 5/2000 |

\* cited by examiner

MAGNETIC HEAD DEVICE AND RECORDING REPRODUCING APPARATUS

TECHNICAL FIELD

[The invention I]

The present invention I relates to a magnetic head device for applying a magnetic field to an information recording medium in a recording/reproducing apparatus for optomagnetic disks such as mini disks (referred to as "MD"s in the following) or optomagnetic data filing systems.

[The invention II]

The present invention II relates to a magnetic head device for applying a magnetic field to an information recording medium in a recording/reproducing apparatus for optomagnetic disks such as mini disks (referred to as "MD"s in the following) or optomagnetic data filing systems.

[The invention III]

The present invention III relates to a structure of a recording/reproducing apparatus for recording information on an information recording medium or reproducing information recorded thereon by interactions mainly with the information recording medium, more specifically effects such as optical, thermal and magnetic field effects. In particular, the present invention III relates to a structure for loading/unloading a converter for performing the interactions with the information recording medium (for example, a magnetic head main body).

BACKGROUND ART

[The invention I]

In a conventional optomagnetic recording/reproducing apparatus, an optical head device that emits a light beam for irradiating an optomagnetic recording layer opposes one side of an optomagnetic disk, which serves, as an information recording medium, that is rotated by a driving mechanism. A magnetic head device that applies an external magnetic field to the optomagnetic recording layer opposes the other side of the optomagnetic disk.

The optomagnetic recording/reproducing apparatus applies a magnetic field to the optomagnetic recording layer of the rotating optomagnetic disk by letting the magnetic head device modulate the direction of the magnetic field in accordance with the information signal to be recorded, while a light beam from the optical head device is focused and irradiated on the optomagnetic recording layer.

This light beam irradiation heats a portion of the optomagnetic recording layer to a temperature above the curie temperature, so that this portion loses its coercive force. After this portion has been magnetized in the direction of the magnetic field applied by the magnetic head device, the optomagnetic disk is moved by rotation relative to the light beam, so that this portion is cooled below the curie temperature and the magnetization direction is fixed. Thus, an information signal is recorded in the optomagnetic recording layer.

Since there is a possibility that the rotation causes surface vibration of the optomagnetic disk, an optomagnetic recording/reproducing apparatus provided with a sliding magnetic head device that records an information signal while sliding a magnetic head main body of the magnetic head device (hereinafter, simply referred to as a "head main body" in the invention I) is used, for example, for the MDs.

However, with respect to a resilient force that forces the head main body against the optomagnetic disk, a force is sufficient if it causes the head main body to glide on the optomagnetic disk with a constant sliding pressure and without separating too much from the main surface of the optomagnetic disk that is rotated. When the resilient force is too large, the sliding friction between the head main body and the optomagnetic disk increases, and may result in considerable wear of the head main body and the optomagnetic disk.

Therefore, a suspension for applying the resilient force to the head main body is formed as a plate spring of thin phosphor bronze, BeCu or SUS304 or the like, which do not have too much elasticity and mechanical strength. The head main body is supported on the side of the free end of such a cantilevered suspension.

When a shock is applied to the magnetic head device as described above, the load on the head main body can surpass the elastic limit of the suspension, so that the suspension is deformed easily. Accordingly, it becomes necessary to provide a stopper for restricting the displacement of the head main body so as not to surpass the elastic deformation limit of the suspension.

JP 6-60585 A suggests an example of such a magnetic head device having the stopper.

The following is a description of the conventional magnetic head device, with reference to FIGS. 23 to 27.

FIG. 23 is a plan view of an example of the conventional magnetic head device. FIG. 24 is a side view of the magnetic head device shown in FIG. 23 in use. FIG. 25 is a side view of the magnetic head device shown in FIG. 23 not in use. FIG. 26 is a perspective view of a head main body of the magnetic head device shown in FIG. 23. FIG. 27 is an exploded perspective view of the head main body of the magnetic head device shown in FIG. 23.

The conventional magnetic head device includes a head main body 12, a suspension 14 formed as a thin plate spring for pressing a sliding portion 13 of the head main body 12 against the surface of an optomagnetic disk 1, and a fastening member 15 to which one end of the suspension 14 is attached. The head main body 12 is attached to a gimbal 16 on the side of the free end of the suspension 14, while the other end of the suspension 14 is attached to the fastening member 15.

The head main body 12 is formed as shown in FIGS. 26 and 27. That is, a bobbin 19 around which a coil 18 is wound is fixed to a central magnetic pole core 17a of an E-shaped ferrite magnetic pole core 17 including the central magnetic pole core 17a and side magnetic pole cores 17b so as to form a magnetic head element 20. This magnetic head element 20 is attached integrally to one side of the sliding portion 13 that glides directly in contact over the optomagnetic disk 1 and is included in a slider 21 made of resin with excellent sliding characteristics, for example, polyphenylene sulfide or liquid crystal polymer, thereby forming the head main body 12.

A holding portion 27 having a height h for positional stabilization is disposed on the upper surface of the slider 21.

The suspension 14 is formed with a thin plate made of a material such as SUS304 or BeCu. The suspension 14 has an attaching portion 31 to be attached to the fastening member 15, a first elastic portion 32 that is extended from the attaching portion 31 and provided for following surface vibration of the optomagnetic disk 1 and applying an entire load, an intermediary portion 33 that is extended from the first elastic portion 32 with being inclined at a predetermined angle so as not to interfere with a cartridge 2 and formed to be a rigid body by being provided with ribs 37 bent at a right angle on both sides in the width direction, a second elastic portion 34 that is extended from the intermediary portion 33 and provided for following the surface shape of the optomagnetic disk 1, and the gimbal 16 that is disposed at the free end of the second elastic portion 34. The suspension 14 is configured by forming these in one piece.

The fastening member 15 is made of a metal plate of such as iron or SUS. The fastening member 15 has a supporting portion 43 for fastening the attaching portion 31 of the suspension 14, an arm portion 45 that is extended like an arm from one side of the supporting portion 43, and a stopper portion 47 that is provided at the front end of the arm portion 45 by being bent at a right angle so as to oppose the supporting portion 43. The fastening member 15 is configured by forming these in one piece.

When the magnetic head device is used (in recording), namely, in the condition that the sliding portion 13 is gliding in contact over the optomagnetic disk 1 as shown in FIG. 24, the head main body 12 moves freely in the vertical direction according to the surface vibration of the optomagnetic disk 1. Since the distance h between the upper surface of the head main body 12 and the holding portion 27 that is bent at a right angle is at least a surface vibration tolerance of the optomagnetic disk 1, the head main body 12 can follow the surface vibration of the optomagnetic disk 1 sufficiently. The distance h needs to be about 1 mm in MDs, for example.

When the magnetic head device is not used (in reproducing), as shown in FIG. 25, it is necessary to consider preventing the sliding portion 13 from not only contacting the optomagnetic disk 1 but also interfering with a cartridge used exclusively for reproducing that is not provided with a hole 2a which the head main body 12 goes into. Accordingly, in order to prevent the sliding portion 13 from contacting the cartridge 2, a lifter, which is not shown in the figure, contacts the portion indicated by an arrow 51, so that the fastening member 15 is rotated around a rotating joint, which is not shown in the figure, and lifted away from the optomagnetic disk 1 (in the direction Z). The stroke is about 3 mm. The holding portion 27 contacts the stopper portion 47 here, thereby preventing the head main body 12 from hanging down.

However, in the structure of the conventional magnetic head device described above, when the front end of the arm portion 45 is lifted, the lifted stroke of the arm portion 45 needs to be a distance necessary for letting the sliding portion 13 get out of the hole 2a of the cartridge 2 completely. In other words, it is necessary for the arm portion 45 to be lifted by at least the sum of the distance between the surface of the optomagnetic disk 1 and the upper surface of the cartridge 2 and the gap between the upper surface of the stopper portion 47 and the holding portion 27 in recording (the condition shown in FIG. 24) (that is, about half of h). Consequently, there has been a problem in that the optomagnetic recording/reproducing apparatus cannot be made thinner.

[The invention II]

In a conventional optomagnetic recording/reproducing apparatus, an optical head device that emits a light beam for irradiating an optomagnetic recording layer opposes one side of an optomagnetic disk, which serves as an information recording medium that is rotated by a driving mechanism. A magnetic head device that applies an external magnetic field to the optomagnetic recording layer opposes the other side of the optomagnetic disk.

The optomagnetic recording/reproducing apparatus applies a magnetic field to the optomagnetic recording layer of the rotating optomagnetic disk by letting the magnetic head device modulate the direction of the magnetic field in accordance with the information signal to be recorded, while a light beam from the optical head device is focused and irradiated on the optomagnetic recording layer.

This light beam irradiation heats a portion of the optomagnetic recording layer to a temperature above the curie temperature, so that this portion loses its coercive force. After this portion has been magnetized in the direction of the magnetic field applied by the magnetic head device, the optomagnetic disk is moved by rotation relative to the light beam, so that this portion is cooled below the curie temperature and the magnetization direction is fixed. Thus, an information signal is recorded in the optomagnetic recording layer.

Since there is a possibility that the rotation causes surface vibration of the optomagnetic disk, an optomagnetic recording/reproducing apparatus provided with a sliding magnetic head device that records an information signal while sliding a head main body of the magnetic head device (hereinafter, simply referred to as a "head main body" in the invention II) is used, for example, for the MDs.

The following is a description of the conventional magnetic head device, with reference to FIGS. 42 to 45.

FIG. 42 is a plan view of an example of the conventional magnetic head device. FIG. 43 is a side view of the magnetic head device shown in FIG. 42 in use. FIG. 44 is a side view of the magnetic head device shown in FIG. 42 not in use. FIG. 45 is a sectional side view of a head main body of the magnetic head device shown in FIG. 42.

The conventional magnetic head device includes a head main body 12, a suspension 14 formed as a thin plate spring for pressing a sliding portion 13 of the head main body 12 against the surface of an optomagnetic disk 1, and a fastening member 15 to which one end of the suspension 14 is attached. A joining portion 22 of the sliding portion 21 of the head main body 12 is joined with a gimbal 16 on the side of the free end of the suspension 14 by gluing or welding, while the other end of the suspension 14 is attached to the fastening member 15.

The head main body 12 is formed as in FIG. 45. That is, a wound coil 18 is fixed to a central magnetic pole core 17a of an E-shaped ferrite magnetic pole core 17 including the central magnetic pole core 17a and side maignetic pole cores 17b so as to form a magnetic head element 20. This magnetic head element 20 is attached integrally to one side of the sliding portion 13 that glides directly in contact over the optomagnetic disk 1 and is included, in a slider 21 made of resin with excellent sliding characteristics, for example, polyphenylene sulfide or liquid crystal polymer, thereby forming the head main body 12.

The suspension 14 is formed with a thin plate made of such as SUS304 or BeCu. The suspension 14 has an attaching portion 31 to be attached to the fastening member 15, a first elastic portion 32 that is extended from the attaching portion 31 and provided for following surface vibration of the optomagnetic disk 1 and applying an entire load, an intermediary portion 33 that is extended from the first elastic portion 32 with being inclined at a predetermined angle so as not to interfere with a cartridge 2 and formed to be a rigid body by being provided with draw ribs 137 formed on both sides in the width direction by draw forming, a second elastic portion 34 that is extended from the intermediary portion 33 and provided for following the surface shape of the optomagnetic disk 1, and the gimbal 16 that is disposed at the free end of the second elastic portion 34. The suspension 14 is configured by forming these in one piece.

Numeral 30 denotes a flexible printed board. One end thereof is adhered to the head main body 12, while the other end is adhered to the attaching portion 31 of the suspension 14. One end of the flexible printed board 30 is soldered to both ends of a lead wire of the coil 18, while the other end is connected to a driving circuit of the magnetic head device, which is not shown in the figure.

The fastening member 15 is made of a metal plate of such as iron or SUS. The fastening member 15 has a supporting portion 43 for fastening the attaching portion 31 of the suspension 14, an arm portion 45 that is extended like an arm from one side of the supporting portion 43, and a stopper portion 47 that is provided at the front end of the arm portion 45 by being bent at a right angle so as to oppose the supporting portion 43. The fastening member 15 is configured by forming these in one piece.

When the magnetic head device is used (in recording), namely, in the condition that the sliding portion 13 is gliding in contact over the optomagnetic disk 1 as shown in FIG. 43, the sliding portion 13 follows the surface vibration and change in the surface shape of the optomagnetic disk 1 so as to glide in contact thereover constantly, by means of the first elastic portion 32, the second elastic portion 34 and the gimbal 16 (see FIG. 45).

When the magnetic head device is not used (in reproducing), as shown in FIG. 44, it is necessary to consider preventing the sliding portion 13 from not only contacting the optomagnetic disk 1 but also interfering with a cartridge used exclusively for reproducing that is not provided with a hole 2a into which the head main body 12 goes. Accordingly, a lifter 101 lifts the intermediary portion 33, so that the head main body 12 is spaced away from the cartridge 2 by a gap H2, thereby preventing the sliding portion 13 from contacting the cartridge 2. The upper surface of the head main body 12 is in contact with the stopper portion 47 here, thus preventing the head main body 12 from protruding upward.

Accompanying the recent popularization of small-size portable appliances, thinner and thinner devices have been developed. However, in the structure of the conventional magnetic head device described above, a part of the intermediary portion 33 protruded upward beyond the arm portion 45 when the magnetic head device is not used. Accordingly, the thickness H3 of the magnetic head device not in use (see FIG. 44) was larger than the thickness H1 of the magnetic head device in use (see FIG. 43). Consequently, there had been a problem in that the optomagnetic recording/reproducing apparatus cannot be made thinner.

[The invention III]

One example of conventional recording/reproducing apparatus is mini disks (referred to as "MD"s in the following). A prerequisite for MDs is the use of a sliding magnetic head main body (a slider) for optomagnetic. overwriting using a modulated magnetic field.

There are a recording disk and a reproducing disk in MDs, and each of them is contained in a predetermined cartridge. Since the cartridge for containing the reproducing disk does not have an access hole for the magnetic head main body of the magnetic head device, it is necessary that the apparatus be operated while the magnetic head main body is in an unloading state. Also, in portable recording appliances, even when the recording disk is used, the magnetic head main body is usually in the unloading state in reproducing, in order to reduce the friction work of the sliding magnetic head main body.

The following is a description of the loading/unloading forms of the magnetic head device for MDs in particular, as the conventional recording/reproducing apparatus.

FIG. 50(a) is a plan view showing the entire structure of the conventional magnetic head device for MDs, and FIG. 50(b) is a sectional view showing a main portion of the conventional recording/reproducing apparatus for MDs when the recording disk is installed. A rectangular coordinate system is defined in the directions shown in the figure. For convenience, the positive side of the z-axis is called the upper side, the opposite side thereof is called the lower side, and the length in the direction parallel to the z-axis is called height.

A recording disk 301 serving as an information recording medium having an optomagnetic recording film is contained in a recording cartridge 302. An access hole 302a for an optical head for recording/reproducing is provided on the lower side of the recording cartridge 302, while an access hole 302b for the magnetic head is provided on the upper side thereof, so that both converters can interact with the recording disk 301 through these access holes.

A magnetic head main body 351 has a magnetic head element including a magnetic core and a coil therein (not shown in the figure), and slides on the upper surface of the recording disk 301 in the loading state.

A suspension 352 as a suspension system is formed by connecting a second elastic portion 352a including a gimbal, an intermediary portion 352b, a first elastic portion 352c and an attaching portion 352d in this order. It is preferable that a spring material such as stainless material or phosphor bronze is used as their material.

The magnetic head main body 351 is connected to the gimbal of the second elastic portion 352a. An elastic deformation of the second elastic portion 352a gives the degree of free rotatability around the x-axis and y-axis to the magnetic head main body 351. The intermediary portion 352b can be regarded substantially as a rigid body because a cross-sectional rigidity has been improved by bending. An elastic restoring force of the first elastic portion 352c presses the magnetic head main body 351 substantially only in the negative direction of the z-axis.

A fastening member 353 as a suspension system supporting member has an arm portion that is extended in the x-axis direction, and the attaching portion 352d of the suspension 352 is connected to the root of the arm portion. The fastening member 353 usually is configured with a stainless plate or the like. A stopper portion 353a is formed at the front end of the arm portion. The stopper portion 353a restricts the range that the suspension 352 is deformed by an inertial force of a shock caused by such as a dropping of the recording/reproducing apparatus, thereby preventing a plastic deformation of the suspension 352.

The magnetic head device and an optical head device (not shown in the figure) for the MD are joined with each other by an angle member 354. A shaft 355 connects the angle member 354 and the fastening member 353 in such a manner that the fastening member 353 can rotate freely around the y-axis.

A coil spring 356 is attached to the shaft 355. The coil spring 356 gives the fastening member 353 a rotating force in the direction of an arrow R around the shaft 355 and a pressing force in the negative direction of the y-axis. A fastening member backing portion 354a is fastened to the angle member 354. The fastening member backing portion 354a contacts a protruding portion 353b of the fastening member 353 that is subjected to the rotating force given by the coil spring 356, and restricts the rotation of the fastening member 353.

The angle member 354 is joined with the optical head device, which is not shown in the figure, in its lower part. When the optical head device moves in the y-axis direction, which is the radial direction of the recording disk 301, the magnetic head main body 351 is linked with the optical head device so as to move to a certain position in the radial direction of the recording disk 301.

A substantially plate-like lifter 357 is disposed so as to rotate freely around a rotating pin 358. FIG. 50(b) shows the loading state, and when rotating the lifter 357 clockwise around the rotating pin 358, a cylindrical contacting portion 357a that is formed at the front end of the lifter 357 lifts upward the intermediary portion 352b while contacting its lower surface. This spaces the magnetic head main body 351 away from the recording disk 301, that is, creates the unloading state. The lifter 357 is fastened to a so-called cartridge holder (not shown in the figure) or the like that holds the recording cartridge 302 in a freely rotatable manner via the rotating pin 358, and driven rotatably by a driving means or the like, which is not shown in the figure.

The elements described above are installed in an outer case 359 of the recording/reproducing apparatus. Metal such as aluminum or magnesium usually is used as the material of the outer case 359 so as to make the outer case 359 thinner.

When a modulation current is passed through the coil installed in the magnetic head main body 351 in the state of FIG. 50(b) (the loading state), a modulated magnetic field is applied to the recording disk 301. While rotating the recording disk 301, a laser beam heats the recording film of the recording disk 301 through the access hole 302a for the optical head, and then the modulated magnetic field is recorded thereon.

The magnetic head main body 351 is pressed against and slides on the recording disk 301 by the elastic restoring force of the first elastic portion 352c of the suspension 352. Thus, even when the recording disk 301 is displaced in the z-axis direction because of the surface vibration, the magnetic head main body 351 maintains its sliding state on the recording disk 301 owing to the elastic deformation of the first elastic portion 352c.

In addition, when the surface of the recording disk 301 becomes inclined, the second elastic portion 352a functions so that the magnetic head main body 351 inclines so as to follow the surface of the recording disk 301.

FIG. 51(a) is a sectional view showing a main portion of the conventional recording/reproducing apparatus for MDs when a reproducing cartridge 304 is installed. A premastered reproducing disk 303 is contained in the reproducing cartridge 304, and a so-called label that shows contents of a contained information is affixed onto the upper surface of the reproducing cartridge 304. An access hole 304a for the optical head is provided in the lower side of the reproducing cartridge 304, while no access hole for the, magnetic head is provided. Thus, the magnetic head main body 351 is in the unloading state by a function of the lifter 357.

The lifter 357 lifts the intermediary portion 352b with its contacting portion 357a so that the first elastic portion 352c is deformed elastically. Thus, the magnetic head main body 351 is lifted via the second elastic portion 352a, thereby unload the magnetic head main body 351. At the same time, the lifter 357 lifts the fastening member 353 with the contacting portion 357a against the rotating force of the coil spring 356, thereby spacing the protruding portion 353b away from the fastening member backing portion 354a.

The fastening member 353 is now being spaced away from the inner surface of the outer case 359 by a distance h1, and the magnetic head main body 351 is being spaced away from the reproducing cartridge 304 by a distance h2. These values of distances h1 and h2 are determined by considering errors and vibration amplitudes of all elements, and set so as not to be zero basically, that is, so that the members above do not contact each other.

A recording/reproducing apparatus with the configuration described above is disclosed by, for example, JP 5-128616 A.

When the fastening member 353 contacts the outer case 359, large friction and noise are generated because both of them are usually metal. This hinders the optical head device and the magnetic head device from moving in the y-axis direction in terms of an electric power and grade. Also, when the magnetic head main body 351 glides in contact over the reproducing cartridge 304, traces of slide and wear are left on a label surface, thereby deteriorating the grade.

However, the conventional recording/reproducing apparatus described above had the following problems.

When considering the development of small-size devices, the values of distances h1 and h2 mentioned above are desired to be as small as possible because they affect the thickness of the recording/reproducing apparatus directly. However, the conventional structure described above cannot reduce the values of distances h1 and h2 because of the large variation of the fastening member 353 and the magnetic head main body 351 in the z-axis direction.

In other words, since the arm tip of the fastening member 353 and the magnetic head main body 351 are located in the farthest position from the shaft 355 serving as a rotating axis, so-called the front end, such position amplifies the mechanical error near the rotating axis. Many factors such as a rotating angle of the lifter 357 in the unloading position, a relative position of the contacting portion 357a at the front end of the lifter 357 to the shaft 355, an error of an deflection curve of the suspension 352 and an error of the angle member 354 are accumulated and also amplified.

As a result, positions of the fastening member 353 and the magnetic head main body 351 in the unloading state vary in the z-axis direction depending on particular appliances, as shown in a double-dashed line in the FIG. 51(b). Thus, it was difficult to reduce the value of the distances h1 and h2 because of its design, resulting in the larger apparatus. In fact, the designed values of the distances h1 and h2 are both about 1 to 1.5 mm. In addition, thinner apparatus were produced by means of improving the mechanical accuracy, leading to a cost increase.

DISCLOSURE OF INVENTION

[The invention I]

It is an object of the present invention I to solve these problems of the prior art and to provide a magnetic head device that maintains a structure with excellent shock resistance and achieves a thinner optomagnetic recording/reproducing apparatus.

In order to achieve the above-described object, the present invention I has the following structure.

That is, a magnetic head device of the present invention I includes a suspension that is cantilevered and provided with an elastic portion, and a head main body that glides in contact over or floats keeping a substantially constant distance from an information recording medium, and is supported at a free end of the suspension. A first holding portion protruding substantially in parallel to a recording surface of the information recording medium is provided on the head main body, a second holding portion protruding substantially in parallel to the recording surface of the information recording medium is provided near the free end of the suspension, and the first holding portion and the second holding portion are able to contact each other when the head main body is displaced in at least one direction because of an elastic deformation of the suspension.

With the above structure, by providing the first holding portion to the head main body and the second holding portion to the suspension, it is possible to reduce the gap between the first and the second holding portions. Since this reduces the displacement amount of the head main body due to external shock when the magnetic head device is not used, it is possible to reduce the lifting amount when the magnetic head device is not used, thereby achieving a thinner optomagnetic recording/reproducing apparatus.

In the above structure, it is preferable that the second holding portion is provided closer to the information recording medium than the first holding portion is. With this preferable structure, even when a shock giving a downward inertial force is applied to the magnetic head device not in use, the first and the second holding portions contact each other, thus preventing a permanent deformation of the elastic suspension portion.

Also, in the above structure, it is preferable that a plurality of ones of the first holding portion and the second holding portion are placed sequentially in a direction substantially perpendicular to the recording surface of the information recording medium, and the other is placed therebetween. This preferable structure can improve the shock resistance characteristics in the direction parallel to the recording surface of the information recording medium.

Also, in the above structure, it is preferable that the first holding portion and the second holding portion both have a flat plate shape. With this preferable structure, the first and the second holding portions can contact each other more reliably when the head main body is displaced. Also, it is possible to form or attach the holding portions easily.

Also, in the above structure, it is preferable that one of the first holding portion and the second holding portion has a convex portion, the other has a through hole, and the convex portion is inserted in the through hole when the head main body is displaced in at least one direction. With this preferable structure, when a shock is applied, the convex portion is inserted in the through hole so that both holding portions are engaged, thereby preventing the first holding portion from getting over the second holding portion. In this manner, still better shock resistance characteristics can be obtained.

Also, in the above structure, it is preferable that one of the first holding portion and the second holding portion has a through hole, the other has a first convex portion that passes through the through hole with clearance and a second convex portion that is formed at a front end of the first convex portion, and the second convex portion contacts the one holding portion when the head main body is displaced in at least one direction. With this preferable structure, the first convex portion constantly is inserted in the through hole, thereby achieving still better shock resistance characteristics.

Also, in the above structure, it is preferable that the second holding portion is made of a same material as the suspension and formed integrally with the suspension. With this preferable structure, a number of components and steps can be reduced, leading to lower costs.

Also, in the above structure, it is preferable that the suspension includes a first elastic portion that is supported by a fastened end, an intermediary portion that is supported by the first elastic portion and has a rigid body portion made of resin, and a second elastic portion that is supported by the intermediary portion. The second holding portion and the rigid body portion are formed in one piece by molding resin. With this preferable structure, it is possible to give rigidity to the intermediary portion without machining, thereby improving a bending accuracy of the suspension. Accordingly, it is possible to reduce variation of pressing load of the head against the information recording medium. In this manner, the pressing load of the head can be designed to be small, thus reducing load to the, spindle motor, cutting the power consumption of the optomagnetic recording/reproducing apparatus.

Also, in the above structure, the second holding portion may be made of resin and integrated with the suspension. With this structure, forming efficiency and accuracy of the second holding portion can be improved.

Also, in the above structure, it is preferable that the first holding portion and the magnetic head main body are formed in one piece. With this preferable structure, a number of components and steps can be reduced, lowering cost.

[The invention III]

It is an object of the present invention II to solve these problems of the prior art and to provide a magnetic head device that achieves a thinner optomagnetic recording/reproducing apparatus.

In order to achieve the above-described object, the present invention II has the following structure.

That is, a magnetic head device of a first structure of the present invention II includes a fastening member having a cantilevered arm portion, a head main body for applying a magnetic field to an information recording medium, and a suspension that is cantilevered by the fastening member, provided with a supporting portion for connecting and supporting the head main body on a side of a free end and has an elastic portion. The arm portion includes a contacting portion, and the contacting portion contacts the elastic portion so that the elastic portion is deformed elastically when the head main body is located away from the information recording medium.

Also, a magnetic head device of a second structure of the present invention II includes a fastening member having a cantilevered arm portion, a head main body for applying a magnetic field to an information recording medium, and a suspension that is cantilevered by the fastening member, provided with a supporting portion for connecting and supporting the head main body on a side of a free end and has a first elastic portion on a side of a fastened end and a second elastic portion on a side of the free end. The arm portion includes a first contacting portion, and the first contacting portion contacts the first elastic portion so that the first elastic portion is deformed elastically when the head main body is located away from the information recording medium.

With the above structures, since (the first) elastic portion is deformed elastically by means of (the first) contacting portion, the center of rotation at the time of lifting the head main body is moved from the fastened end of (the first) elastic portion to the contacting portion with (the first) contacting portion. This makes the intermediary portion angled nearly horizontally when the head main body is lifted by a predetermined amount, thereby reducing the distance that the intermediary portion extends in the direction perpendicular to the recording surface of the information recording medium when the magnetic head device is not used. Accordingly, when the magnetic head device is not used, the intermediary portion does not protrude beyond the arm portion on the side opposite to the information recording medium. As a result, the height of the magnetic head device can be reduced, thereby making a thinner optomagnetic recording/reproducing apparatus.

In the above second structure, it is preferable that the arm portion further includes a second contacting portion, and the second contacting portion contacts the second elastic portion or the head main body so that the second elastic portion is deformed elastically when the head main body is located away from the information recording medium. With this preferable structure, when the head main body is located away from the information recording medium, the head main body can be made substantially parallel to the recording surface of the information recording medium. Thus, it is possible to further reduce the height of the magnetic head device not in use, achieving a still thinner optomagnetic recording/reproducing apparatus.

Also, in the above structure, it is preferable that the second contacting portion contacts the second elastic portion or the head main body on the side of the free end of the suspension with respect to the supporting portion when the head main body is located away from the information recording medium. With this preferable structure, when the head main body is located away from the information recording medium, the head main body can be made substantially parallel to the recording surface of the information recording medium in a more reliable manner.

Also, in the above structure, it is preferable that the head main body does not protrude beyond the fastening member on an opposite side of the information recording medium when the head main body is located away from the information recording medium. With this preferable structure, a still thinner magnetic head device can be achieved. This can be achieved, for example, in the following manner. When the head main body is located away from the information recording medium, it is preferable that the part of the head main body that is located farthest from the information recording medium and the part of the second elastic portion or the head main body that contacts the second contacting portion have a difference in level, and the difference in level substantially equals the distance in the perpendicular direction from the part of the second contacting portion that contacts the second elastic portion or the head main body to the part of the fastening member that is located farthest from the information recording medium.

Also, in the above structure, it is preferable that the arm portion further includes a third contacting portion, and the third contacting portion contacts the head main body on the side of the fastened end of the suspension with respect to the supporting portion when the head main body is located away from the information recording medium. With this preferable structure, when a shock is applied, the behavior of the head main body away from the information recording medium can be prevented, thereby improving shock resistance characteristics.

Also, in the above structure, it is preferable that the head main body includes a magnetic pole core, and a surface of the magnetic pole core opposing a recording surface of the information recording medium is substantially parallel to the recording surface when the head main body is located away from the information recording medium. In other words, it is preferable that, when the head main body is located away from the information recording medium, the head main body is in parallel to the recording surface of the information recording medium, or the length that the head main body extends in the direction perpendicular to the recording surface (height) is the smallest. With this preferable structure, a still thinner magnetic head device can be achieved.

[The invention III]

It is an object of the present invention III to solve these problems of the prior art and to provide a recording/reproducing apparatus that can achieve a thinner apparatus with easy and low-cost means.

In order to achieve the above-described object, the present invention III has the following structure.

A recording/reproducing apparatus in accordance with the first structure of the present invention III includes a converter for recording information on and/or reproducing information from an information recording medium, a suspension system for keeping the converter at a desired distance and orientation with respect to the information recording medium, a suspension system supporting member for supporting the suspension system, and a fixed structure that is not displaced substantially with respect to an outer case. The fixed structure is arranged substantially in opposition to the information recording medium, and at least a part of the suspension system supporting member is arranged between the fixed structure and the information recording medium. The part of the suspension system supporting member contacts the fixed structure when the converter is spaced away from the information recording medium.

Also, a recording/reproducing apparatus in accordance with the second structure of the present invention III includes a converter for recording information on and/or reproducing information from an information recording medium, a suspension system for keeping the converter at a desired distance and orientation with respect to the information recording medium, and a suspension system supporting member for supporting the suspension system. A plurality of contacting regions are formed integrally with the converter so as to be substantially rigid. The contacting regions of the converter contact the suspension system supporting member when the converter is spaced away from the information recording medium.

Also, a recording/reproducing apparatus in accordance with the third structure of the present invention III includes a converter for recording information on and/or reproducing information from an information recording medium, a suspension system for keeping the converter at a desired distance and orientation with respect to the information recording medium, a suspension system supporting member for supporting the suspension system, and a fixed structure that is not displaced substantially with respect to an outer case. The fixed structure is arranged substantially in opposition to the information recording medium, and at least a part of the suspension system supporting member is arranged between the fixed structure and the information recording medium. A plurality of contacting regions are formed integrally with the converter so as to be substantially rigid. The part of the suspension system supporting member contacts the fixed structure and, the contacting regions of the converter contact the suspension system supporting member when the converter is spaced away from the information recording medium.

With the first to the third structures described above, it is possible to provide a recording/reproducing apparatus having excellent effects as follows. Clearance that was conventionally necessary for preventing a contact can be reduced, thus achieving a thinner and smaller recording/reproducing apparatus. At the same time, since high accuracy mechanism is not necessary, it is possible to achieve lower cost.

BEST MODE FOR CARRYING OUT THE INVENTION

[The invention I]

The following is a description of embodiments of the present invention I, with reference to accompanying drawings.

(Embodiment I-1)

Figure 1:
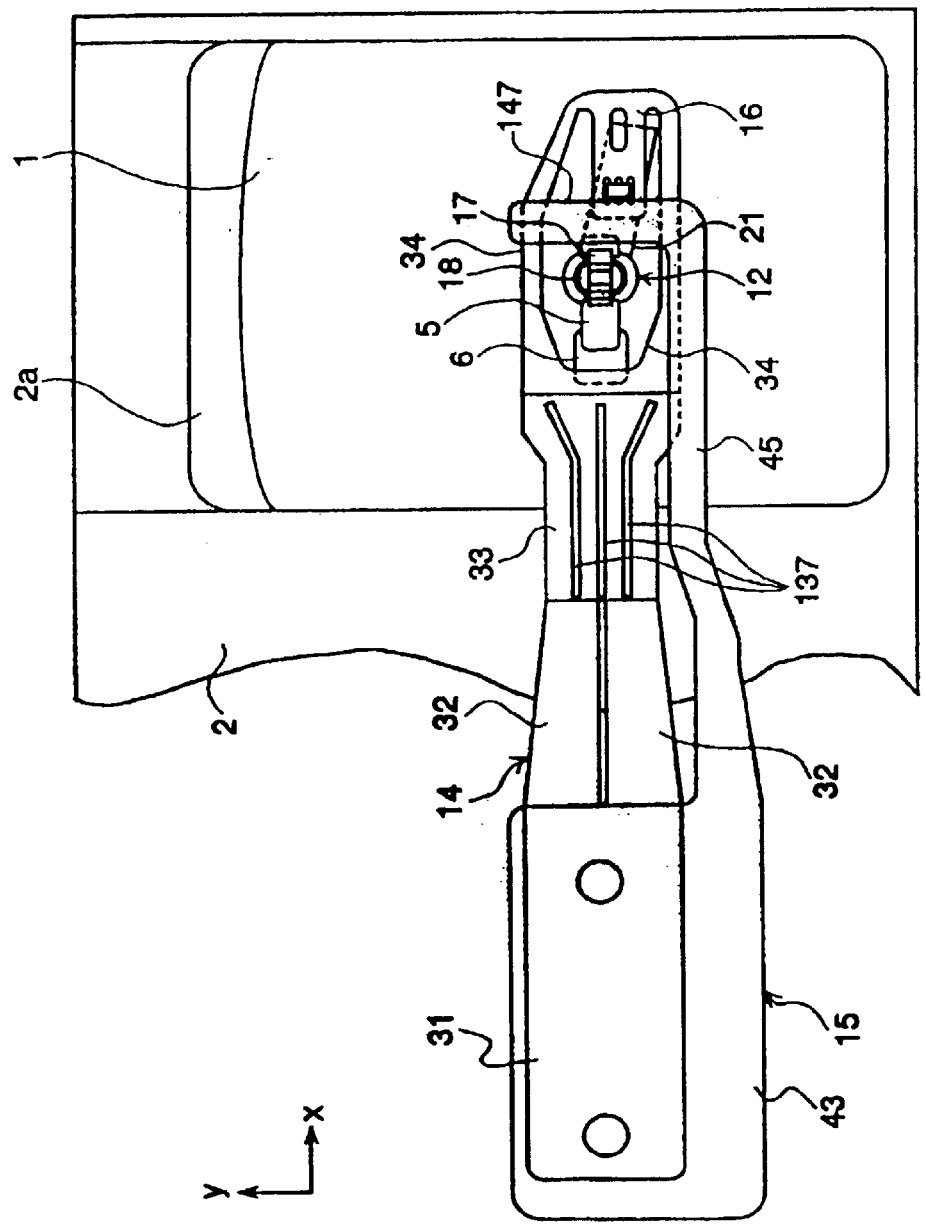
FIG. 1 is a plan view of a magnetic head device of an embodiment I-1 of the present invention I.
Figure 2:
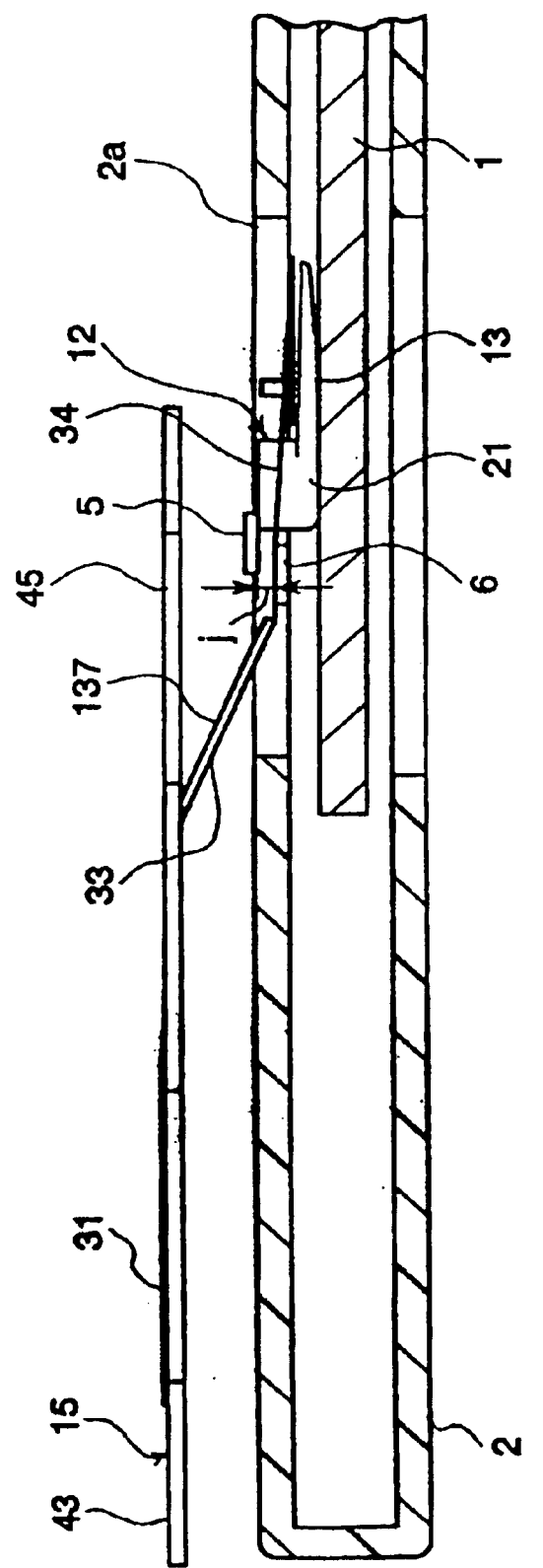
FIG. 2 is a side view of the magnetic head device of the embodiment I-1 of the present invention I.
Figure 3:
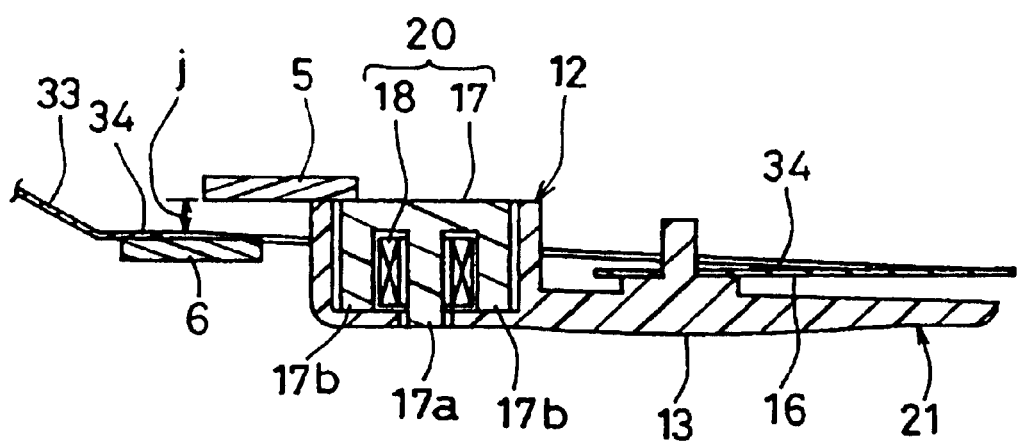
FIG. 3 is a sectional side view of a main portion of a head main body of the magnetic head device of the embodiment I-1 of the present invention I.
Figure 4:
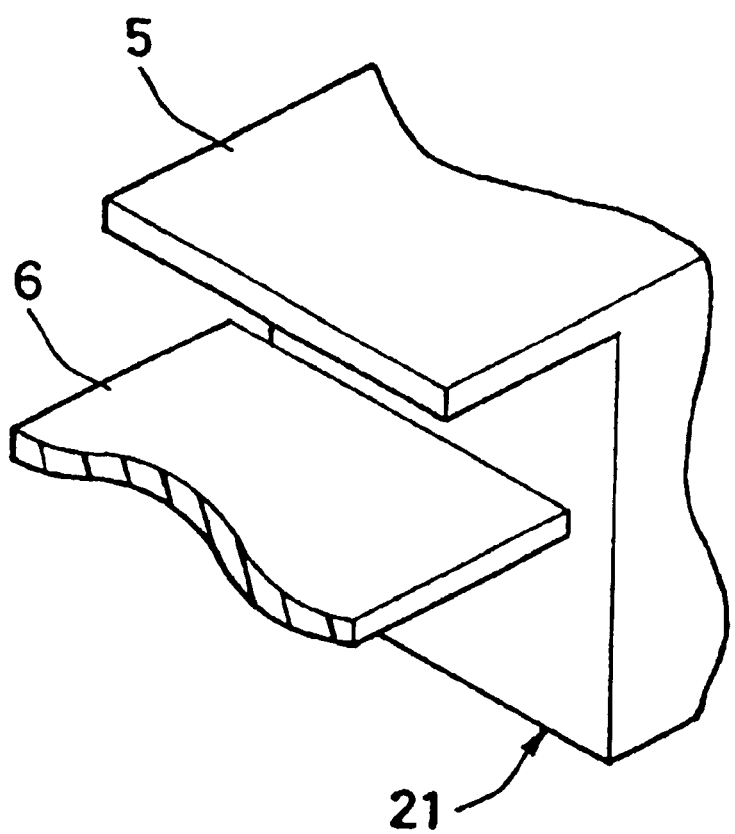
FIG. 4 is an enlarged perspective view of a first holding portion and a second holding portion of the magnetic head device of the embodiment I-1 of the present invention I.
Figure 5:
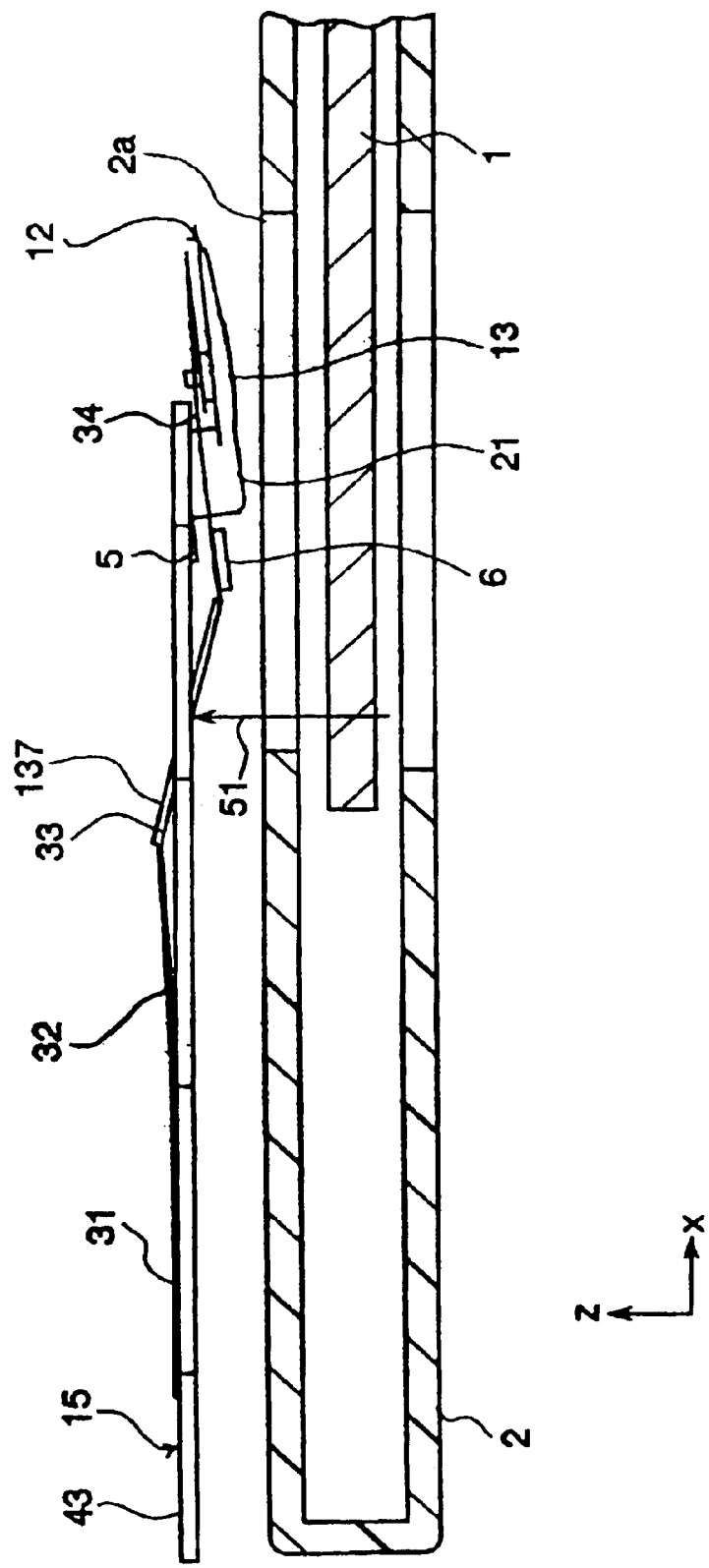
FIG. 5 is a side view showing a state of the magnetic head device of the embodiment I-1 of the present invention I not in use.
Figure 6:
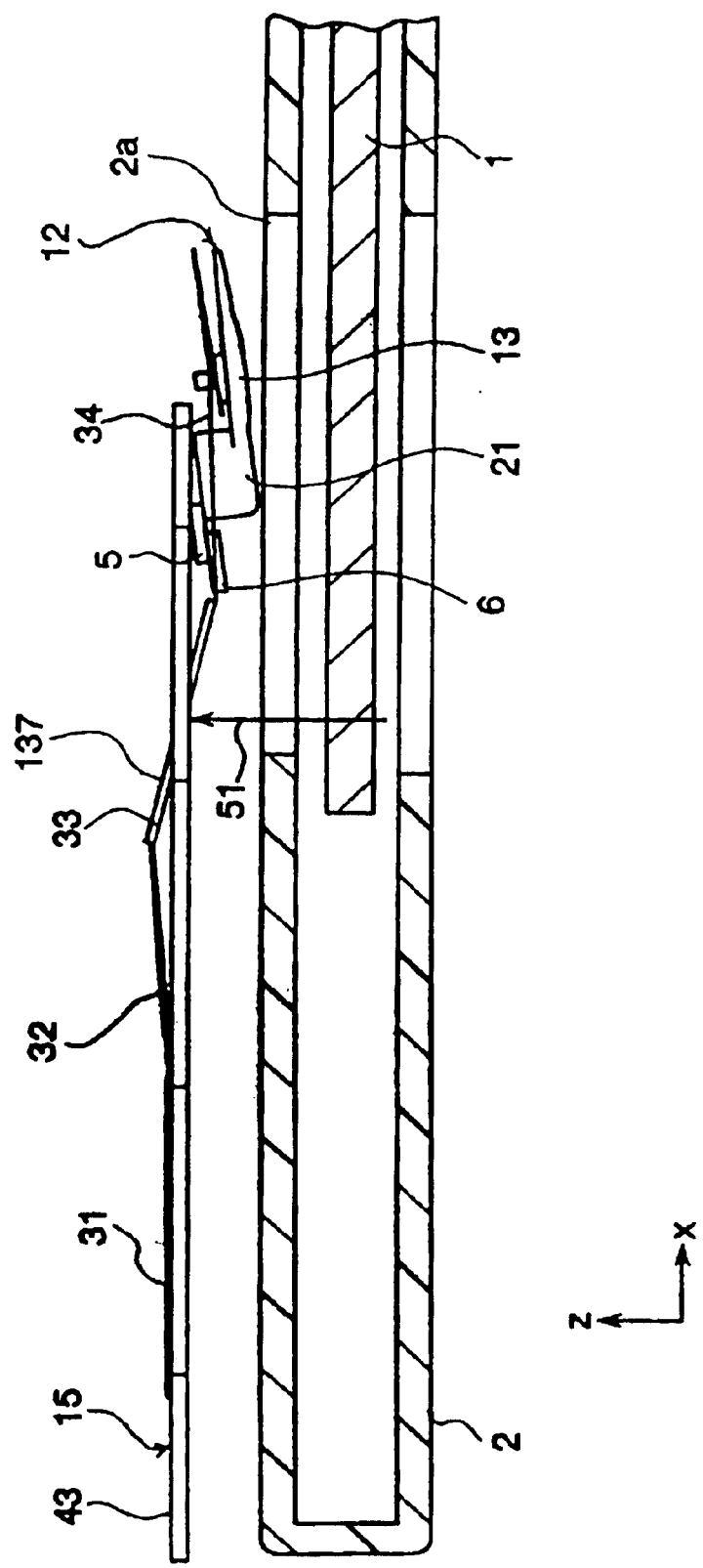
FIG. 6 is a side view showing a reaction when a shock is applied to the magnetic head device of the embodiment I-1 of the present invention I not in use.

FIG. 1 is a plan view of a magnetic head device of an embodiment I-1 of the present invention I, FIG. 2 is a side view of the magnetic head device shown in FIG. 1, FIG. 3 is a sectional side view of a main portion of a head main body of the magnetic head device shown in FIG. 1, FIG. 4 is an enlarged perspective view of a first holding portion and a second holding portion of the magnetic head device shown in FIG. 1, FIG. 5 is a side view showing a state of the magnetic head device shown in FIG. 1 not in use, and FIG. 6 is a side view showing a reaction when a shock is applied to the magnetic head device not in use.

The same reference numerals are given to components having the same functions as in the conventional examples shown in FIGS. 23 to 27, and detailed descriptions thereof are omitted here.

In FIGS. 1 to 6, numeral 14 denotes a suspension, which is made of a thin spring material such as SUS304 or BeCu. The suspension 14 has a planar attaching portion 31 at one end, a first elastic portion 32 that is extended from one end of the attaching portion 31, provided with a slit in the center and provided for following surface vibration of an optomagnetic disk 1 and applying an entire load, an intermediary portion 33 that is extended from the first elastic portion 32 while being inclined at a predetermined angle so as not to interfere with a cartridge 2 and formed to be a rigid body by being provided with draw ribs 137 formed by draw forming, a second elastic portion 34 that is extended from the intermediary portion 33 while being inclined at a predetermined angle with respect to the intermediary portion 33 and provided for following the surface shape of the optomagnetic disk 1, and a gimbal 16 that is disposed at the free end of the second elastic portion 34. The suspension 14 is configured by forming these in one piece.

Numeral 15 denotes a fastening member made of a metal plate of such as iron or SUS. The fastening member 15 has a supporting portion 43 for fastening the attaching portion 31 of the suspension 14, an arm portion 45 that is extended like an arm from one side of the supporting portion 43, and a stopper portion 147 that is provided at the front end of the arm portion 45 by being bent at a right angle so as to oppose the supporting portion 43. The fastening member 15 is configured by forming these in one piece.

Numeral 12 denotes a head main body. A wound coil 18 is fixed to a central magnetic pole core 17a of an E-shaped ferrite magnetic pole core 17 including the central magnetic pole core 17a and side magnetic pole cores 17b so as to form a magnetic head element 20. This magnetic head element 20 is attached integrally to a slider 21 made of resin with excellent sliding characteristics, for example, polyphenylene sulfide or liquid crystal polymer, so that an open end of the E-shaped magnetic pole core 17 opposes the optomagnetic disk 1, thereby forming the head main body 12.

Numeral 13 denotes a sliding portion, which is formed integrally on a surface of the slider 21 opposing the optomagnetic disk 1 so as to have a circular arc section, thereby gliding constantly in point contact over the optomagnetic disk 1 in a smooth manner.

Numeral 5 denotes a first holding portion having a flat plate shape, which is made of SUS, iron or resin such as polyphenylene sulfide or liquid crystal polymer and fastened to the upper part of the head main body 12 by glue of epoxy resin or fusing. The first holding portion 5 also may be provided by being formed in one piece with the slider 21. By forming them in one piece, it is possible to reduce components and steps and to lower costs. Numeral 6 denotes a second holding portion having a flat plate shape, which is made of SUS, iron or resin such as polyphenylene sulfide or liquid crystal polymer and fastened close to a connected end of the second elastic portion 34 to the intermediary portion 33 (simply referred to as "a connected end" in the following) by glue of epoxy resin or fusing. The first holding portion 5 and the second holding portion 6 are both positioned so as to protrude toward and in opposition to each other substantially in parallel to the surface of the optomagnetic disk 1.

The head main body 12 is fastened to the gimbal 16 of the suspension 14 by fusing or gluing. The attaching portion 31 of the suspension 14 is fastened to the supporting portion 43 of the fastening member 15 by lapser spot welding.

When the magnetic head device is used (in recording), the first holding portion 5 and the second holding portion 6 are arranged with a gap j therebetween as shown in FIG. 2. The first elastic portion 32 follows surface vibration of the optomagnetic disk 1 here. As a result, while the head main body 12 is following the surface vibration of the optomagnetic disk 1, the first holding portion 5 and the second holding portion 6 moves in the same phase, thus hardly changing the gap j. Consequently, it is possible to reduce the gap j to the amount equal to or smaller than the surface vibration amount of the optomagnetic disk 1.

Next, when the magnetic head device is not used, a lifter, which is not shown in the figure, lifts, for example, the intermediary portion 33 in the portion indicated by an arrow 51 so that the head main body 12 does not contact the cartridge 2, as shown in FIG. 5. Since the fastening member 15 is arranged so as to be spaced away from the cartridge 2 here, it is unnecessary to lift the fastening member 15.

The following is a description of a reaction when a shock is applied to the magnetic head device, with reference to FIGS. 5 and 6.

When, for example, the shock is applied to the magnetic head device not in use shown in FIG. 5, a downward inertial force is applied to the head main body 12, and the gimbal 16 serves as a rotation center so that the head main body 12 is displaced downward, because the center of gravity of the head main body 12 is located near the magnetic head element 20. Since the first holding portion 5 is in contact with the second holding portion 6 as shown in FIG. 6, the displacement of the head main body 12 is restricted within the elastic deformation range of the gimbal 16 and the second elastic portion 34. In addition, since the intermediary portion 33 is in contact with the lifter, which is not shown in the figure, there is substantially no displacement in the first elastic portion 32.

When a similar shock is applied to the magnetic head device in use, no problem arises because the head main body 12 is in contact with the optomagnetic disk 1.

Next, when an upward inertial force due to a shock is applied to the magnetic head device, a stopper portion 147 and the head main body 12 contact each other, thereby restricting the displacement of the head main body 12. Thus, the deformation of the first elastic portion 32 and the second elastic portion 34 is controlled within the elastic deformation range.

As is described above, in accordance with the magnetic head device of the embodiment I-1 of the present invention I, since the first holding portion 5 is disposed in the head main body 12 and the second holding portion 6 is disposed close to the connected end of the second elastic portion 34 of the suspension, the gap j between the first holding portion 5 and the second holding portion 6 can be restricted to be equal to or smaller than the surface vibration amount of the optomagnetic disk 1. Reducing the gap j can reduce the displacement amount of the head main body 12 due to shock when the magnetic head device is not used. As a result, it is possible to reduce the lifting amount when the magnetic head device is not used, thereby achieving a thinner optomagnetic recording/reproducing apparatus. At the same time, a permanent deformation of the gimbal 16 and the second elastic portion 34 can be prevented with respect to a shock in the vertical direction.

(Embodiment I-2)

The following is a description of a magnetic head device in accordance with the embodiment I-2, with reference to FIGS. 7 to 10.

Figure 7:
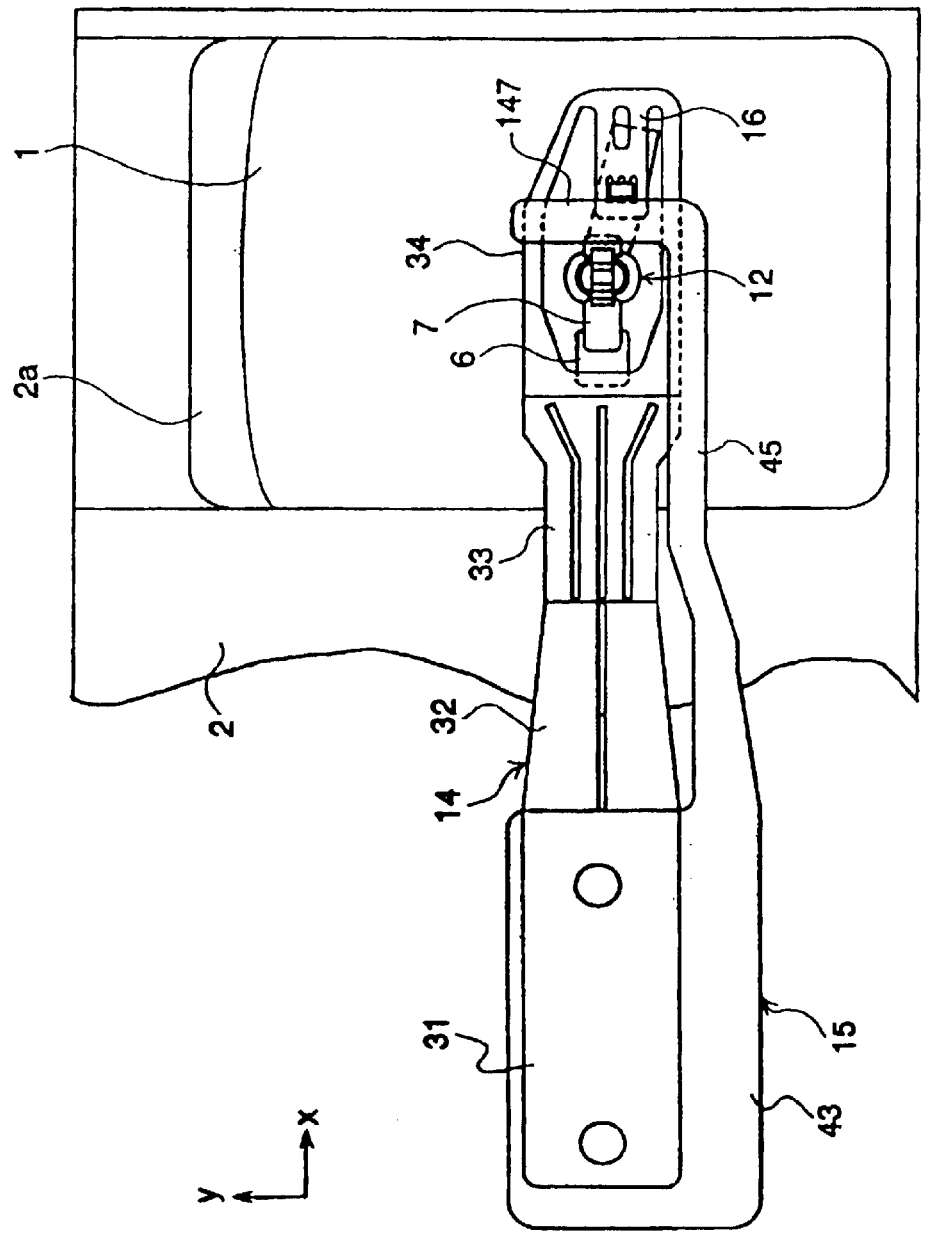
FIG. 7 is a plan view of a magnetic head device of an embodiment I-2 of the present invention I.
Figure 8:
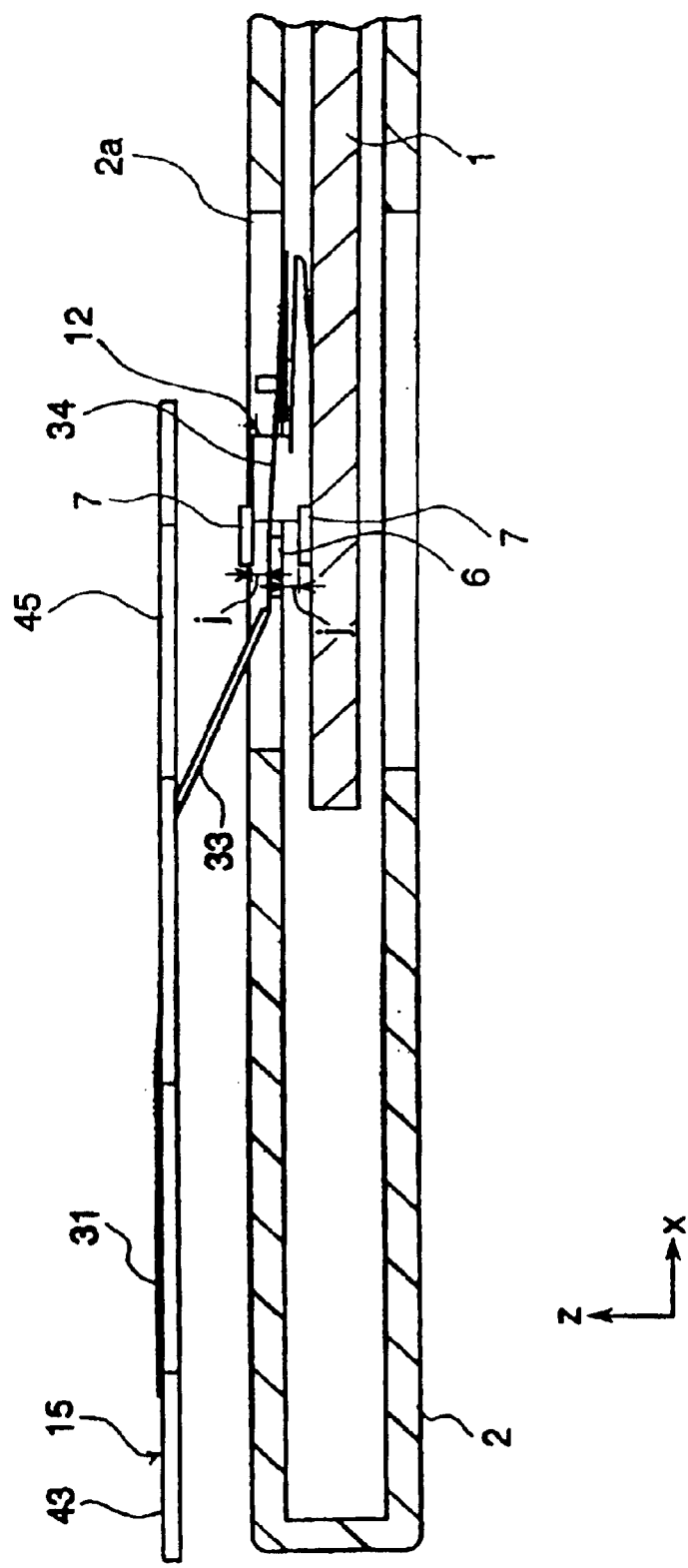
FIG. 8 is a side view of the magnetic head device of the embodiment I-2 of the present invention I.
Figure 9:
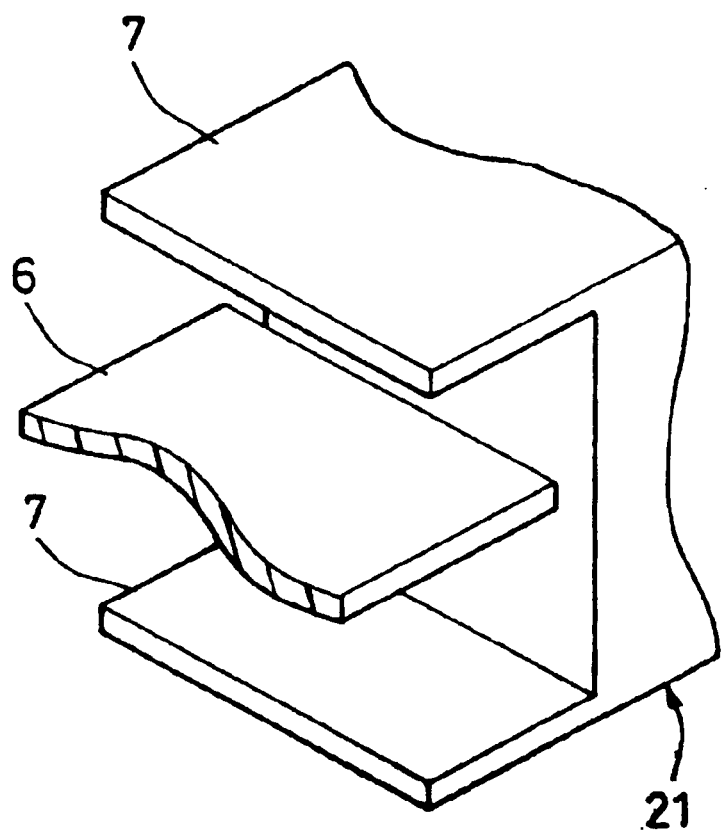
FIG. 9 is an enlarged perspective view of a first holding portion and a second holding portion of the magnetic head device of the embodiment I-2 of the present invention I.
Figure 10:
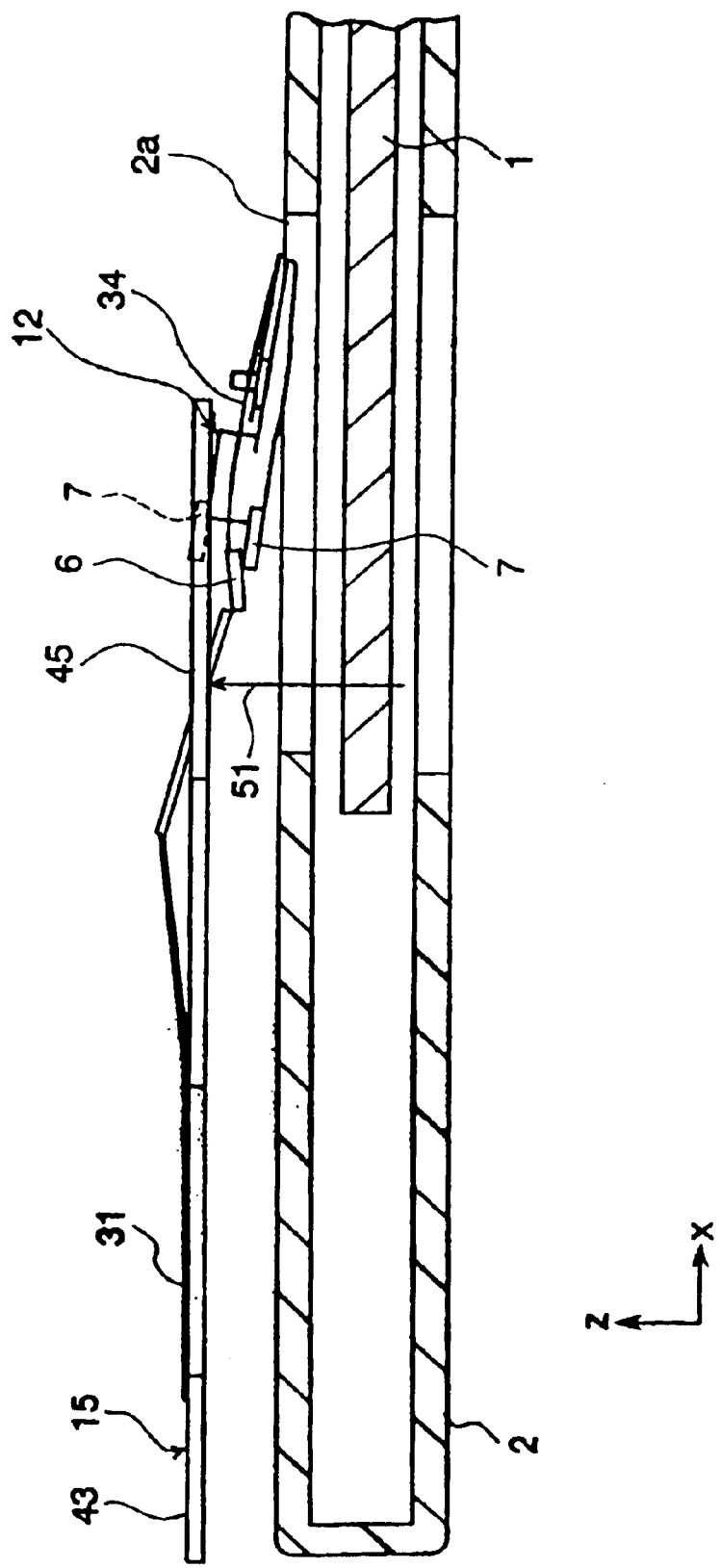
FIG. 10 is a side view showing a reaction when a shock is applied to the magnetic head device of the embodiment I-2 of the present invention I not in use.

FIG. 7 is a plan view of the magnetic head device of the embodiment I-2 of the present invention I, FIG. 8 is a side view of the magnetic head device shown in FIG. 7, FIG. 9 is an enlarged perspective view of first holding portions and a second holding portion of the magnetic head device shown in FIG. 7, and FIG. 10 is a side view showing a reaction when a shock is applied to the magnetic head device not in use.

The magnetic head device of the embodiment I-2 is different from that of the embodiment I-1 in that two first holding portions 7 are disposed in a head main body 12, so as to be spaced away from each other with a predetermined distance in the vertical direction (the direction perpendicular to the surface of an optomagnetic disk 1), and a second holding portion 6 that is disposed on the side of the connected end of the second elastic portion 34 is arranged between the upper and lower first holding portions 7.

The first holding portions 7 are made of SUS, iron or resin such as polyphenylene sulfide or liquid crystal polymer, and fastened to the upper and lower parts of the head main body 12 by gluing with epoxy resin or welding. The first holding portions 7 also may be provided by being formed in one piece with a slider 21.

As shown in FIG. 8, the upper first holding portion 7 and the second holding portion 6 are spaced away from each other by a gap j, as are the lower first holding portion 7 and the second holding portion 6. This gap j may be equal to or smaller than the surface vibration amount of the optomagnetic disk 1, as described in the embodiment I-1.

Next, the following is a description of the case where a shock from sides (in the direction Y) is applied to the magnetic head device, with reference to FIG. 10.

As in the embodiment I-1, when the magnetic head device is not used, a lifter, which is not shown in the figure, lifts the portion indicated by an arrow 51 so that the head main body 12 does not contact the cartridge 2. If the shock in the direction Y is applied here, the head main body 12 attempts to move in the direction Y. However, since the second elastic portion 34 is wide in the direction Y, the second elastic portion 34 has a high rigidity in the direction Y. Therefore, the second elastic portion 34 is displaced in the vertical direction (the direction Z) that has the lowest rigidity. For example, behaviors are shown such that the portion near the magnetic head element 20 of the head main body 12 moves upward relative to the second elastic portion 34, and the portion near the free end of the second elastic portion 34 moves downward.

As shown in FIG. 10, the lower first holding portion 7 contacts the second holding portion 6, thereby restricting the displacement of the head main body 12 with respect to the second elastic portion 34. Thus, the deformation of the second elastic portion 34 is controlled within the elastic deformation range.

When the shock in the vertical direction is applied to the magnetic head device not in use, the reaction is similar to that shown in the embodiment I-1, so the description thereof is omitted here.

When a similar shock is applied to the magnetic head device in use, no problem arises because the head main body 12 is in contact with the optomagnetic disk 1.

As is described above, in accordance with the magnetic head device of the embodiment I-2, in addition to the effects of the embodiment I-1, since the first holding portions 7 are disposed in the upper and lower parts of the head main body 12 and the second holding portion 6 is disposed on the side of the connected end of the second elastic portion 34 so that the second holding portion 6 is arranged between the upper and lower first holding portions 7, a permanent deformation of the second elastic portion 34 also can be prevented with respect to a shock in the side direction of the magnetic head device.

Instead of the above embodiment, the second holding portion that is disposed on the side of the connected end of the second elastic portion 34 may be formed into a substantially U-shape having upper and lower two holding portions, and only one first holding portion as in the embodiment I-1 may be disposed in the head main body 12, so that the first holding portion is arranged between the upper and lower two holding portions of the second holding portion.

(Embodiment I-3)

Figure 11:
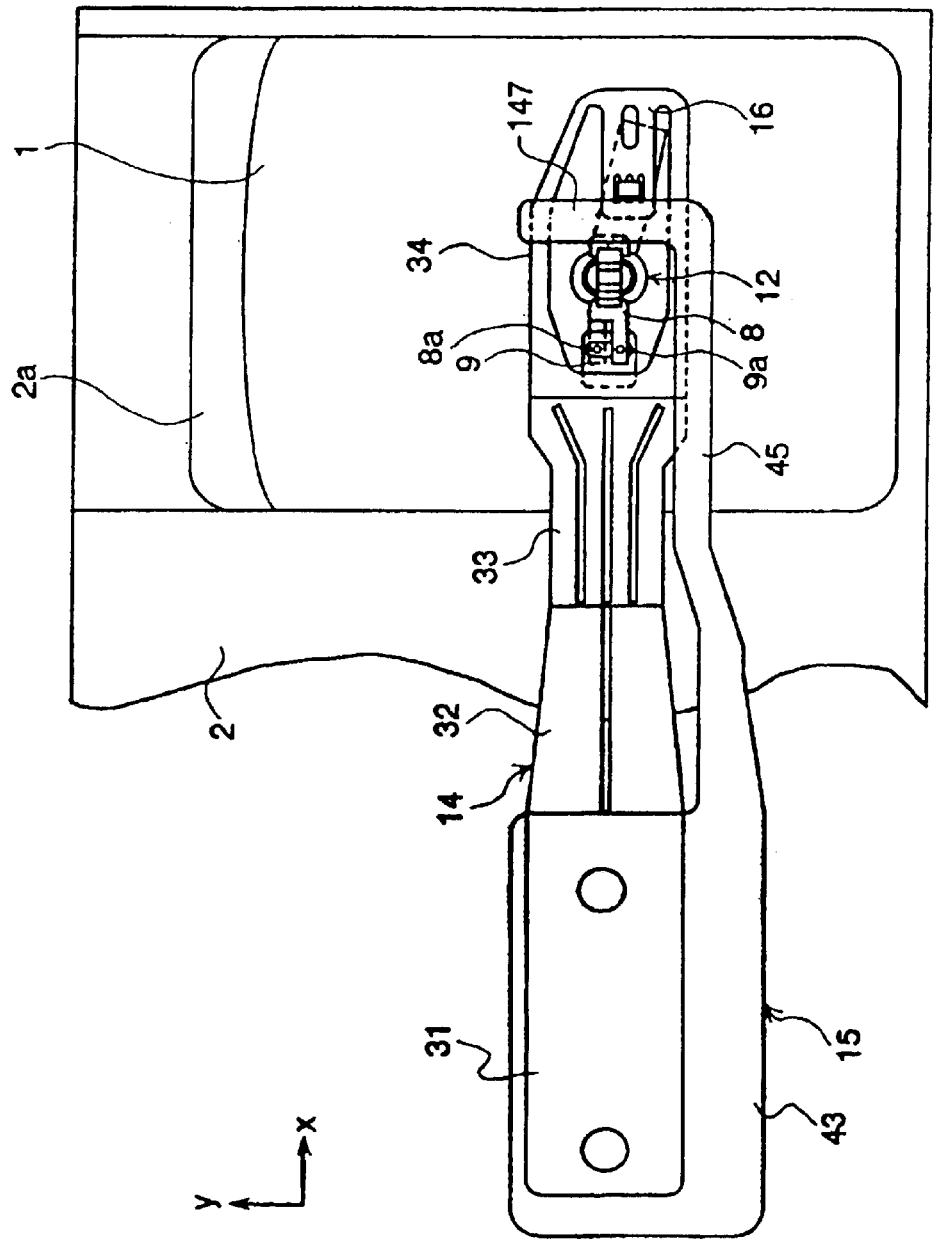
FIG. 11 is a plan view of a magnetic head device of an embodiment I-3 of the present invention I.
Figure 12:
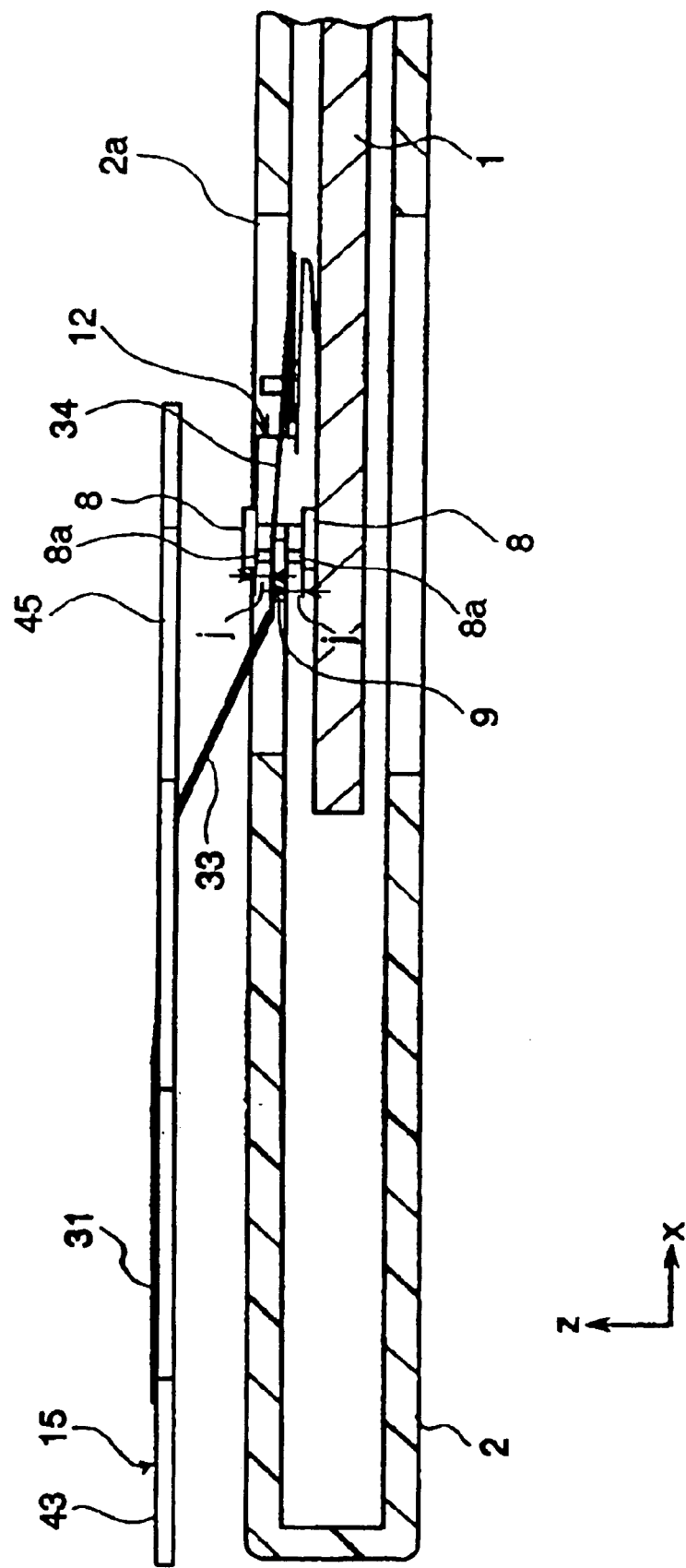
FIG. 12 is a side view of the magnetic head device of the embodiment I-3 of the present invention I.
Figure 13:
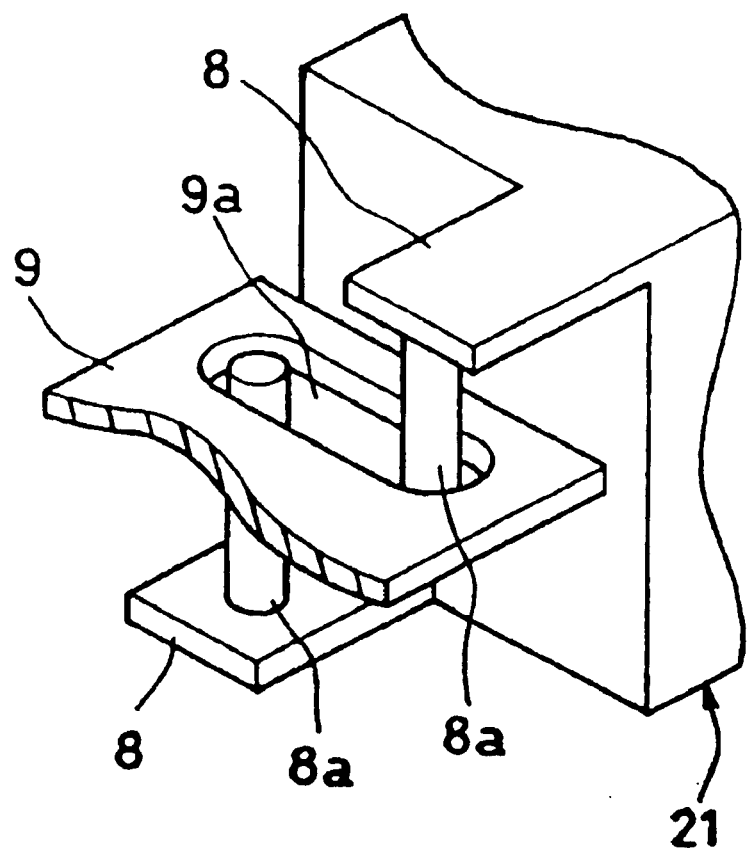
FIG. 13 is an enlarged perspective view of a first holding portion and a second holding portion of the magnetic head device of the embodiment I-3 of the present invention I.

The following is a description of a magnetic head device in accordance with the embodiment I-3, with reference to FIGS. 11 to 13.

FIG. 11 is a plan view of the magnetic head device of the embodiment I-3 of the present invention I, FIG. 12 is a side view of the magnetic head device shown in FIG. 11, and FIG. 13 is an enlarged perspective view of first holding portions and a second holding portion of the magnetic head device shown in FIG. 11.

The magnetic head device of the embodiment I-3 is different from that of the embodiment I-2in the following points. That is, first holding portions 8 are disposed in the upper and lower parts of a head main body 12, and convex portions 8a protruding toward the direction perpendicular to a recording surface of an optomagnetic disk 1 are disposed on the opposing sides of the upper and lower holding portions 8. On the side of the connected end of the second elastic portion 34, a second holding portion 9 having a through hole 9a is disposed between the first holding portions 8. The through hole 9a is arranged on an extension of the central lines of the convex portions 8a. Preferably, the convex portions 8a are inserted in the through hole 9a with clearance.

The first holding portions 8 and the convex portions 8a are made of SUS, iron or resin such as polyphenylene sulfide or liquid crystal polymer, and fastened to the upper and lower parts of the head main body 12 by glue of epoxy resin or fusing. Also, they may be provided by being formed in, one piece with a slider 21.

The second holding portion 9 is made of SUS, iron or resin such as polyphenylene sulfide or liquid crystal polymer, and fastened close to the connected end of the second elastic portion 34 by gluing with epoxy resin or welding.

As shown in FIG. 12, the upper first holding portion 8 and the second holding portion 9 are spaced away from each other by a gap j, as are the lower first holding portion 8 and the second holding portion 9. This gap j may be equal to or smaller than the surface vibration amount of the optomagnetic disk 1, as described in the embodiment I-1.

For example, when a shock is applied to the magnetic head device, causing the reaction similar to that in FIG. 6 or 10, the convex portions 8a are inserted in the through hole 9a so as to be engaged. When the shock is large, the sides of the free end of the first holding portions 8 and the second holding portion 9 may be deformed elastically in the direction Z. However, by maintaining the engagement state of the convex portions 8a and the through hole 9a even in such a situation, the present embodiment can prevent the first holding portions 8 from getting over the second holding portion 9. Thus, the deformation of the second elastic portion 34 is controlled within the elastic deformation range reliably.

As is described above, in accordance with the magnetic head device of the embodiment I-3, the convex portions 8a protruding in the direction perpendicular to the recording surface of the optomagnetic disk 1 are disposed respectively on the opposing sides of the upper and lower first holding portions 8 of the head main body 12, the second holding portion 9 having the through hole 9a is disposed on the side of the connected end of the second elastic portion 34, and the second holding portion 9 is arranged between the two first holding portions 8 so that the convex portions 8a can be inserted in the through hole 9a, thus further improving shock resistance characteristics, in addition to the effects of the embodiments I-1 and I-2.

Also, instead of the above embodiment, the second holding portion on the side of the connected end of the second elastic portion 34 may be formed into upper and lower two holding portions, the convex portions protruding toward the direction perpendicular to the recording surface of the optomagnetic disk 1 may be disposed on the opposing sides of the second holding portions, and the first holding portion having a through hole may be provided in the head main body 12, so that the first holding portion is arranged between the two second holding portions.

(Embodiment I-4)

Figure 14:
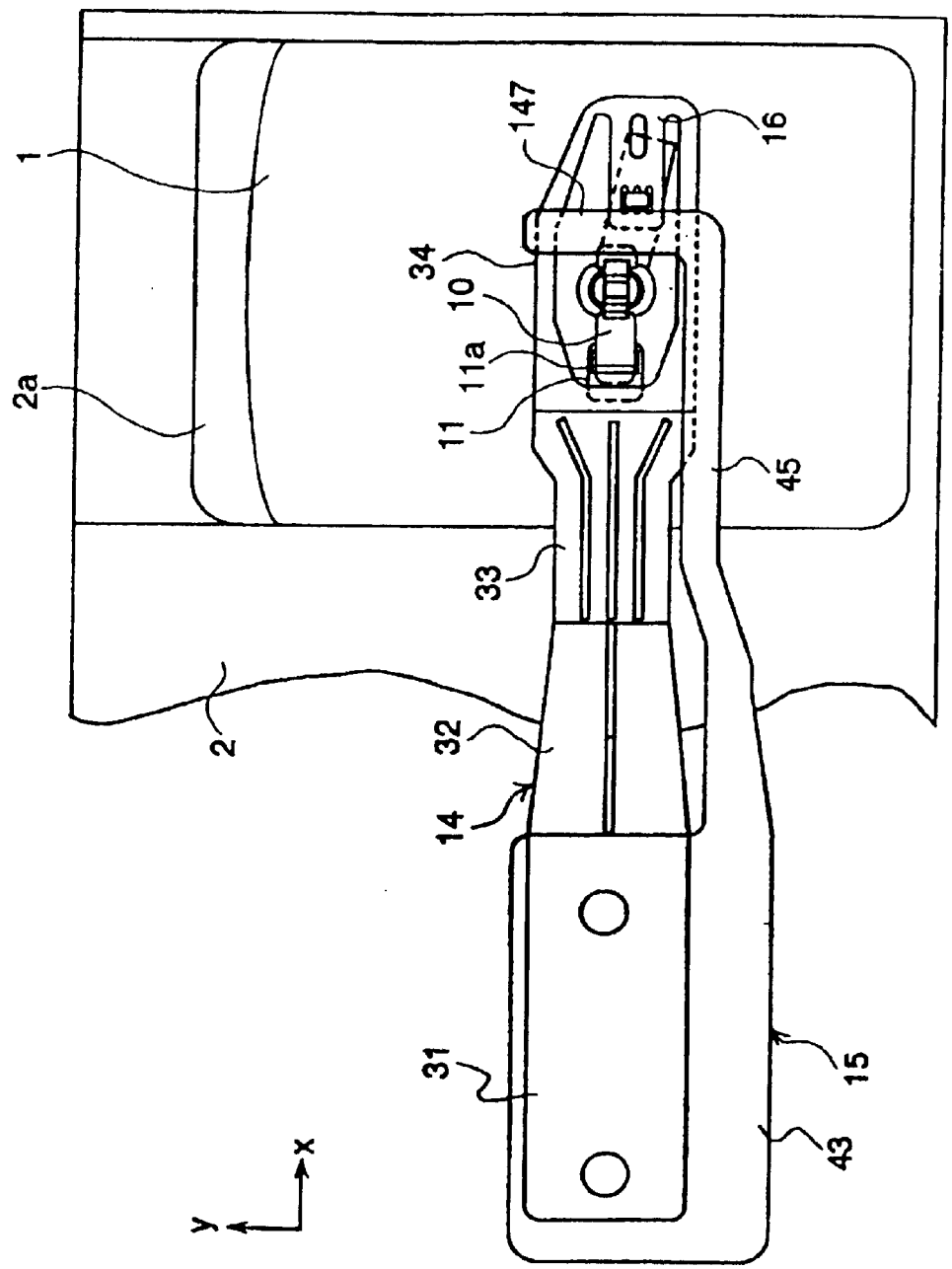
FIG. 14 is a plan view of a magnetic head device of an embodiment I-4 of the present invention I.
Figure 15:
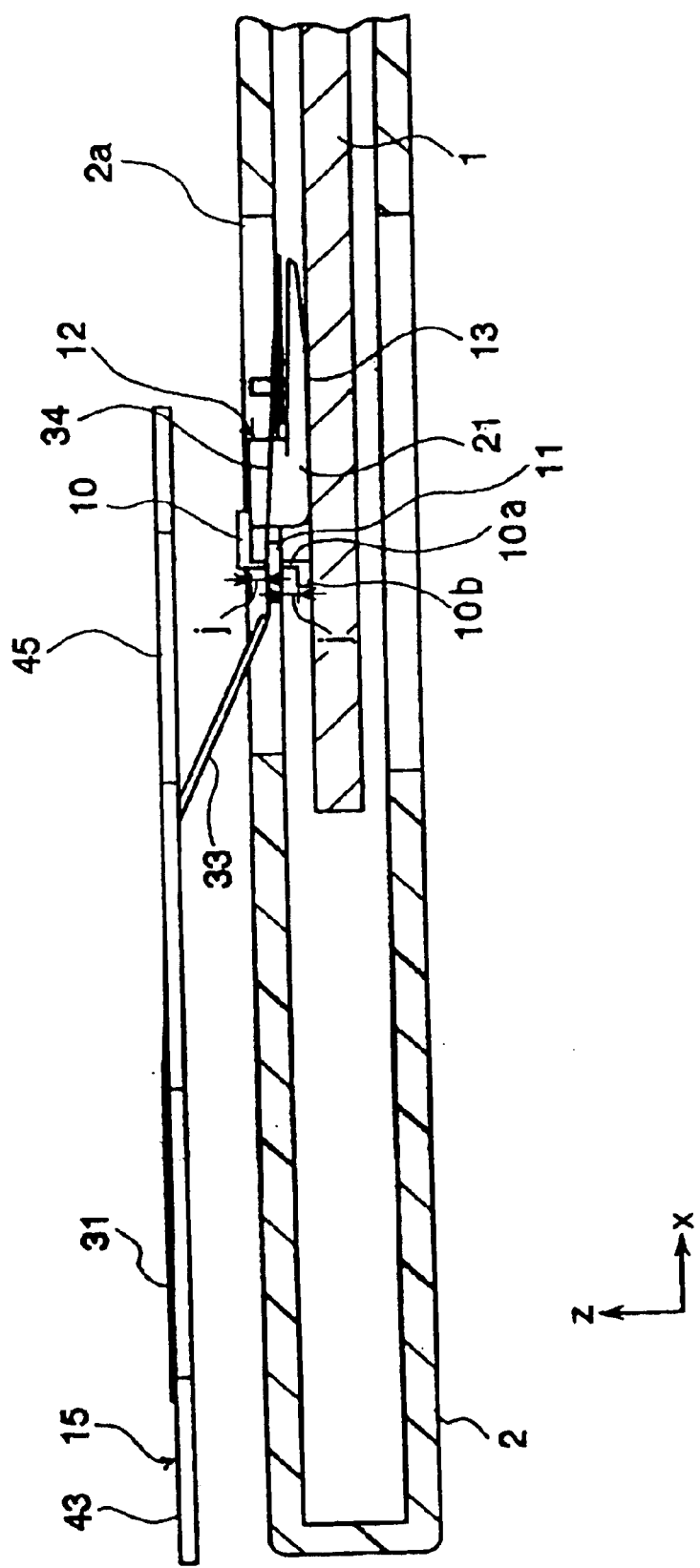
FIG. 15 is a side view of the magnetic head device of the embodiment I-4 of the present invention I.
Figure 16:
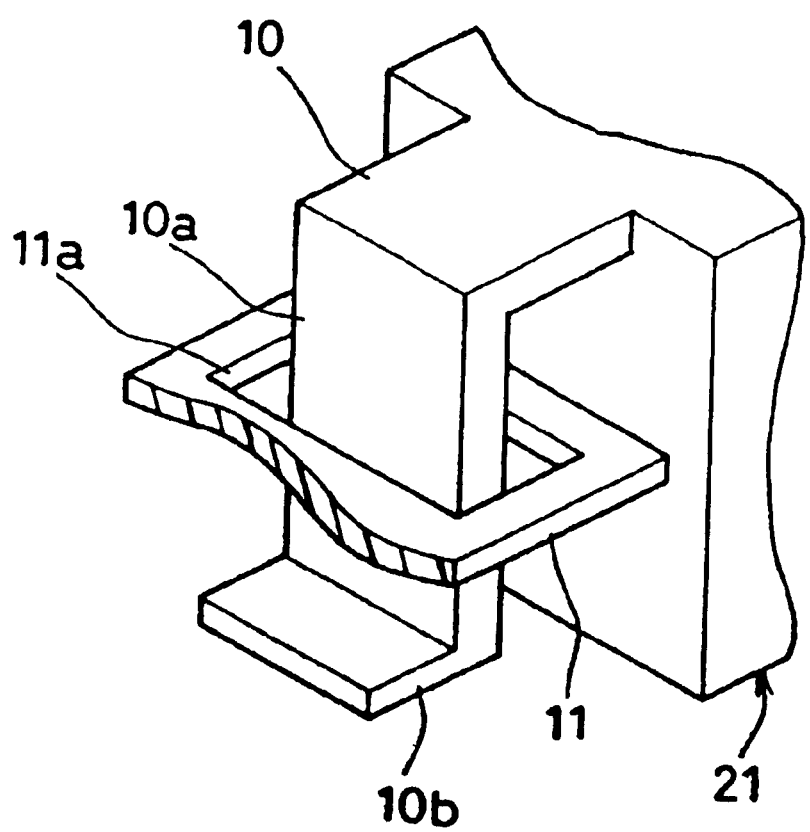
FIG. 16 is an enlarged perspective view of a first holding portion and a second holding portion of the magnetic head device of the embodiment I-4 of the present invention I.

The following is a description of a magnetic head device in accordance with the embodiment I-4, with reference to FIGS. 14 to 16.

FIG. 14 is a plan view of the magnetic head device of the embodiment I-4 of the present invention I, FIG. 15 is a side view of the magnetic head device shown in FIG. 14, and FIG. 16 is an enlarged perspective view of a first holding portion and a second holding portion of the magnetic head device shown in FIG. 14.

The magnetic head device of the embodiment I-4 is different from that of the embodiment I-3 in the following points. That is, a first holding portion 10 protruding toward the direction parallel to a recording surface of an optomagnetic disk 1 (in the direction X) is disposed in the upper part of a head main body 12, and a first convex portion 10a protruding in the direction perpendicular to the recording surface of the optomagnetic disk 1 (in the direction Z) and a second convex portion 10b protruding toward the direction X from the lower end of the first convex portion 10a are disposed in this order on the lower surface (the surface on the side of the optomagnetic disk 1) of the first holding portion 10. On the side of the connected end of the second elastic portion 34, a flat plate-shaped second holding portion 11 having a through hole 11a is disposed in the direction substantially parallel to the recording surface of the optomagnetic disk 1. The first convex portion 10a passes through the through hole 11a with clearance.

The first holding portion 10 and the convex portions 10a and 10b are made of SUS, iron or resin such as polyphenylene sulfide or liquid crystal polymer, and fastened to the upper part of the head main body 12 by gluing with epoxy resin or welding. Also, they may be provided by being formed in one piece with a slider 21.

The second holding portion 11 is made of SUS, iron or resin such as polyphenylene sulfide or liquid crystal polymer. For example, the first holding portion 10, the convex portions 10a and 10b are provided in the head main body 12, then the second convex portion 10b and the first convex portion 10a are inserted in the through hole 11a of the second holding portion. Subsequently, the second holding portion 11 is fastened close to the connected end of the second elastic portion 34 by gluing with epoxy resin or welding.

After the assembly, the first holding portion 10 and the second holding portion 11 can be spaced away from each other by a gap j, so can the second convex portion 10b and the second holding portion 11.

Even if a shock is applied to the magnetic head device, positional restrictions can be performed. On the one hand, concerning the displacement in the Z-axis direction, the first holding portion 10 and the second convex portion 10b contact the second holding portion 11, thereby restricting the position of the head main body 12 with respect to the second elastic portion 34. On the other hand, concerning the displacement in the Y-axis direction, the first convex portion 10a contacts the inner wall of the through hole 11a of the second holding portion 11, thereby restricting the position of the head main body 12 with respect to the second elastic portion 34. As a result, the deformation of the second elastic portion 34 is controlled within the elastic deformation range reliably.

As is described above, the magnetic head device of the embodiment I-4 is configured so that the first convex portion 10a is inserted constantly in the through hole 11a of the second holding portion 11 and the first holding portion 10 and the convex portions 10a and 10b contact the second holding portion 11. As a result, the first holding portion 10 including the convex portions 10a and 10b engages the second holding portion 11 more reliably, thus further improving shock resistance characteristics, in addition to the effects of the embodiments I-1 to I-3.

Instead of the above structure, the first holding portion 10 may be disposed on the lower side (on the side of the optomagnetic disk 1) of the head main body 12, and the convex portions 10a and 10b may be disposed on the upper surface of the first holding portion 10.

Also, a second holding portion having a first convex portion and a second convex portion that are formed into a L-shape may be formed on the side of the connected end of the second elastic portion 34, and a first holding portion having a through hole may be provided in the head main body 12.

(Embodiment I-5)

Figure 17:
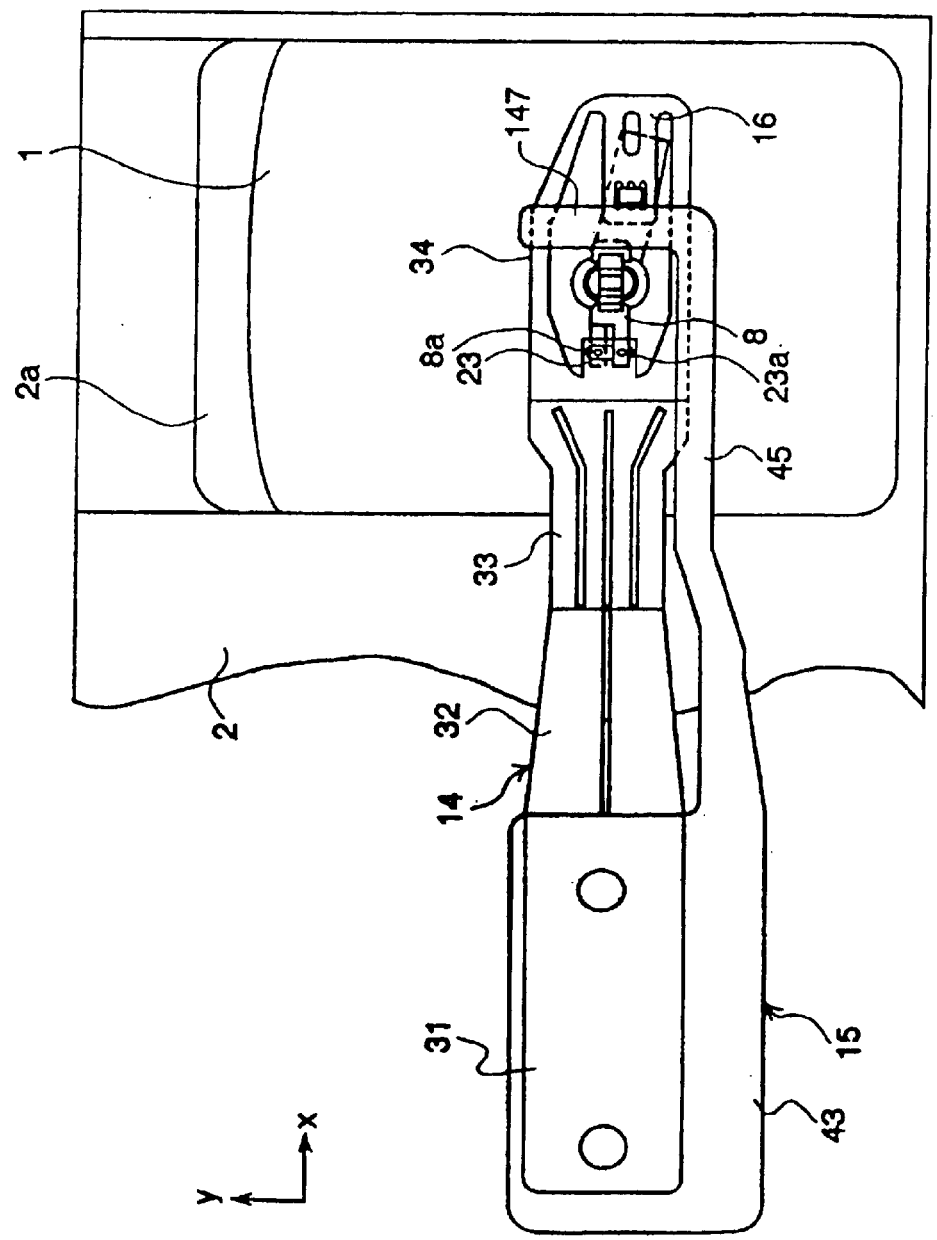
FIG. 17 is a plan view of a magnetic head device of an embodiment I-5 of the present invention I.
Figure 18:
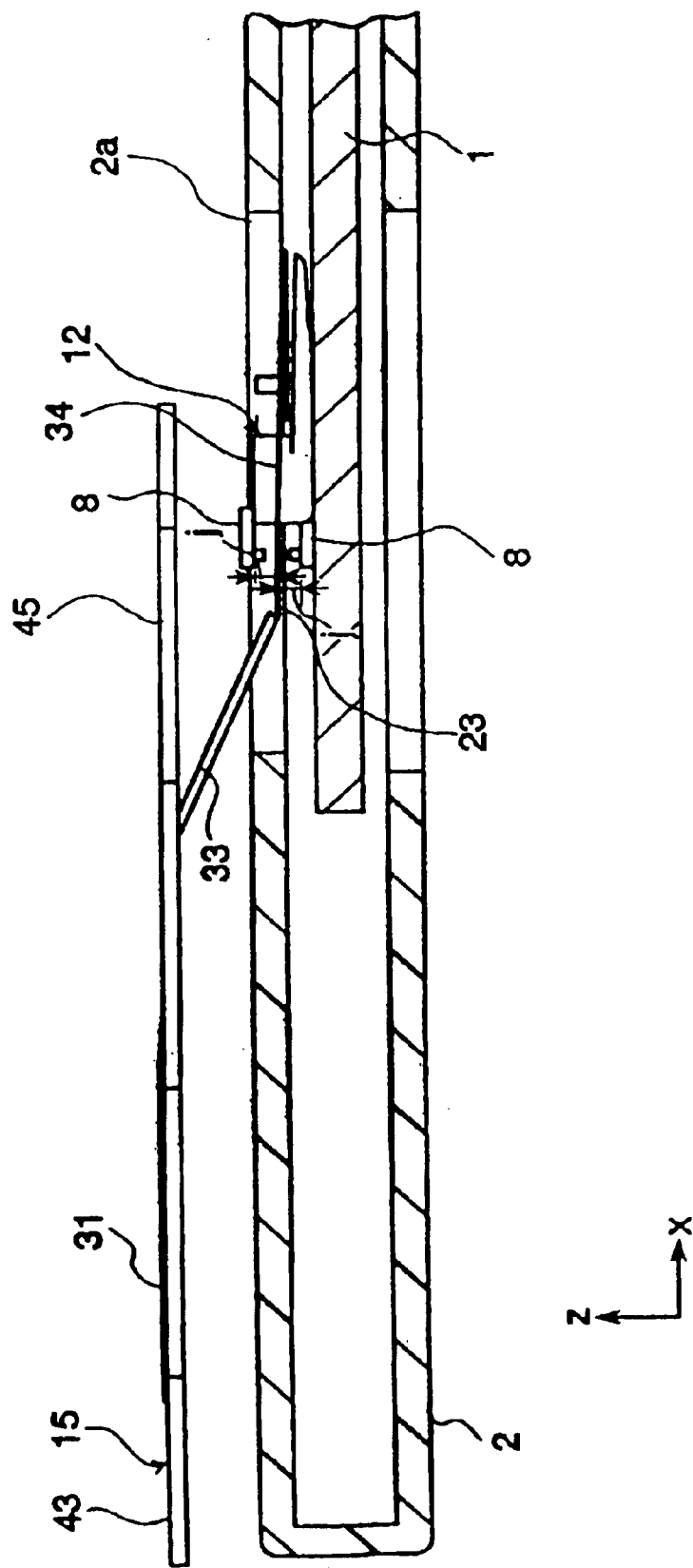
FIG. 18 is a side view of the magnetic head device of the embodiment I-5 of the present invention I.
Figure 19:
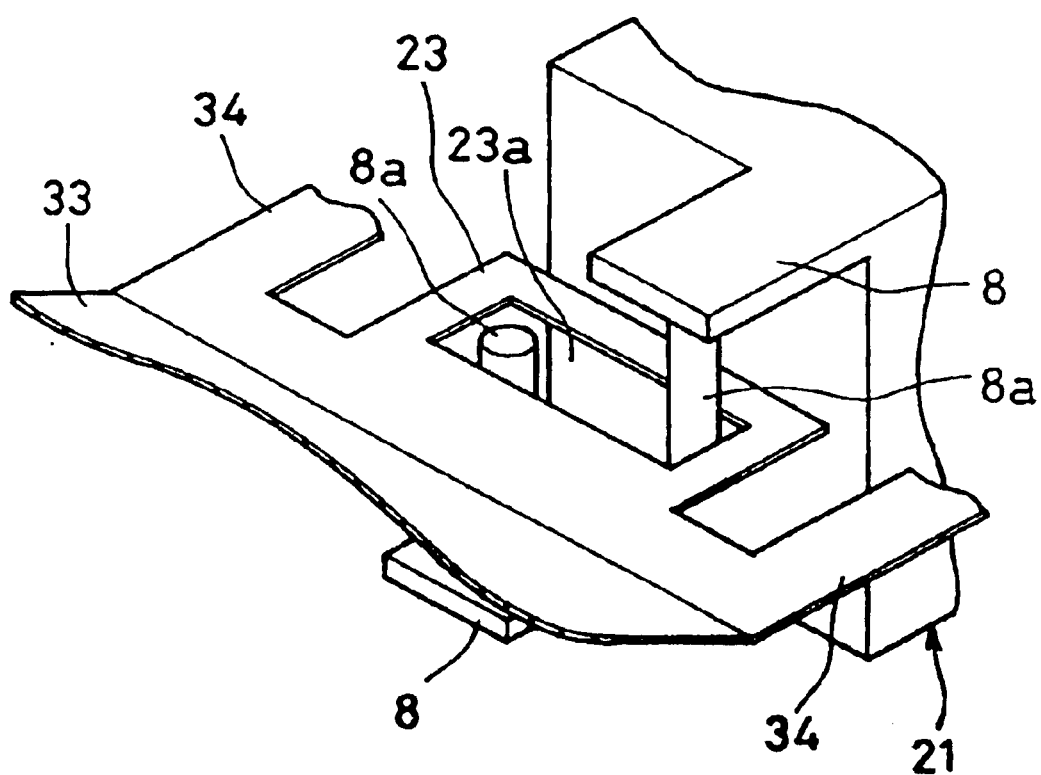
FIG. 19 is an enlarged perspective view of a first holding portion and a second holding portion of the magnetic head device of the embodiment I-5 of the present invention I.

The following is a description of a magnetic head device in accordance with the embodiment I-5, with reference to FIGS. 17 to 19.

FIG. 17 is a plan view of the magnetic head device of the embodiment I-5 of the present invention I, FIG. 18 is a side view of the magnetic head device shown in FIG. 17, and FIG. 19 is an enlarged perspective view of first holding portions and a second holding portion of the magnetic head device shown in FIG. 17.

The magnetic head device of the embodiment I-5 is different from that of the embodiment I-3 in that a second holding portion 23 is formed close to the side of the connected end of the second elastic portion 34 integrally with and with the same material as a suspension 14, and a through hole 23a is provided in this second holding portion 23. First holding portions 8 and convex portions 8a provided therewith are the same as those in the embodiment I-3.

When a shock is applied to the magnetic head, the behavior of the head main body 12 is similar to that in the embodiment I-3, so the description thereof is omitted here.

As is described above, in accordance with the magnetic head device of the embodiment I-5, in addition to the effects of the embodiments I-1 to I-3, it becomes unnecessary to fasten the second holding portion as a separate component, thereby reducing components and steps, leading to lower costs.

Although the above description used the embodiment I-3 as an example, the other embodiments also make it possible to form the second holding portion close to the connected end of the second elastic portion 34 integrally with and with the same material as the suspension 14.

(Embodiment I-6)

Figure 20:
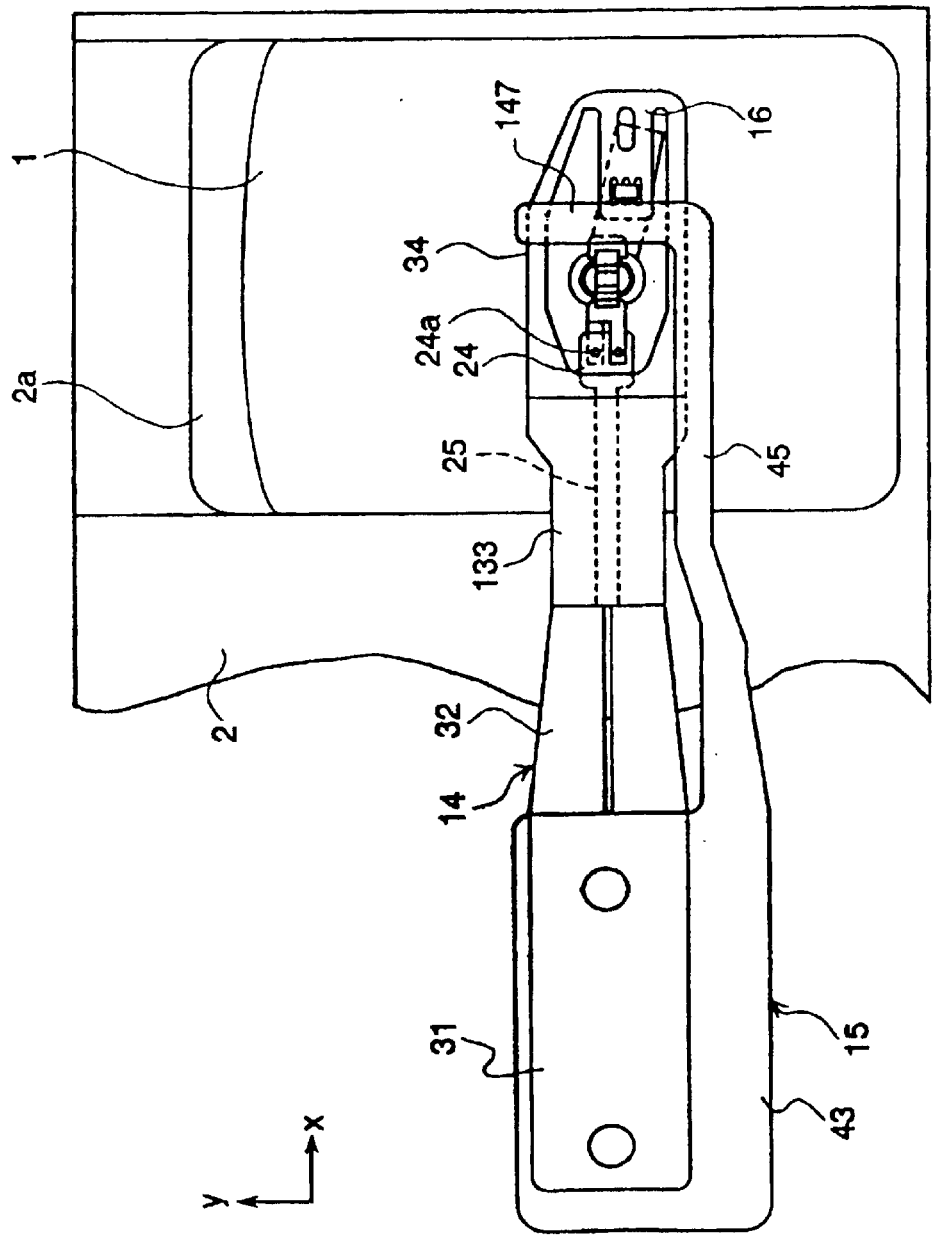
FIG. 20 is a plan view of a magnetic head device of an embodiment I-6 of the present invention I.
Figure 21:
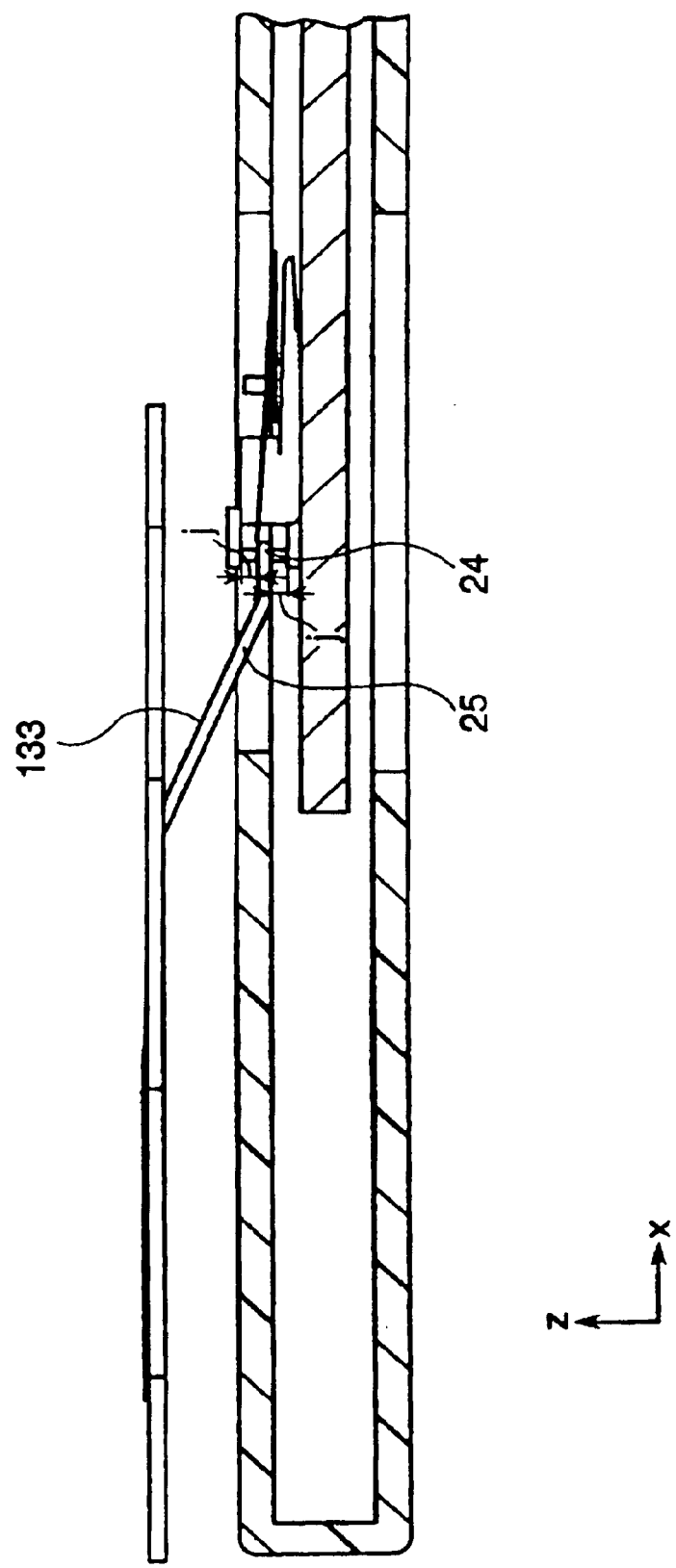
FIG. 21 is a side view of the magnetic head device of the embodiment I-6 of the present invention I.
Figure 22:
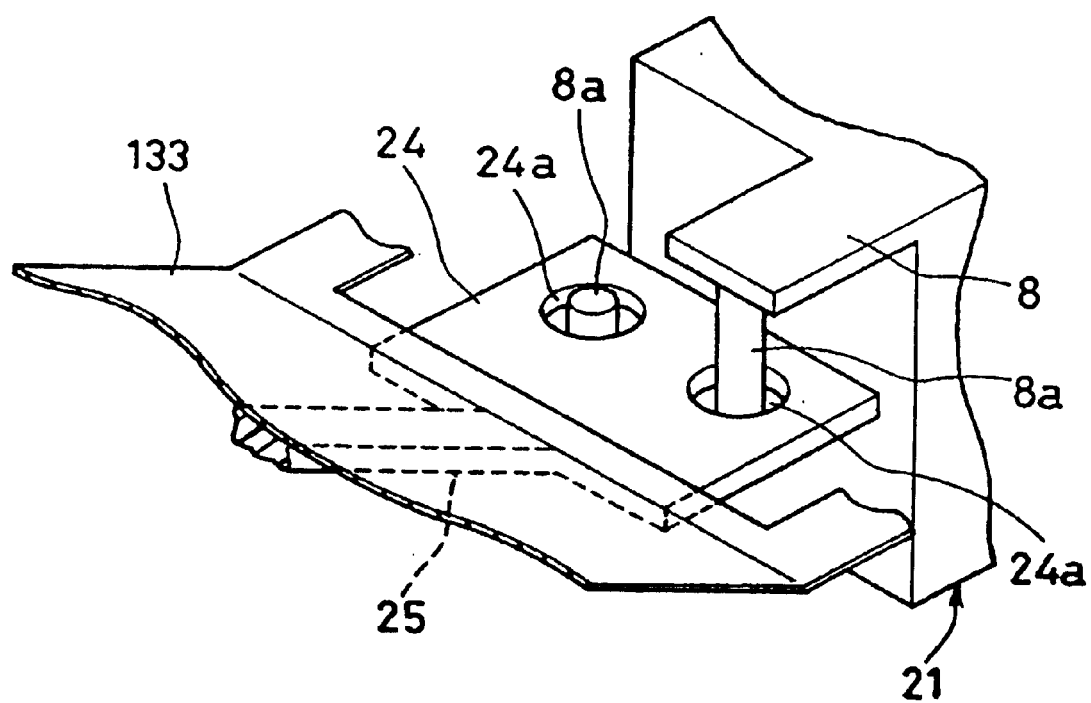
FIG. 22 is an enlarged perspective view of a first holding portion and a second holding portion of the magnetic head device of the embodiment I-6 of the present invention I.
Figure 23:
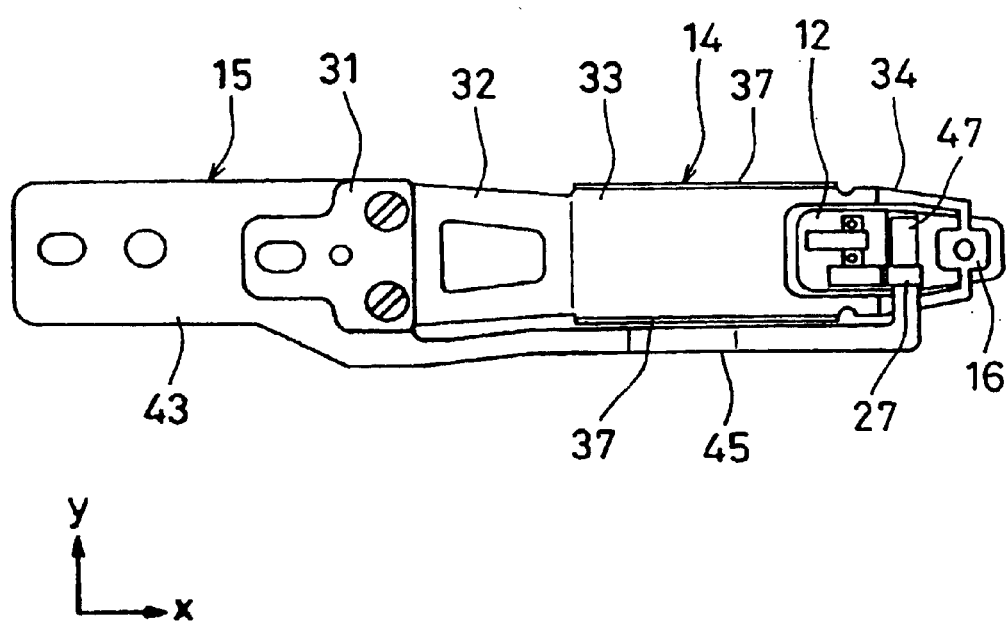
FIG. 23 is a plan view of a conventional magnetic head device.
Figure 24:
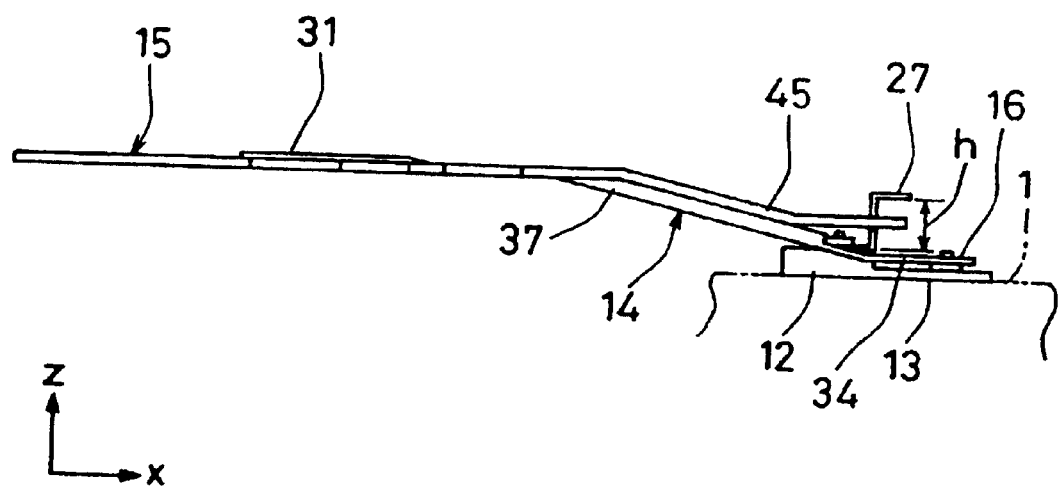
FIG. 24 is a side view of the conventional magnetic head device in use.
Figure 25:
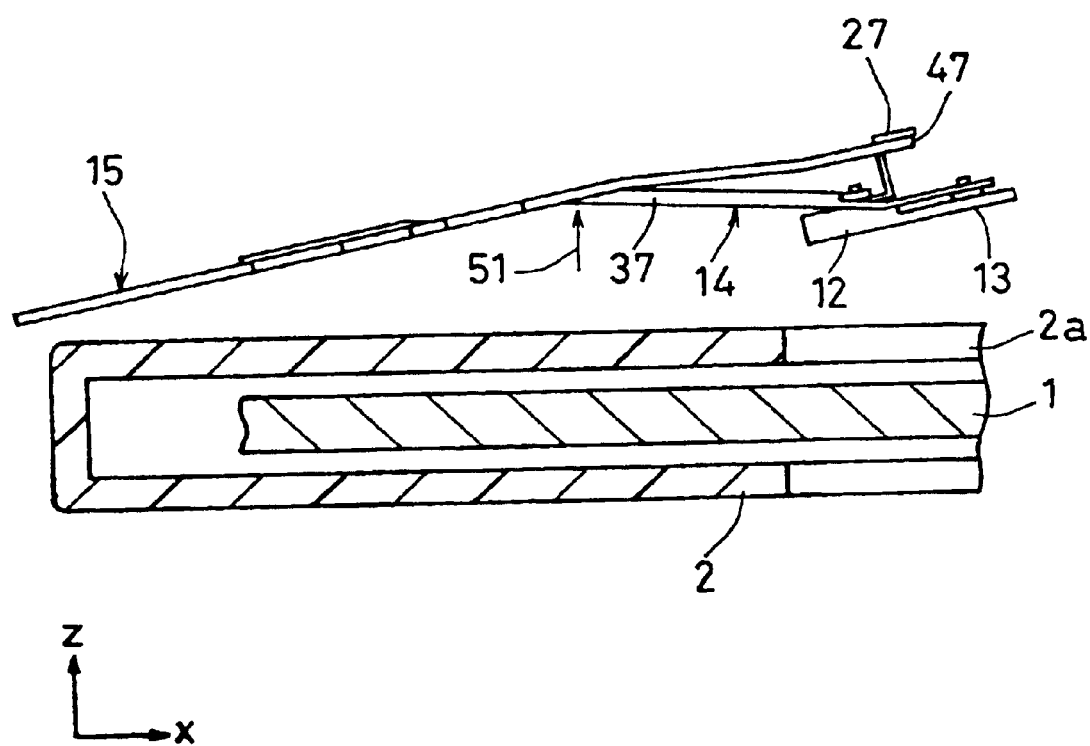
FIG. 25 is a side view of the conventional magnetic head device not in use.
Figure 26:
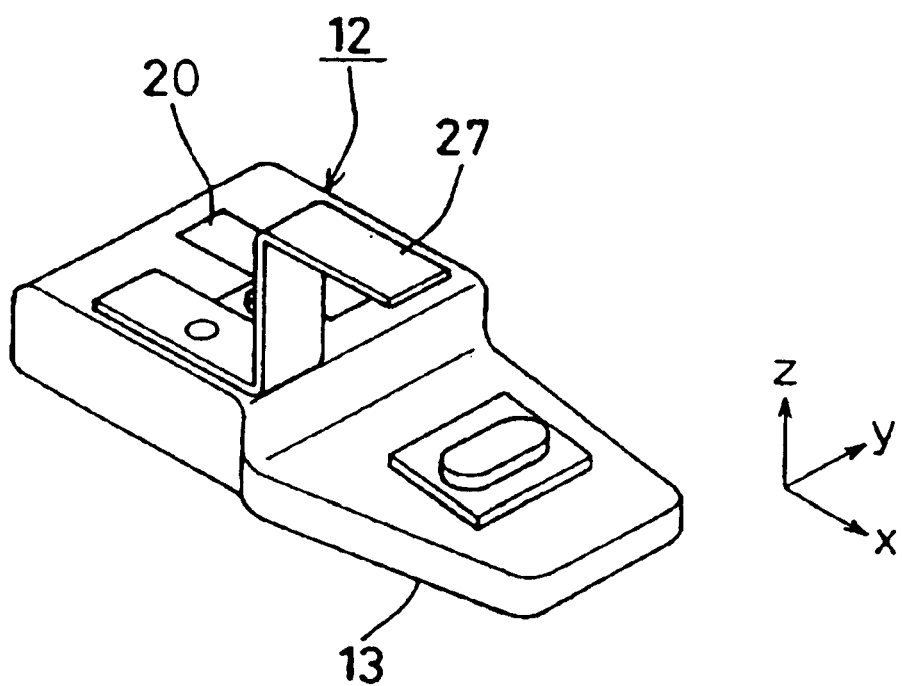
FIG. 26 is a perspective view of a head main body of the conventional magnetic head device.
Figure 27:
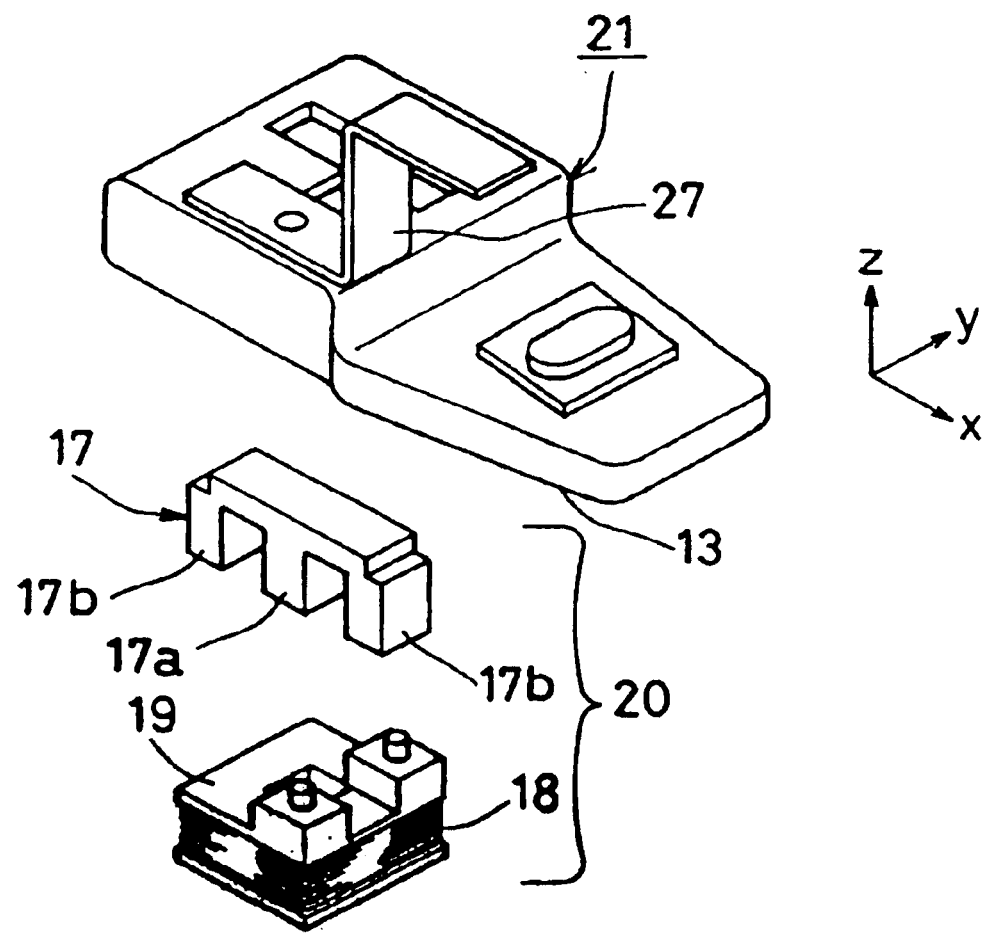
FIG. 27 is an exploded perspective view of the head main body of the conventional magnetic head device.

The following is a description of a magnetic head device in accordance with the embodiment I-6, with reference to FIGS. 20 to 22.

FIG. 20 is a plan view of the magnetic head device of the embodiment I-6 of the present invention I, FIG. 21 is a side view of the magnetic head device shown in FIG. 20, and FIG. 22 is an enlarged perspective view of first holding portions and a second holding portion of the magnetic head device shown in FIG. 20.

The magnetic head device of the embodiment I-6 is different from that of the embodiment I-5 in that a rigid body portion 25 is formed in one piece with an intermediary portion 133 of a suspension 14 by composite molding (insert molding, outsert molding or the like), and a second holding portion 24 also is formed in one piece with the rigid body portion 25 by the above-mentioned composite molding.

Since the rigid body portion 25 is formed entirely in the longitudinal direction of the intermediary portion 133 (the direction X) by composite molding, it is possible to make the intermediary portion 133 into a rigid body by keeping it in a flat plate shape. This eliminates the need for a draw rib 137, thus improving the accuracy of a bending angle of the suspension 14.

As is described above, in accordance with the magnetic head device of the embodiment I-6, since the draw rib 137 is not necessary, the accuracy of the bending angle of the suspension 14 is improved, thereby further stabilizing a pressing load of the head main body 12 against the optomagnetic disk 1, in addition to the effects of the embodiment I-5.

Accordingly, by reducing a load margin that has been set considering a variation of the pressing load at the time of designing, the pressing load of the head main body 12 against the optomagnetic disk 1 is reduced, thereby lowering a load to a spindle motor due to the decrease of the sliding friction. As a result, power consumption of the optomagnetic recording/reproducing apparatus can be reduced.

In the above embodiment I-6, the rigid body portion 25 is provided in the intermediary portion 133 by composite molding, and the second holding portion 24 also is formed in one piece with the rigid body portion 25 by the composite molding. However, the present invention I is not limited to such a structure. For example, the intermediary portion may be an intermediary portion 33 provided with the draw rib 137 as in the embodiments I-1 to I-5, and only the second holding portion 24 may be formed in one piece in a predetermined position of the second elastic portion 34 by composite molding.

In the above embodiments I-1 to I-6, the magnetic head device provided with the head main body gliding in contact over the information recording medium was discussed as examples. However, the present invention I is not limited to such magnetic head devices. For example, the present invention I can be applied to a magnetic head device in which, by the rotation of the information recording medium, the head main body floats while maintaining substantially a constant distance therefrom.

Also, the information recording medium of the present invention I includes various kinds of recording media that need a magnetic head for recording, reproducing or erasing information, and may be the one adopting, for example, a magnetic recording system or the like instead of the optomagnetic recording system.

[The invention II]

The following is a description of embodiments of the present invention II, with reference to accompanying drawings.

(Embodiment II-1)

Figure 28:
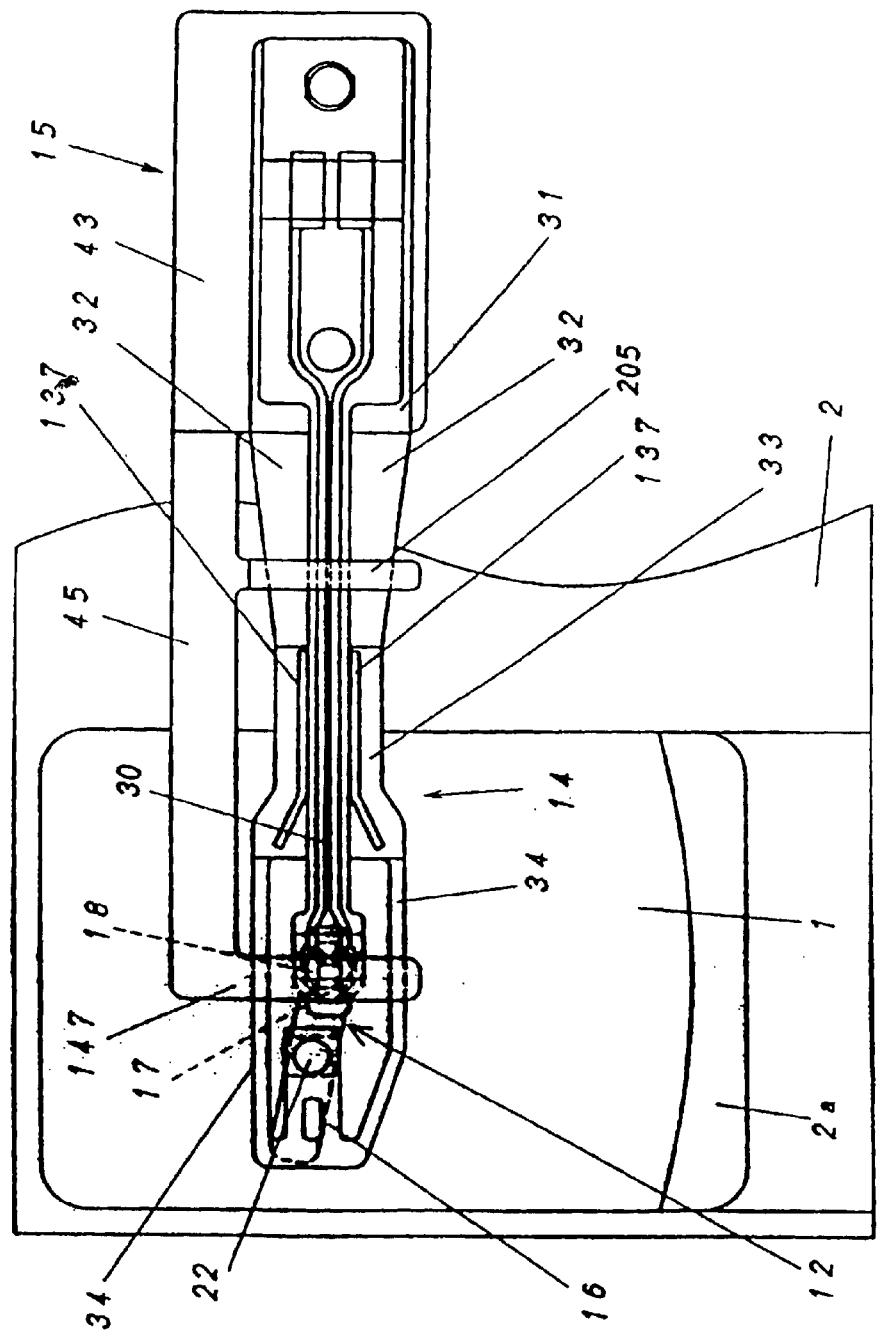
FIG. 28 is a plan view of a magnetic head device of an embodiment II-1 of the present invention II.
Figure 29:
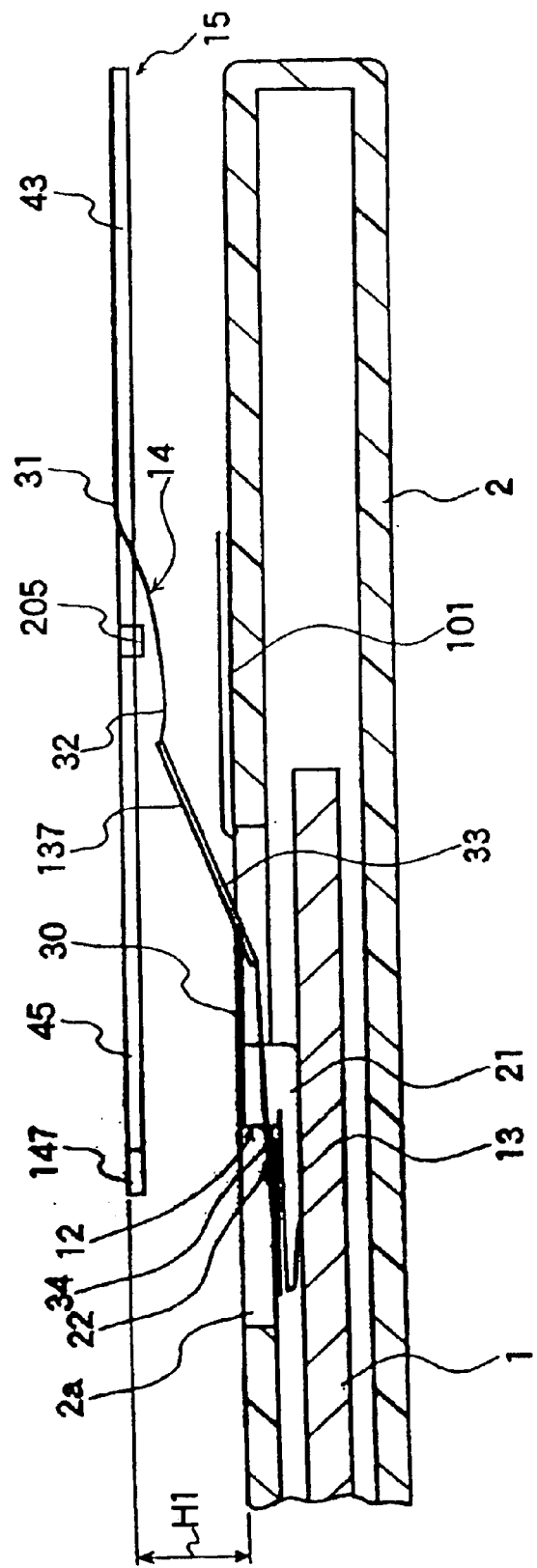
FIG. 29 is a side view of the magnetic head device of the embodiment II-1 of the present invention II in use.
Figure 30:
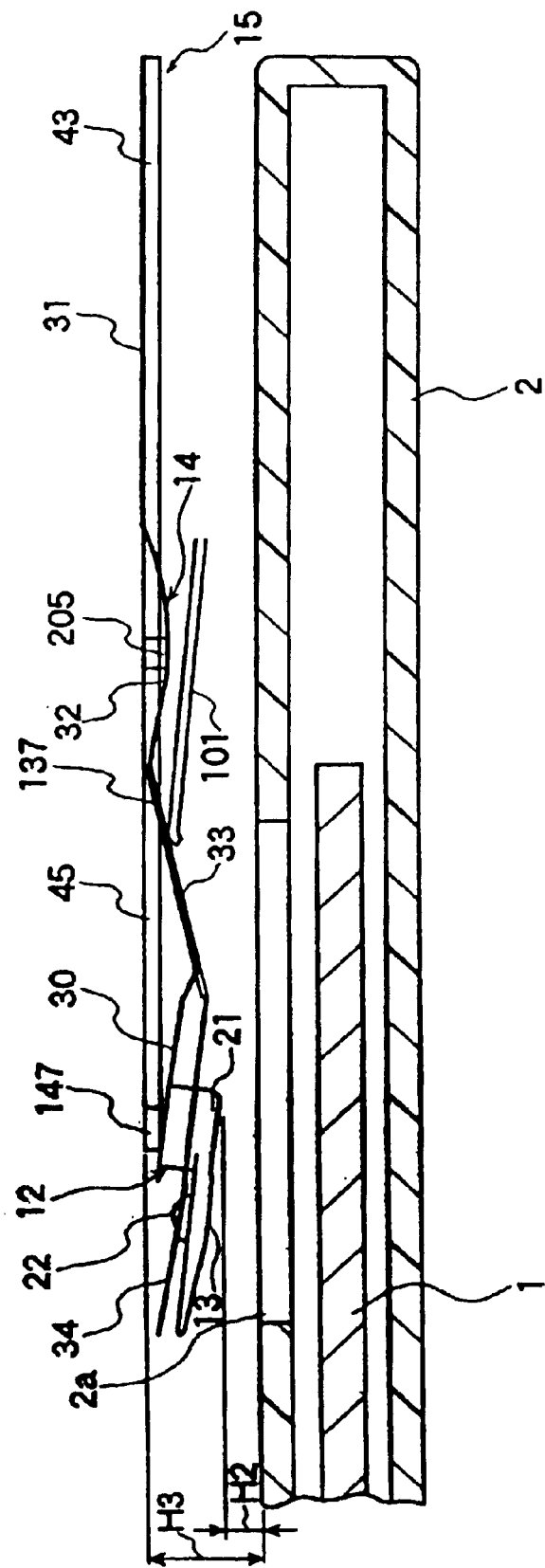
FIG. 30 is a side view of the magnetic head device of the embodiment II-1 of the present invention II not in use.
Figure 31:
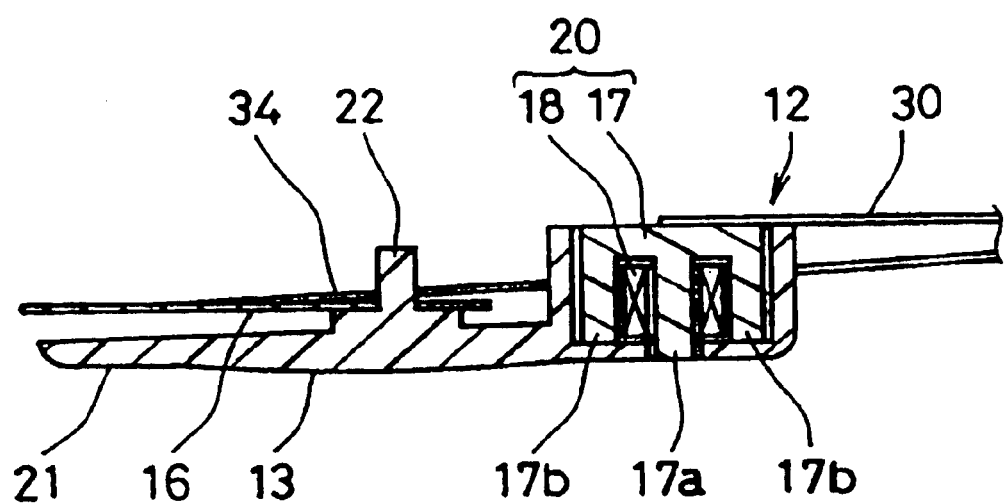
FIG. 31 is a sectional side view of a head main body of the magnetic head device of the embodiment II-1 of the present invention II.
Figure 32:
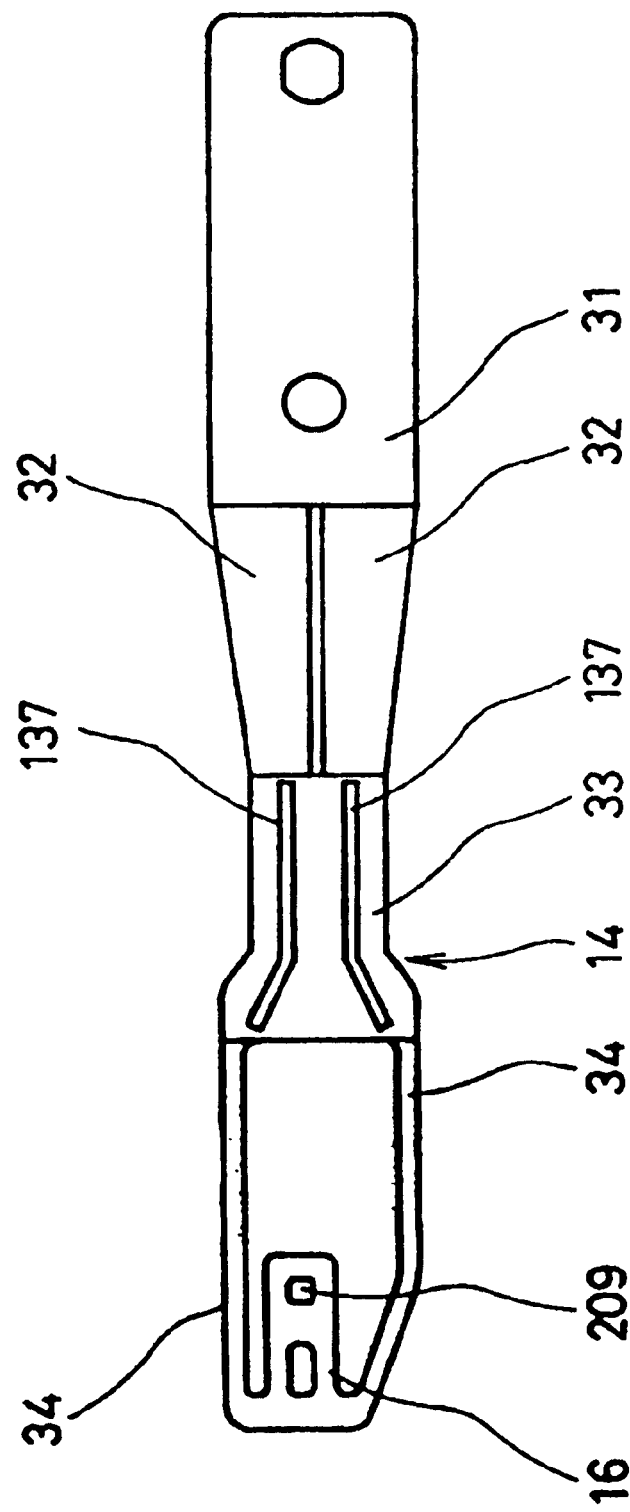
FIG. 32 is a plan view of a suspension of the magnetic head device of the embodiment II-1 of the present invention II.
Figure 33:
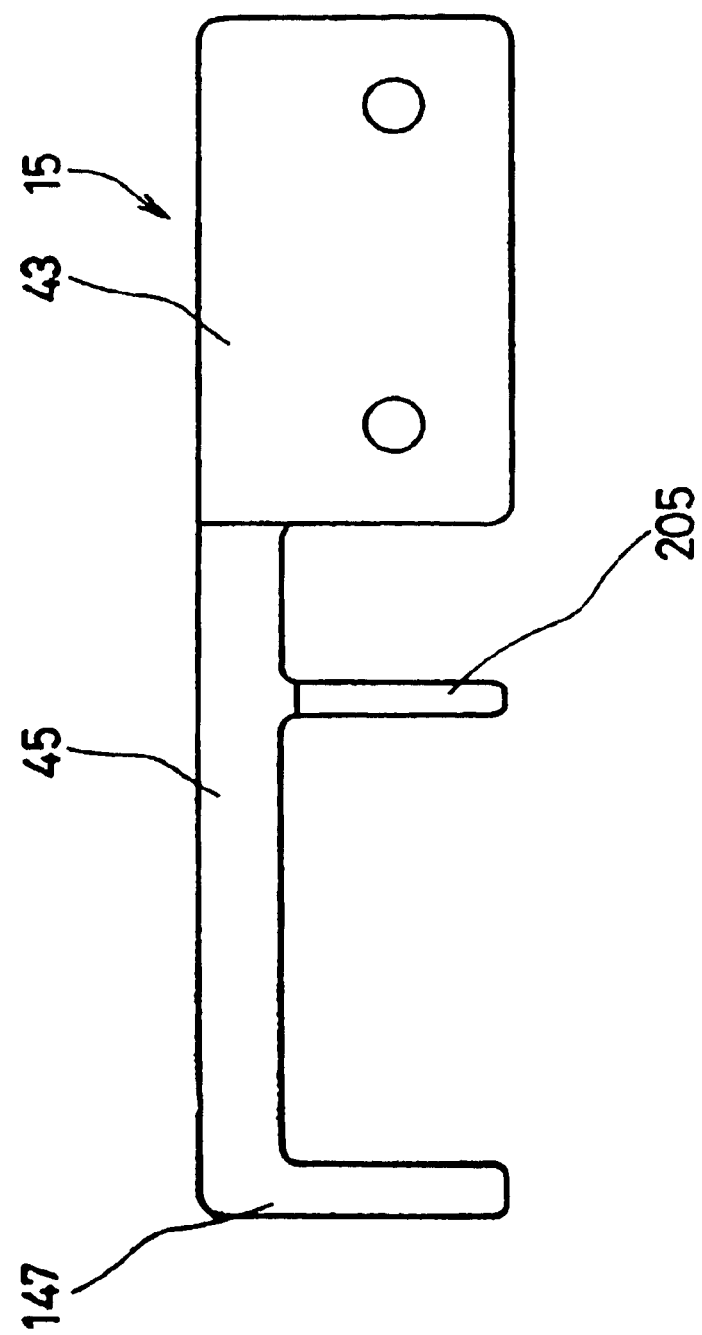
FIG. 33 is a plan view of a fastening member of the magnetic head device of the embodiment II-1 of the present invention II.

FIG. 28 is a plan view of a magnetic head device of an embodiment II-1 of the present invention II, FIG. 29 is a side view showing a state of the magnetic head device shown in FIG. 28 in use, FIG. 30 is a side view showing a state of the magnetic head device shown in FIG. 28 not in use, FIG. 31 is a sectional side view of a head main body of the magnetic head device shown in FIG. 28, FIG. 32 is a plan view of a suspension of the magnetic head device shown in FIG. 28, and FIG. 33 is a plan view of a fastening member of the magnetic head device shown in FIG. 28.

The same reference numerals are given to components having the same functions as in the conventional examples shown in FIGS. 42 to 45, and detailed descriptions thereof are omitted here.

In FIGS. 28 to 33, numeral 14 denotes a suspension, which is made of a thin spring material such as SUS304 or BeCu. The suspension 14 has a planar attaching portion 31 at one end, a first elastic portion 32 that is extended from one end of the attaching portion 31, provided with a slit in the center and provided for following surface vibration of an optomagnetic disk 1 and applying an entire load, an intermediary portion 33 that is extended from the first elastic portion 32 while being inclined at a predetermined angle so as not to interfere with a cartridge 2 and formed to be a rigid body by being provided with draw ribs 137 formed by draw forming, a second elastic portion 34 that is extended from the intermediary portion 33 while being inclined at a predetermined angle with respect to the intermediary portion 33 and provided for following the surface shape of the optomagnetic disk 1, and a gimbal 16 that is disposed at the free end of the second elastic portion 34. The suspension 14 is configured by forming these in one piece.

Numeral 15 denotes a fastening member made of a metal plate of such as iron or SUS. The fastening member 15 has a supporting portion 43 for fastening the attaching portion 31 of the suspension 14, an arm portion 45 that is extended like an arm from one side of the supporting portion 43, a first contacting portion 205 protruding from the arm portion 45 at a right angle so as to oppose the supporting portion 43 and a stopper portion 147 that is provided at the front end of the arm portion 45 by being bent at a right angle so as to oppose the supporting portion 43. The fastening member 15 is configured by forming these in one piece. The first contacting portion 205 is located above the first elastic portion 32, and formed like a step by being bent so as to protrude from the surface of the arm portion 45 toward the side of the optomagnetic disk 1.

Numeral 12 denotes a head main body. A wound coil 18 is fixed to a central magnetic pole core 17a of an E-shaped ferrite magnetic pole core 17 including the central magnetic pole core 17a and side magnetic pole cores 17b so as to form a magnetic head element 20. This magnetic head element 20 is attached integrally to a slider 21 made of resin with excellent sliding characteristics, for example, polyphenylene sulfide or liquid crystal polymer, such that an open end of the E-shaped magnetic pole core 17 opposes the optomagnetic disk 1, thereby forming the head main body 12.

Numeral 13 denotes a sliding portion, which is formed integrally on a surface of the slider 21 opposing the optomagnetic disk 1 so as to have a circular arc section, thereby gliding constantly in point contact over the optomagnetic disk 1 in a smooth manner.

Numeral 30 denotes a flexible printed board. One end thereof is adhered to the head main body 12, while the other end is adhered to the attaching portion 31 of the suspension 14. One end of the flexible printed board 30 is soldered to both ends of a lead wire of the coil 18, while the other end is connected to a driving circuit of the magnetic head device, which is not shown in the figure.

The head main body 12 is fastened by inserting its joining portion 22 into a supporting hole (supporting portion) 209 of the suspension 14 and adhering them by welding or gluing. The attaching portion 31 of the suspension 14 is fastened to the supporting portion 43 of the fastening member 15 by laser spot welding.

Numeral 101 denotes a lifter, which is made of, for example, stainless steel, iron or resin. The lifter 101 rotates around a rotating joint, which is not shown in the figure, and contacts the intermediary portion 33 when the magnetic head device is not used.

When the magnetic head device is used (in recording), the first contacting portion 205 and the first elastic portion 32 are arranged with a gap therebetween as shown in FIG. 29. Also, the lifter 101 is arranged so as to be spaced away from the magnetic head device.

When the magnetic head device is used, the fastening member 15 protrudes the most beyond the upper surface of the cartridge 2. The thickness of the magnetic head device is defined by a height H1 that is a distance from the upper surface of the cartridge 2 to the upper surface of the fastening member 15.

Next, when the magnetic head device is not used, the lifter 101 lifts the intermediary portion 33 such that the head main body 12 does not contact the cartridge 2 by maintaining a gap H2, as shown in FIG. 30.

The lifter 101 rotates around the rotating joint, which is not shown in the figure, and contacts the intermediary portion 33. At this time, a fastened end (a portion connected to the attaching portion 31) of the first elastic portion 32 serves as the center of rotation, so that the head main body 12 is lifted by the lifter 101. When the first elastic portion 32 contacts the first contacting portion 205, the first elastic portion 32 is deformed elastically, so that the head main body 12 is rotated around the contacting portion of the first elastic portion 32 and the first contacting portion 205 so as to be further lifted. Thus, if the lifting amount of the head main body 12 equals that in the conventional example, namely, H2, the intermediary portion 33 is further rotated. In other words, when the head main body 12 is lifted to the position that can maintain the gap H2 between the head main body 12 and the cartridge 2, the angle of inclination of the intermediary portion 33 becomes close to parallel to the recording surface of the optomagnetic disk 1. Consequently, the intermediary portion 33 does not protrude beyond the fastening member 15 toward the side opposite to the optomagnetic disk 1 (the upper surface side).

Since the fastening member 15 is arranged so as to be spaced away from the cartridge 2 here, it does not have to be lifted by the lifter 101.

Also, the upper surface of the head main body 12 contacts a stopper portion 147 as in the conventional example. This prevents the head main body 12 from protruding upward beyond the fastening member 15.

Thus, the thickness H3 of the magnetic head device not in use can be made equal to the thickness H1 of the magnetic head device in use.

In the present embodiment II-1, the first contacting portion 205 protruded from the arm portion 45 by being bent toward the side of the optomagnetic disk 1, but it may be formed so as to protrude partially by draw forming. Also, the first contacting portion 205 may be made of resin and formed by integral molding or gluing.

In addition, a similar effect can be achieved by forming the first contacting portion 205 in the same plane as the arm portion 45 and forming a protruding portion made of resin by integral molding or gluing on the first elastic portion 32 on the side opposite to the optomagnetic disk 1 in the position to be in contact with the first contacting portion 205.

As described above, in accordance with the magnetic head device of the embodiment II-1 of the present invention II, the first contacting portion 205 is disposed on the arm portion 45. When the magnetic head device is not used, the first contacting portion 205 contacts the first elastic portion 83 so that the first elastic portion 32 is deformed elastically. Consequently, the thickness H3 of the magnetic head device not in use can be made equal to the thickness H1 of the magnetic head device in use, thereby achieving a thinner optomagnetic recording/reproducing apparatus.

(Embodiment II-2)

Figure 34:
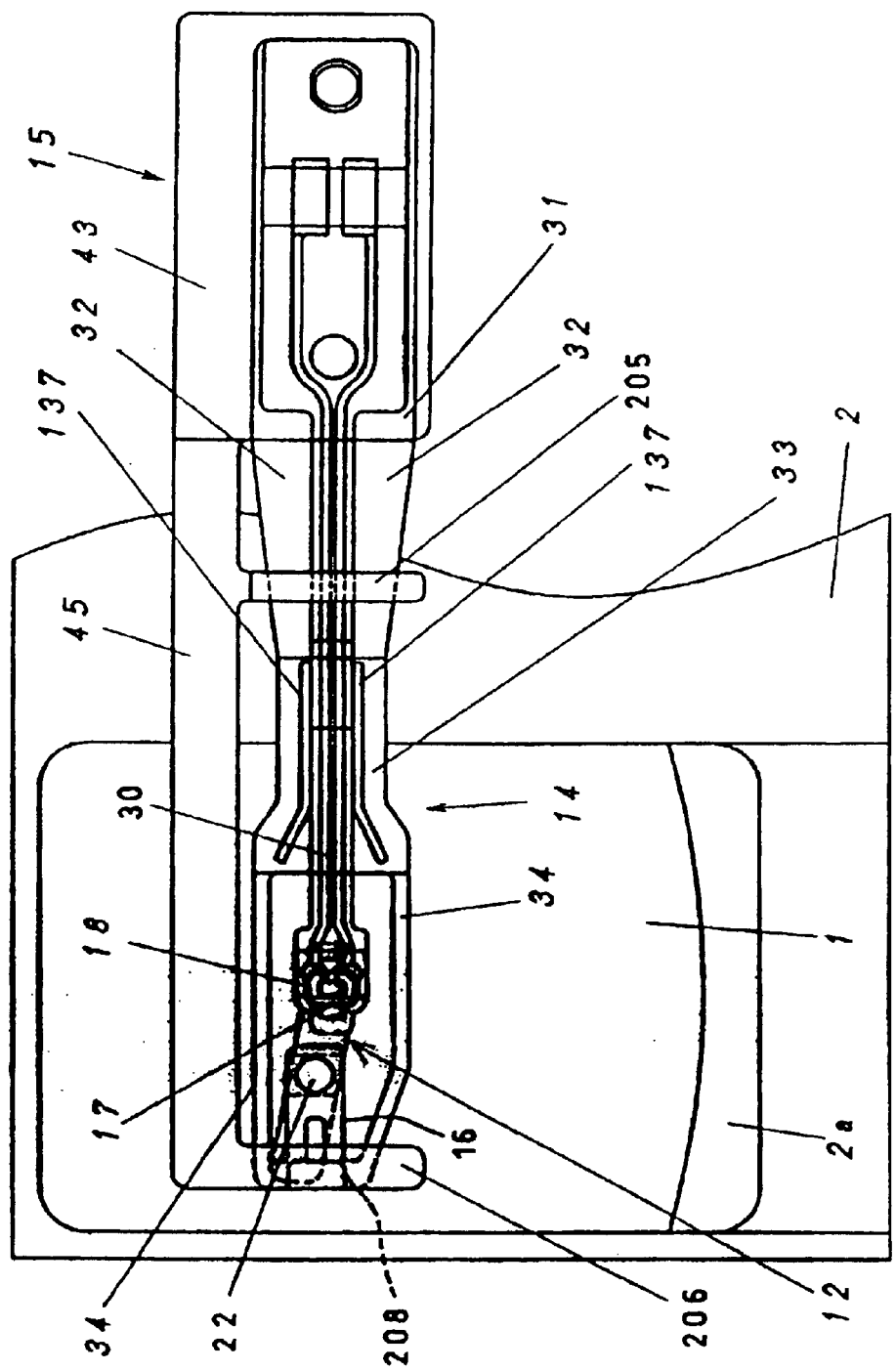
FIG. 34 is a plan view of a magnetic head device of an embodiment II-2 of the present invention II.
Figure 35:
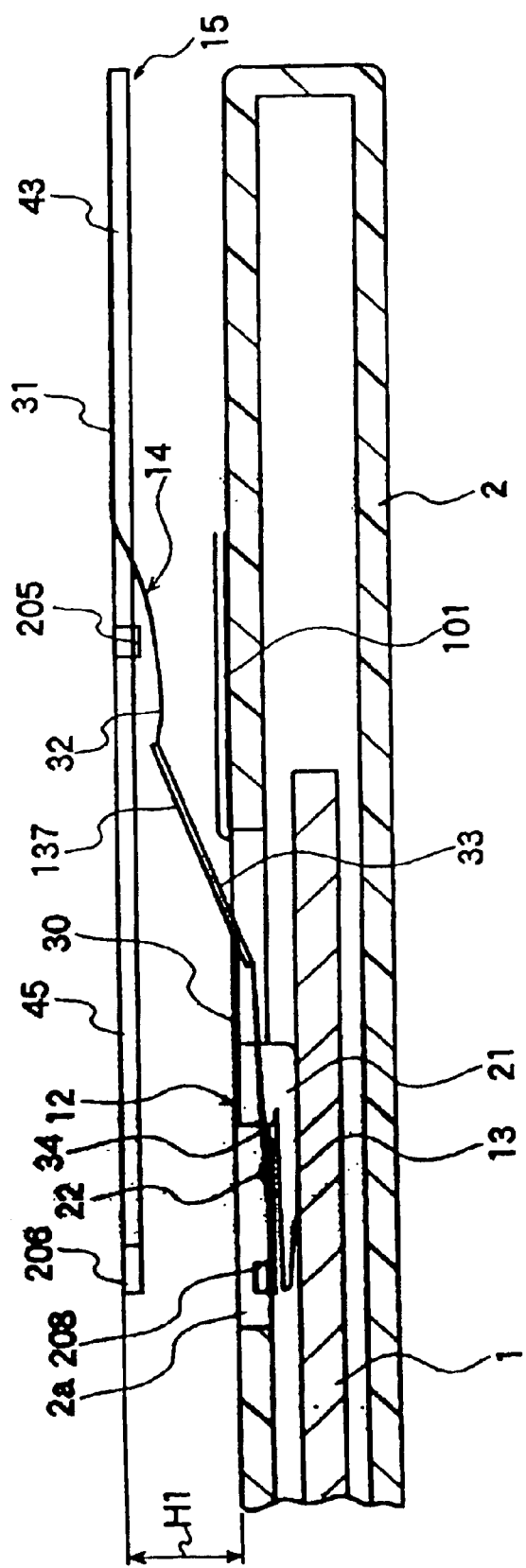
FIG. 35 is a side view of the magnetic head device of the embodiment II-2 of the present invention II in use.
Figure 36:
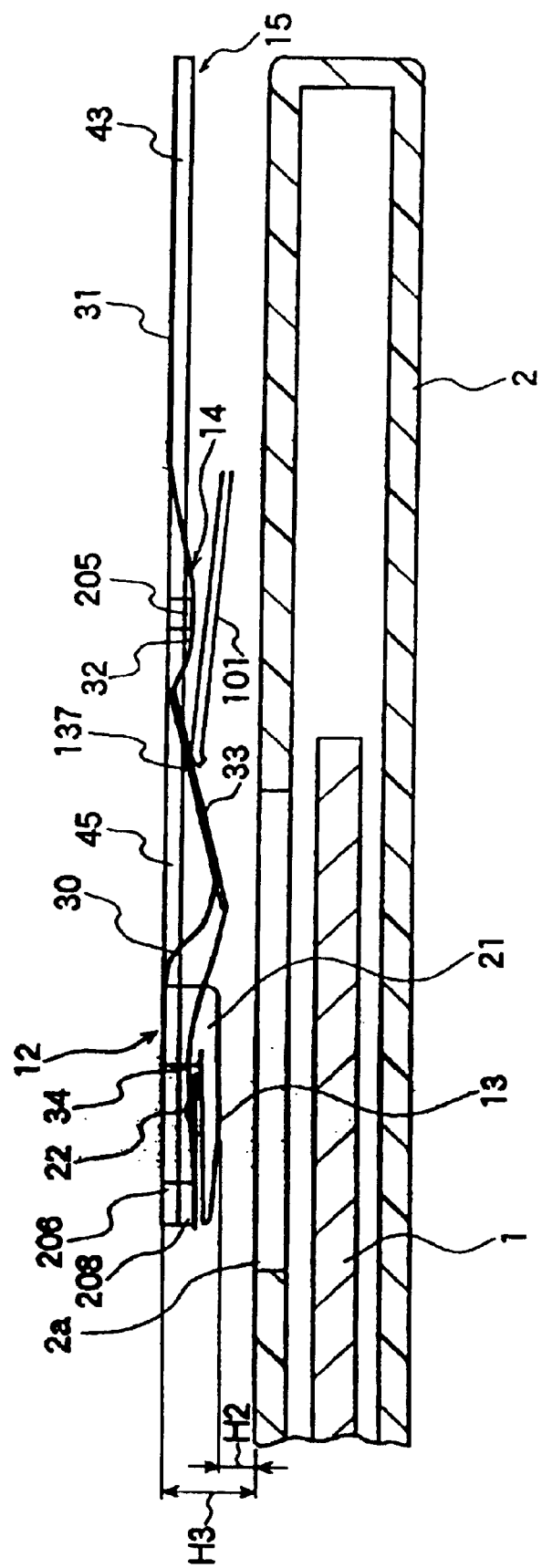
FIG. 36 is a side view of the magnetic head device of the embodiment II-2 of the present invention II not in use.
Figure 37:
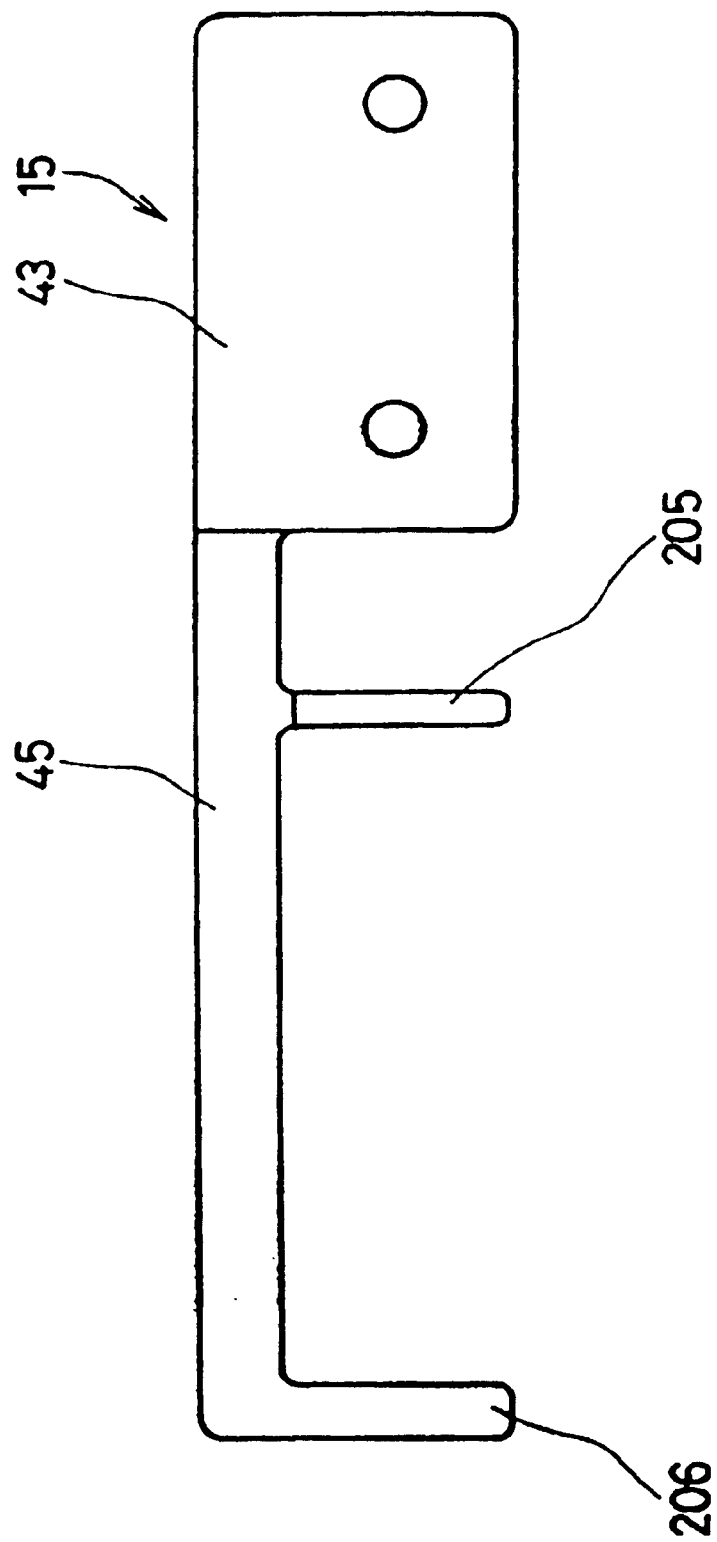
FIG. 37 is a plan view of a fastening member of the magnetic head device of the embodiment II-2 of the present invention II.

The following is a description of a magnetic head device according to an embodiment II-2, with reference to FIGS. 34 to 37. FIG. 34 is a plan view of the magnetic head device of the embodiment II-2 of the present invention II, FIG. 35 is a side view of the magnetic head device shown in FIG. 34 in use, FIG. 36 is a side view of the magnetic head device shown in FIG. 34 not in use, and FIG. 37 is a plan view of a fastening member of the magnetic head device shown in FIG. 34.

The magnetic head device of the embodiment II-2 is different from that of the embodiment II-1 in that, instead of a stopper portion 147, a second contacting portion 206 is provided in a front end of an arm portion 45 by being bent at a right angle so as to oppose a supporting portion 43. The second contacting portion 206 is present on the side of a free end of the suspension 14 with respect to a joining portion of the suspension 14 with a head main body 12 (a supporting hole 209 of the suspension 14).

It is preferable that a convex portion 208 is formed at the free end of a second elastic portion 34 on the side opposite to an optomagnetic disk 1 so as to contact the second contacting portion 206. The convex portion 208 can be formed by bending the free end of the second elastic portion 34 or by draw forming. Also, the convex portion 208 may be formed by integral molding or gluing of resin.

In addition, a protrusion may be provided on the second contacting portion 206 on the side of the optomagnetic disk 1 by bending or draw forming. Also, a protrusion may be provided on the second contacting portion 206 on the side of the optomagnetic disk 1 by integral molding or gluing of resin.

As shown in FIG. 35, when the magnetic head device is used, the second contacting portion 206 is arranged so as to be spaced away from the head main body 12.

As shown in FIG. 36, when the magnetic head device is not used, a lifter 101 lifts an intermediary portion 33. At this time, a first elastic portion 32 contacts a first contacting portion 205 as in the embodiment II-1, while the free end of the second elastic portion 34 contacts the second contacting portion 206. Accordingly, the second elastic portion 34 is deformed elastically, so that the head main body 12 becomes substantially parallel to a recording surface of the optomagnetic disk 1 (i.e., a surface of a magnetic pole core 17 opposing the recording surface of the optomagnetic disk 1 is substantially parallel to the recording surface). In other words, the distance in the direction perpendicular to the recording surface (the thickness) of the head main body 12 becomes substantially minimal. As a result, even when maintaining a gap H2 between a cartridge 2 and the head main body 12, it is possible to shorten the distance from the cartridge 2 to the upper surface of the head main body 12 in the direction perpendicular to the recording surface of the optomagnetic disk 1. Thus, the thicknesses H1 and H3 of the magnetic head device can be further reduced.

Also, when the magnetic head device is not used, it is preferable that the distance between the upper surface of the head main body 12 and the upper surface of the second elastic portion 34 that is in contact with the second contacting portion 206 in the normal direction of the recording surface of the optomagnetic disk 1 equals the distance from the surface of the second contacting portion 206 in contact with the second elastic portion 34 to the upper surface of a fastening member 15. It is preferable that the height of the convex portion 208 of the second elastic portion 34 and the protruding amount of the second contacting portion 206 in the direction of the optomagnetic disk 1 are determined so as to meet the above condition.

Such preferable examples can prevent the head main body 12 from protruding beyond the upper surface of the fastening member 15. In addition, the upper surface of the head main body 12 substantially matches the upper surface of the fastening member 15. As a result, the distance. H3 consists only of the thickness of the head main body 12 and the gap H2 between the cartridge 2 and the head main body 12, thereby achieving a still thinner magnetic head device.

As described above, in accordance with the magnetic head device of the embodiment II-2, the second contacting portion 206 that is formed in the front end of the arm portion 45 by being bent at a right angle so as to oppose the supporting portion 43 is provided on the side of a free end of the suspension 14 with respect to the joining portion of the suspension 14 with the head main body 12. Thus, in addition to the effects of the embodiment II-1, it is possible to make the magnetic head device still thinner, achieving still thinner optomagnetic recording/reproducing apparatus.

In the above examples, when the magnetic head device is not used, the contacting portion 206 was in contact with the free end of the second elastic portion 34, but can be in contact with the head main body 12 (preferably, the front end portion of the head main body 12) instead. In this case also, it is preferable that the head main body 12 in contact with the second contacting portion 206 does not protrude upward beyond the fastening member 15 (more preferably, the upper surfaces of them substantially match) and is substantially parallel to the optomagnetic disk 1. In order to achieve this, it is possible that the second contacting portion 206 protrudes on the side of the optomagnetic disk 1, or that a convex portion with a predetermined height is disposed on the contacting portion of the head main body 12.

(Embodiment II-3)

Figure 38:
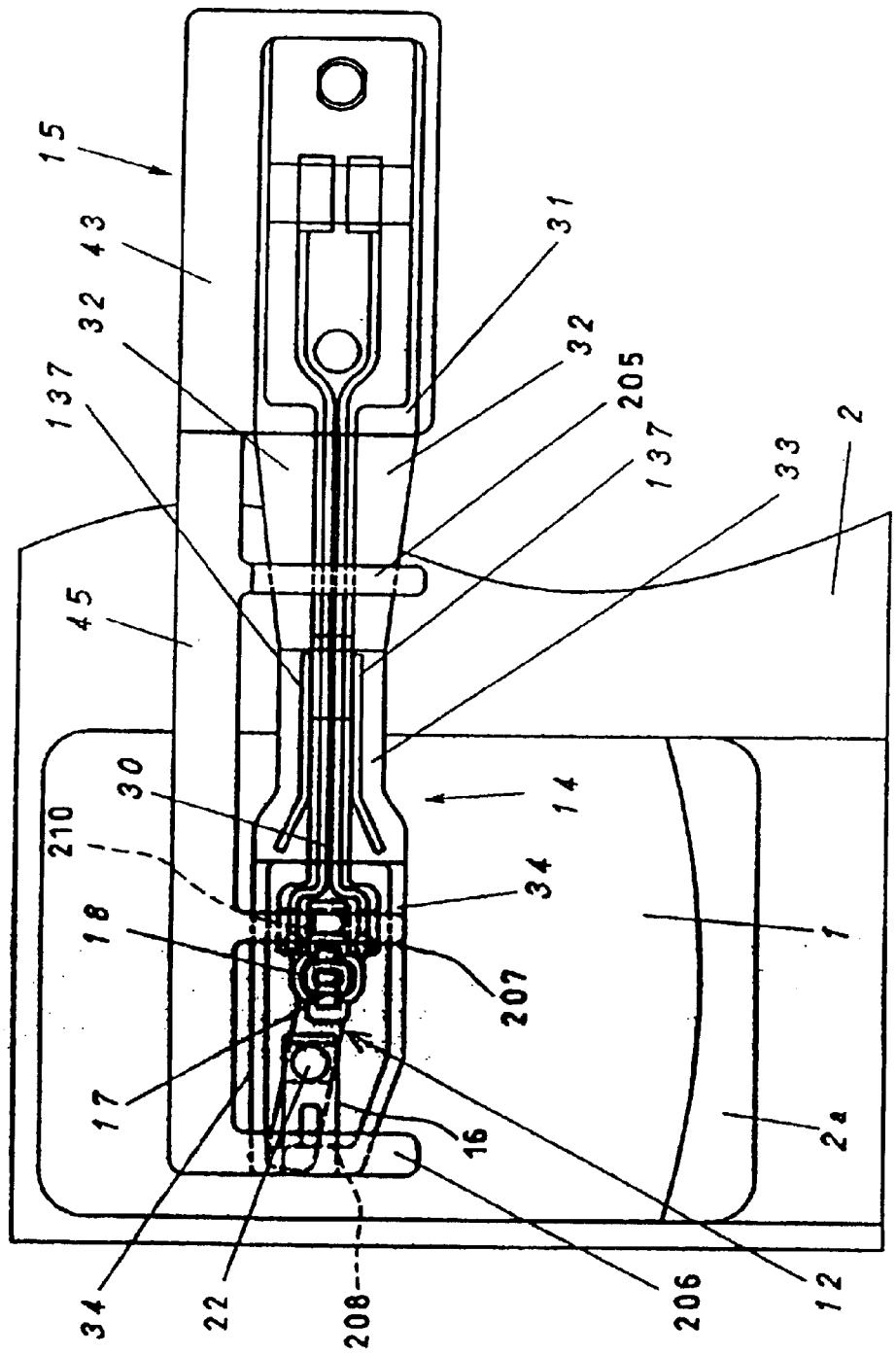
FIG. 38 is a plan view of a magnetic head device of an embodiment II-3 of the present invention II.
Figure 39:
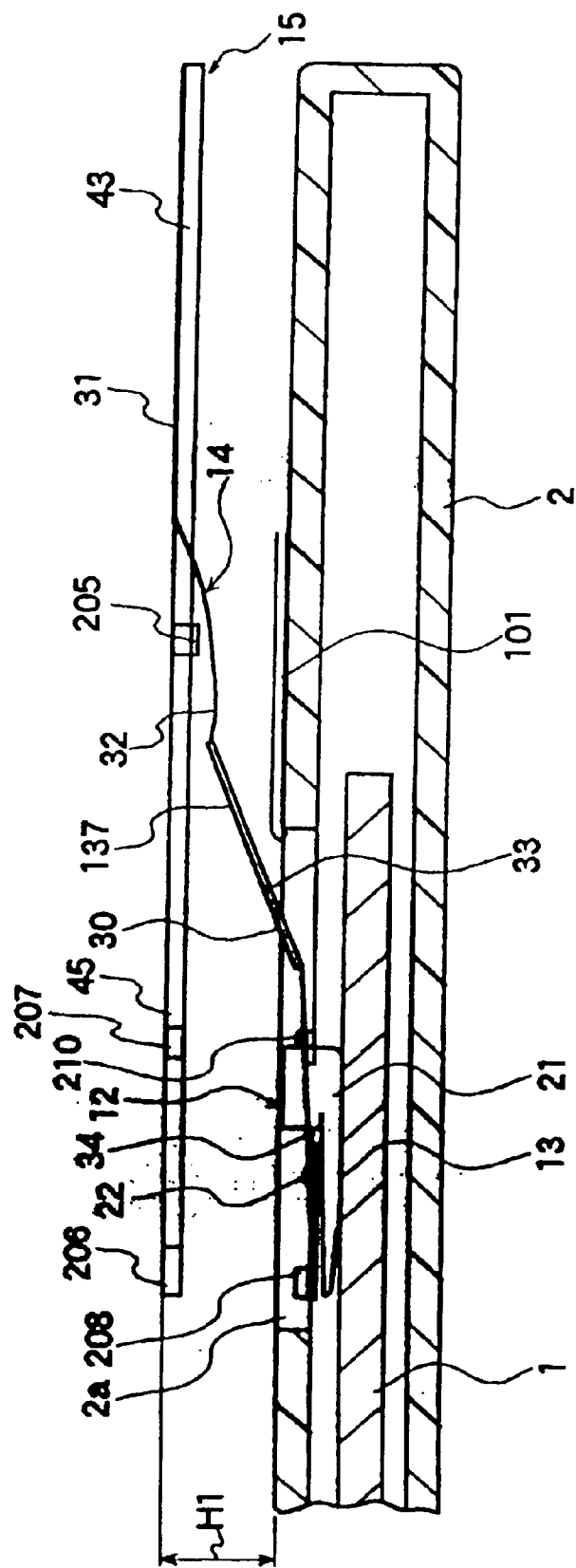
FIG. 39 is a side view of the magnetic head device of the embodiment II-3 of the present invention II in use.
Figure 40:
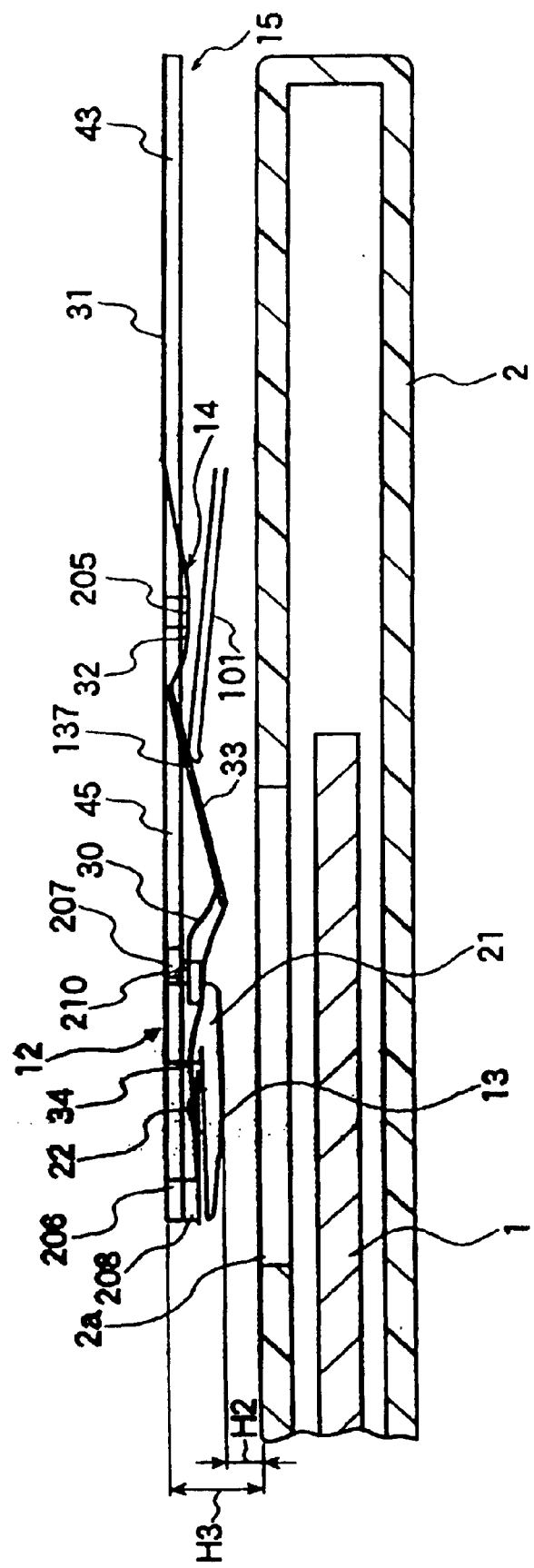
FIG. 40 is a side view of the magnetic head device of the embodiment II-3 of the present invention II not in use.
Figure 41:
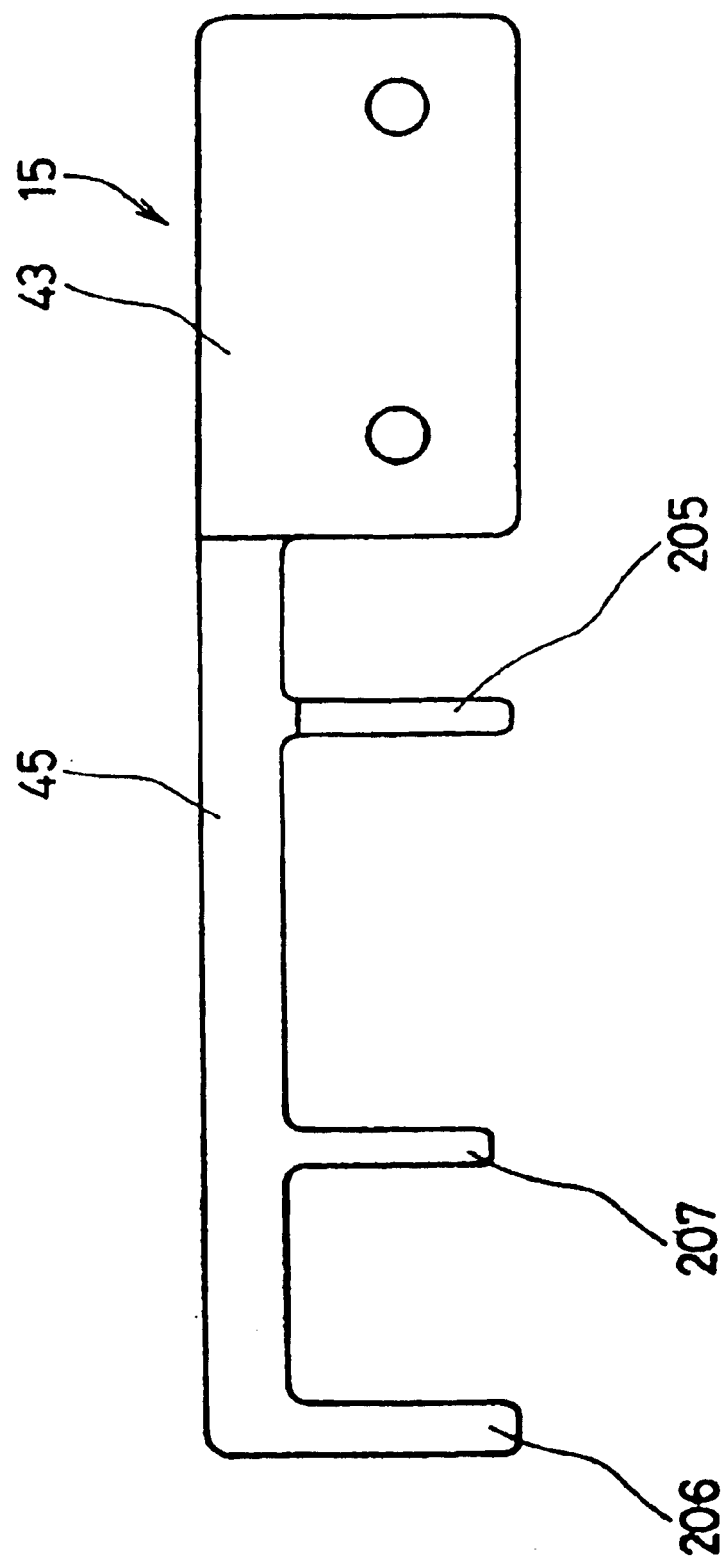
FIG. 41 is a plan view of a fastening member of the magnetic head device of the embodiment II-3 of the present invention II.
Figure 42:
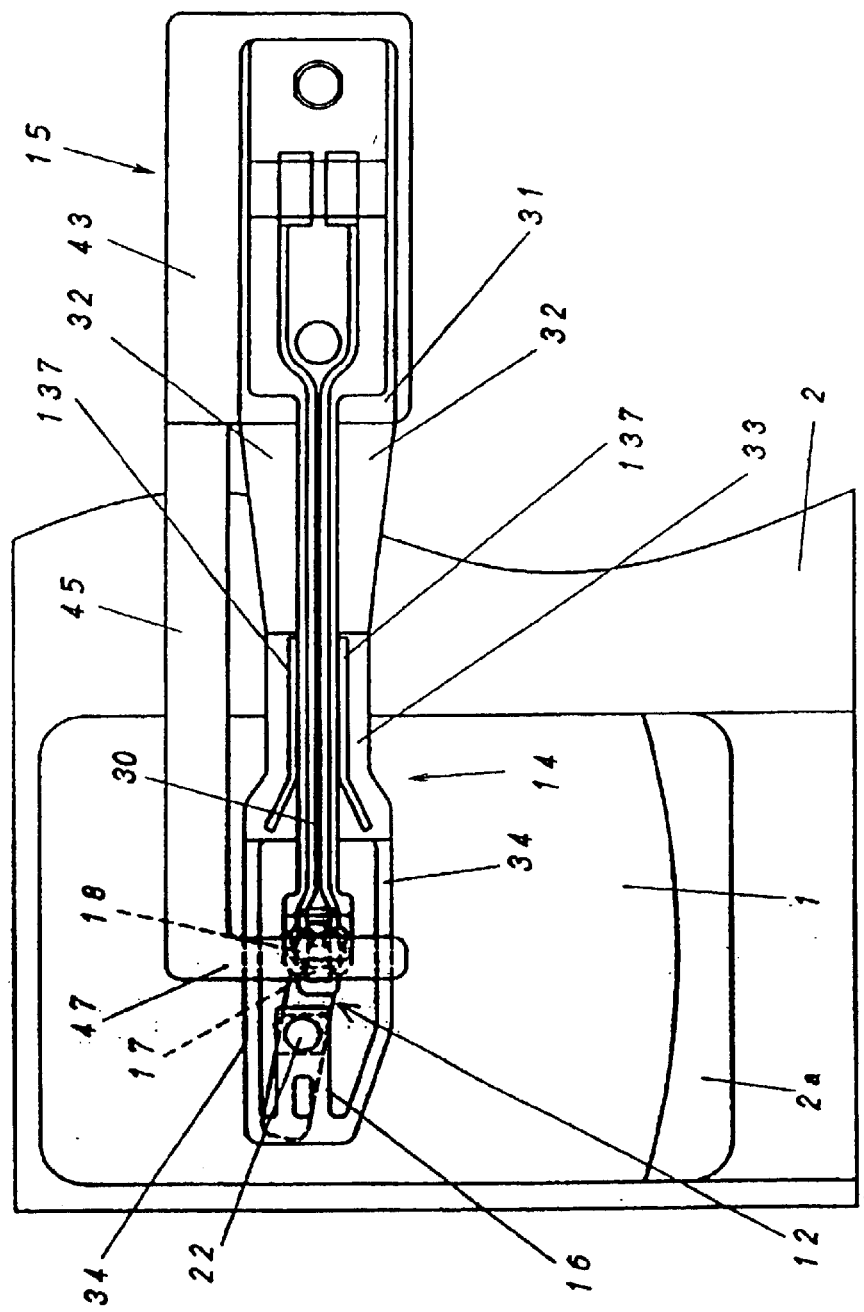
FIG. 42 is a plan view of a conventional magnetic head device.
Figure 43:
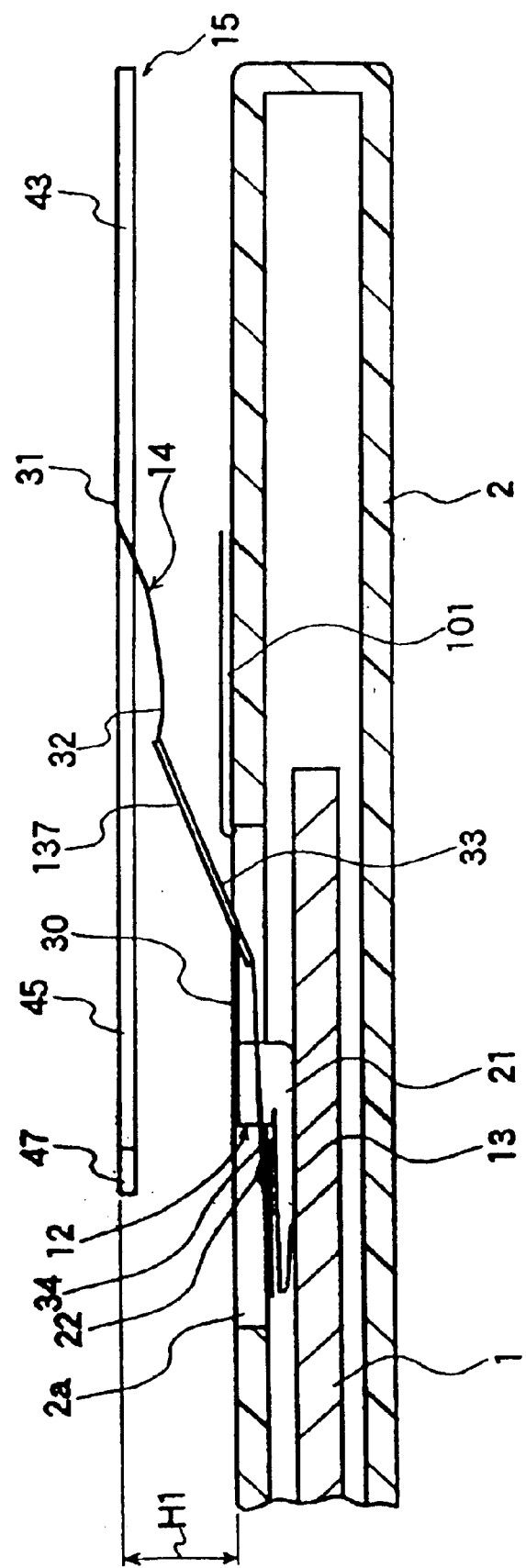
FIG. 43 is a side view of the conventional magnetic head device in use.
Figure 44:
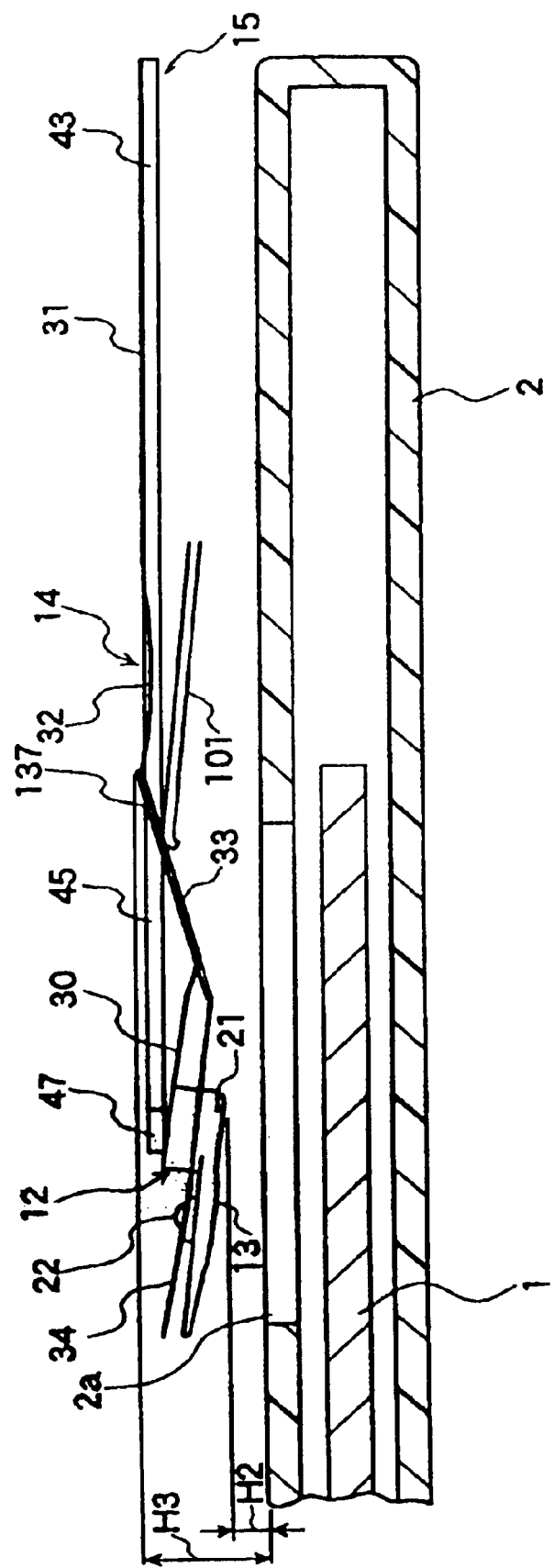
FIG. 44 is a side view of the conventional magnetic head device not in use.
Figure 45:
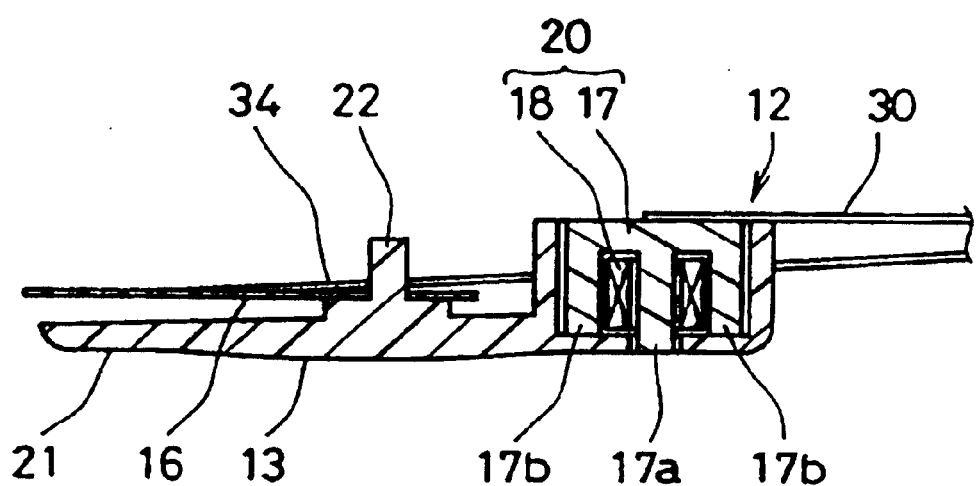
FIG. 45 is a sectional side view of a head main body of the conventional magnetic head device.
Figure 46:
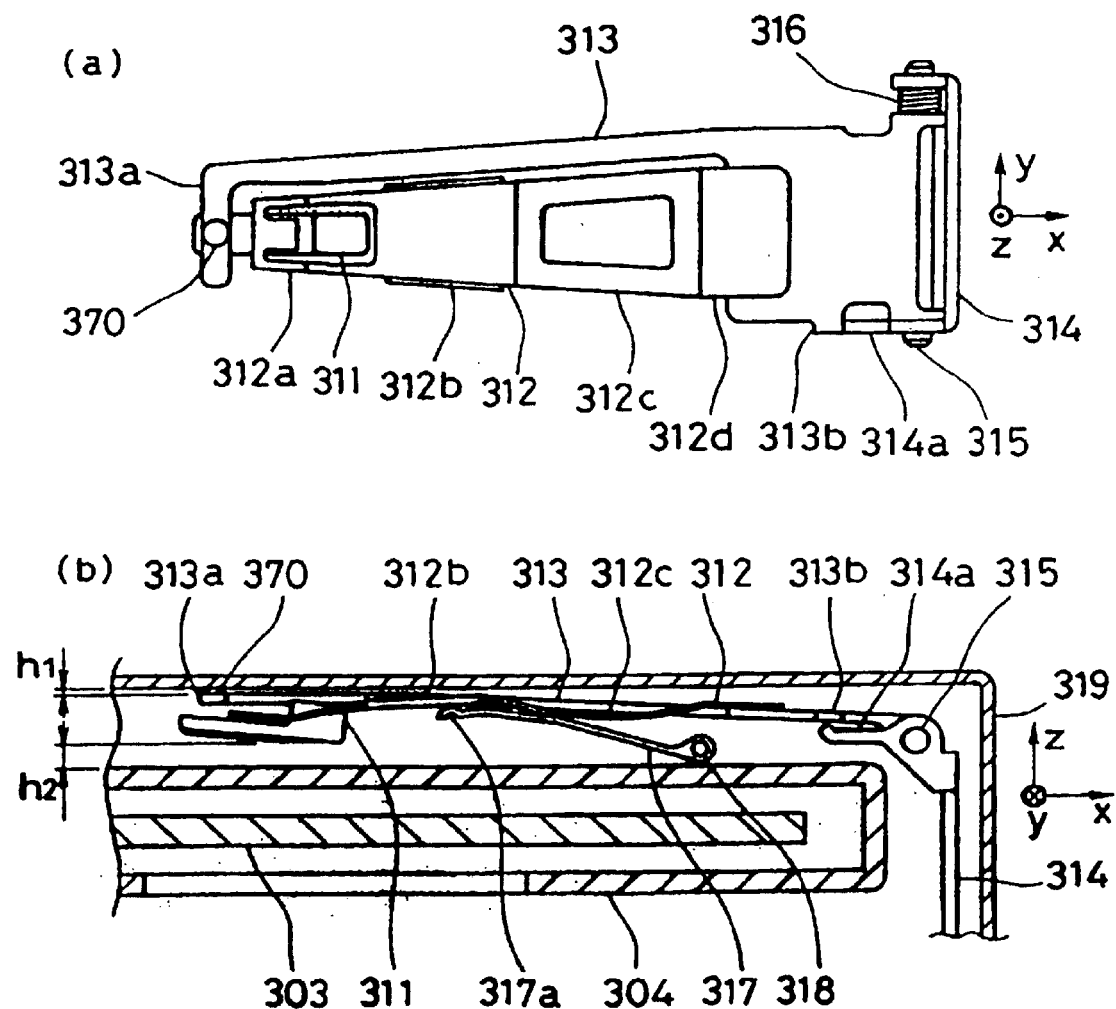
FIG. 46(a) is a plan view showing an entire structure of a magnetic head device of an embodiment III-1 of the present invention III.
FIG. 46(b) is a sectional view showing a main portion of a recording/reproducing apparatus of the embodiment III-1 when a reproducing disk is installed.

The following is a description of a magnetic head device according to an embodiment II-3, with reference to FIGS. 38 to 41. FIG. 38 is a plan view of the magnetic head device of the embodiment II-3 of the present invention II, FIG. 39 is a side view of the magnetic head device shown in FIG. 38 in use, FIG. 40 is a side view of the magnetic head device shown in FIG. 38 not in use, and FIG. 41 is a plan view of a fastening member of the magnetic head device shown in FIG. 38.

The magnetic head device of the embodiment II-3 is different from that of the embodiment II-2 in that a third contacting portion 207 is provided in an arm portion 45 so as to oppose a second contacting portion 206. The third contacting portion 206 is present on the opposite side of the second contacting portion 206 with respect to a joining portion of a suspension 14 with a head main body 12 (a supporting hole 209 of the suspension 14) (between the supporting hole 209 and a fastened end of the suspension 14).

It is preferable that a concave portion 210 is provided in the head main body 12, so that the concave portion 210 contacts the third contacting portion 207.

Also, it is preferable that, when the head main body 12 is placed horizontally with respect to a recording surface of an optomagnetic disk 1, the distance from the upper surface of the head main body 12 to the concave portion 210 equals the thickness of the third contacting portion 207.

One end of a flexible printed board 30 is adhered to the concave portion 210, while the other end is adhered to an attaching portion 31.

As shown in FIG. 39, when the magnetic head device is used, the third contacting portion 207 is arranged so as to be spaced away from the head main body 12.

As shown in FIG. 40, when the magnetic head device is not used, a lifter 101 lifts an intermediary portion 33. At this time, a first elastic portion 32 contacts a first contacting portion 205 and the free end of the second elastic portion 34 contacts the second contacting portion 206 as in the embodiment II-2, while the concave portion 210 provided in the head main body 12. contacts the third contacting portion 207. In this case, the head main body 12 becomes substantially parallel to a recording surface of the optomagnetic disk 1.

As shown in FIG. 31, the center of gravity of the head main body 12 does not match a joining portion 22 because the part in which a magnetic head element 20 is installed is heavy. Therefore, when a shock in the direction perpendicular to the optomagnetic disk 1 is applied to the magnetic head device not in use, the head main body 12 will be rotated around the joining portion 22 so as to be inclined. For example, when a shock in the direction away from the optomagnetic disk 1 is applied, a part of the head main body 12 near the concave portion 210 attempts to rotate in the direction away from the optomagnetic disk 1. However, the third contacting portion 207 functions as a stopper so as to prevent the rotation. As a result, the deformation of the second elastic portion 34 can be controlled within the elastic deformation range.

As described above, in accordance with the magnetic head device of the embodiment II-3, the third contacting portion 207 is provided with the arm portion 45 on the opposite side of the second contacting portion 206 with respect to the joining portion of the head main body 12 with the suspension 14, thereby improving shock resistance characteristics, in addition to the effects of the embodiments II-1 and II-2.

[The invention III]

The following is a description of embodiments of the present invention III, with reference to FIGS. 46 to 49. In every embodiment, a recording/reproducing apparatus for MDs is used as as and example, and a magnetic head main body is in an unloading state when a reproducing cartridge is used.

(Embodiment III-1)

Figure 50:
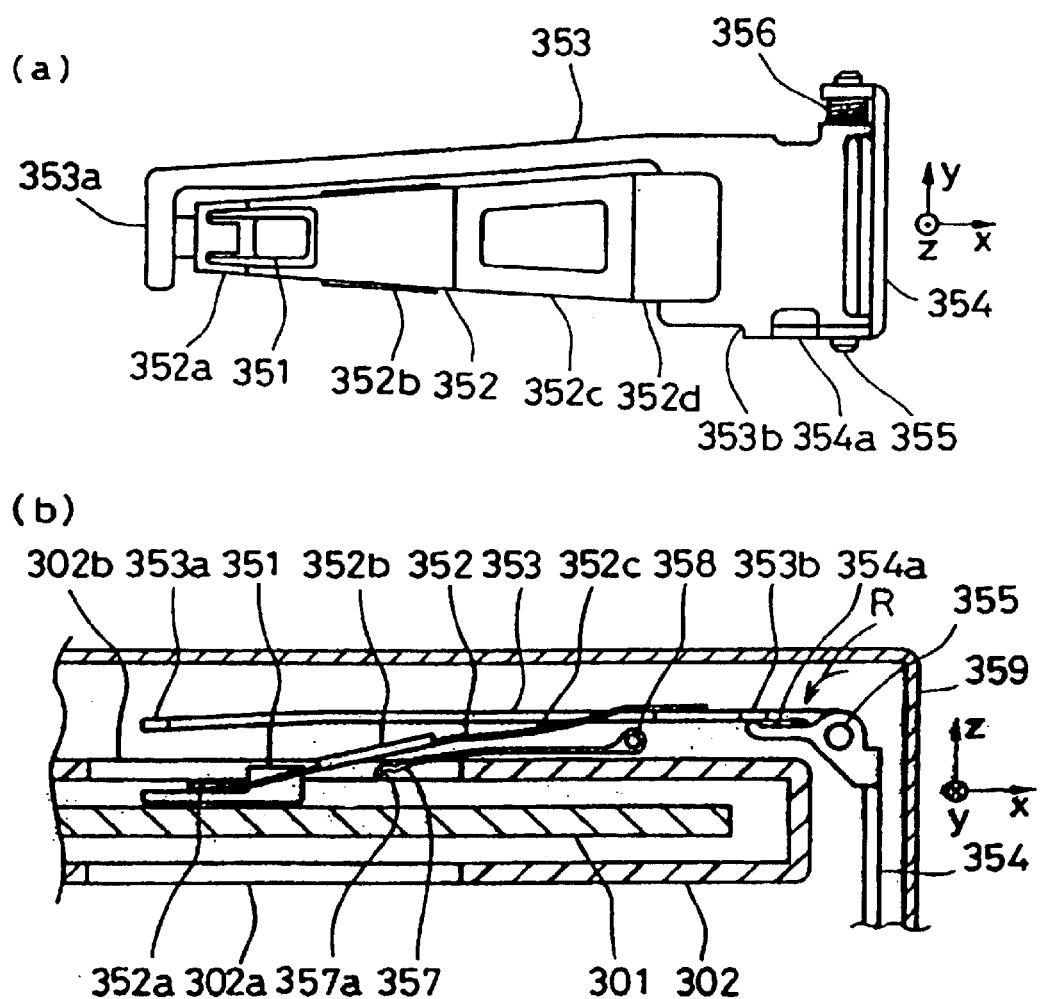
FIG. 50(a) is a plan view showing an entire structure of a conventional magnetic head device.
FIG. 50(b) is a sectional view showing a main portion of a conventional recording/reproducing apparatus when a recording disk is installed.

FIGS. 46(a) and (b) show a recording/reproducing apparatus in an embodiment III-1 of the present invention III. FIG. 46(a) is a plan view showing an entire structure of a magnetic head device, and FIG. 46(b) is a sectional view showing a main portion of the recording/reproducing apparatus when the reproducing disk is installed. As in FIGS. 50 and 51 showing a conventional example, a rectangular coordinate system is defined in the directions shown in the figure, and the positive side of the z-axis is called the upper side, the negative side thereof is called the lower side, and the length in the direction parallel to the z-axis is called the height.

Figure 51:
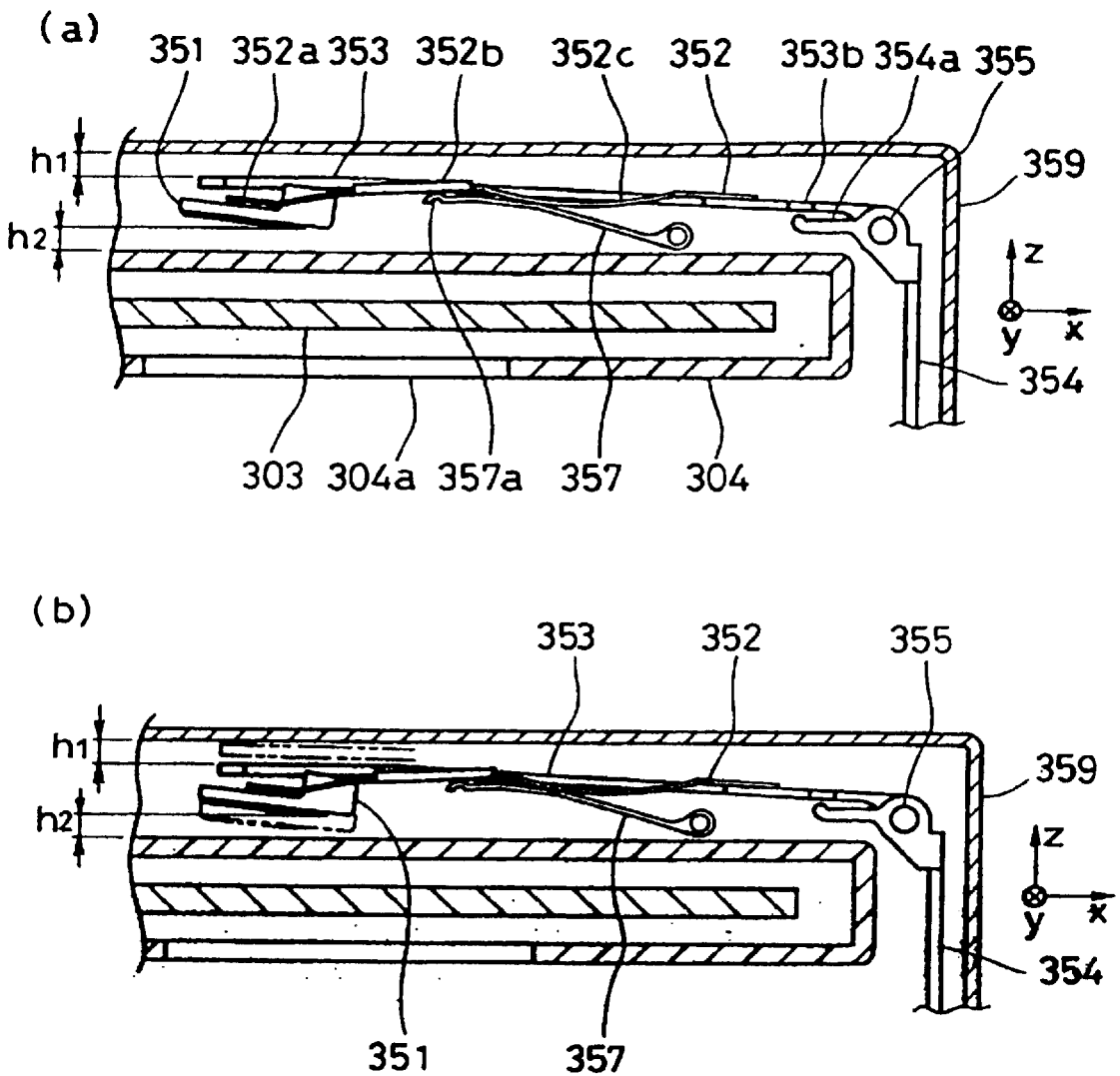
FIG. 51(a) is a sectional view showing a main portion of a conventional recording/reproducing apparatus when a reproducing disk is installed.
FIG. 51(b) is a sectional view for describing a problem in this apparatus.

A reproducing disk 303 and a reproducing cartridge 304 are the same as those in the FIG. 51. A magnetic head main body (a slider) 311, a suspension 312, a fastening member 313, an angle member 314, a shaft 315, a coil spring 316, a lifter 317 and a rotating pin 318 correspond to a magnetic head main body 351, a suspension 352, a fastening member 353, an angle member 354, a shaft 355, a coil spring 356, a lifter 357 and a rotating pin 358 in the conventional example of FIGS. 50 and 51 including details shown in subscripts of a, b, c, . . . respectively (for example, the contacting portion 317a of the lifter 317 corresponds to the contacting portion 357a of the lifter 357), and basic structures also are identical. Numeral 319 denotes an outer case as a fixed structure and corresponds to an outer case 359 in the conventional example.

In the present embodiment III-1, a sliding member 370 that contacts the inner surface of the outer case 319 and functions as a contacting portion is formed on the upper surface of a stopper portion 313a of the fastening member 313. The sliding member 370 is a substantially spherical member, and made of resin material, preferably, types having sliding characteristics. For example, it is preferable that the sliding member 370 is made of liquid crystal polymer or the like in which fluorocarbon materials or appropriate whiskers are added for improving sliding characteristics.

The following is a description of the operation in the embodiment III-1 configured as above.

The basic operation of the present embodiment III-1 is similar to that in the conventional example. However, in the unloading state, the contacting portion 317a of the lifter 317 presses the fastening member 313 upward until the sliding member 370 formed on the upper surface of the stopper portion 313a contacts the inner surface of the outer case 319, as shown in FIG. 46(b). The lifter 317 lifts the fastening member 313 with a predetermined force such that the sliding member 370 is held so as to press the inner surface of the outer case 319 with a predetermined load.

As a result, a distance h1 between the inner surface of the outer case 319 and the fastening member 313 substantially equals the thickness of the sliding member 370 and does not change. Therefore, the value of h1 here can be made considerably smaller than the distance h1 of the conventional example. In the conventional example, about 1 to 1.5 mm was required for the distance h1, but, in the present embodiment III-1, about 0.2 mm is sufficient.

Also, since there is no change in the position of the fastening member 313 in the z-axis direction, the positional change of the lower surface of the magnetic head main body 311 also is reduced, thereby considerably shortening the distance h2 between the magnetic head main body 311 and the reproducing cartridge 304. Thus, it is possible to reduce the dimension of the apparatus in the part above the reproducing cartridge 304, achieving thinner and smaller recording/reproducing apparatus.

In addition, even when there is a mechanical error, the value of h1 is determined by the thickness of the sliding member 370 after all. Therefore, it is not necessary that the lifter 317, the angle member 314 and the suspension 312 etc. have high accuracy equivalent to that in the conventional example. Consequently, it is possible to lower the cost of the recording/reproducing apparatus.

As in the conventional example, the entire magnetic head device including the magnetic head main body 311 moves in conjunction with the move of the angle member 314 in the y-axis direction. In this case, although the sliding member 370 remains in contact with the inner surface of the outer case 319, the sliding member 370 does not impose load against the move, nor does it generate noise because of its excellent sliding characteristics. Thus, the sliding member 370 can achieve thinner and lower cost recording/reproducing apparatus without causing any problem.

The sliding member 370 is attached to the stopper portion 313a of the fastening member 313 easily, and so hardly increases cost. There are some cases where the sliding member 370 can be made of the same material as that of the magnetic head main body 311. In this case, it is also possible to lower cost and increase accuracy by forming the entire magnetic head device in one piece at the same time by outsert molding or the like.

Also, in the present embodiment III-1, the sliding member 370 was substantially spherical, but the present invention III is not limited to this shape. For example, an elliptic surface or the like is also possible. However, the spherical surface seems to be sufficient as long as it causes no problem. In any case, when the sliding member 370 is substantially in point contact with the inner surface of the outer case 319, it is possible to stabilize the contact state and to reduce friction or noise during sliding.

Furthermore, by arranging a plurality of the sliding members 370 on the stopper portion 313a so as to make two or more points in contact with the outer case 319, for example, it also may be possible to stabilize the inclination of the fastening member 313 when contacting the inner surface of the outer case 319. Also, the sliding member 370 also can be formed as one component that is provided with many protrusions.

In addition, similar effects can be achieved by arranging the sliding member 370 on the part of the fastening member 313 other than the stopper portion 313a.

(Embodiment III-2)

Figure 47:
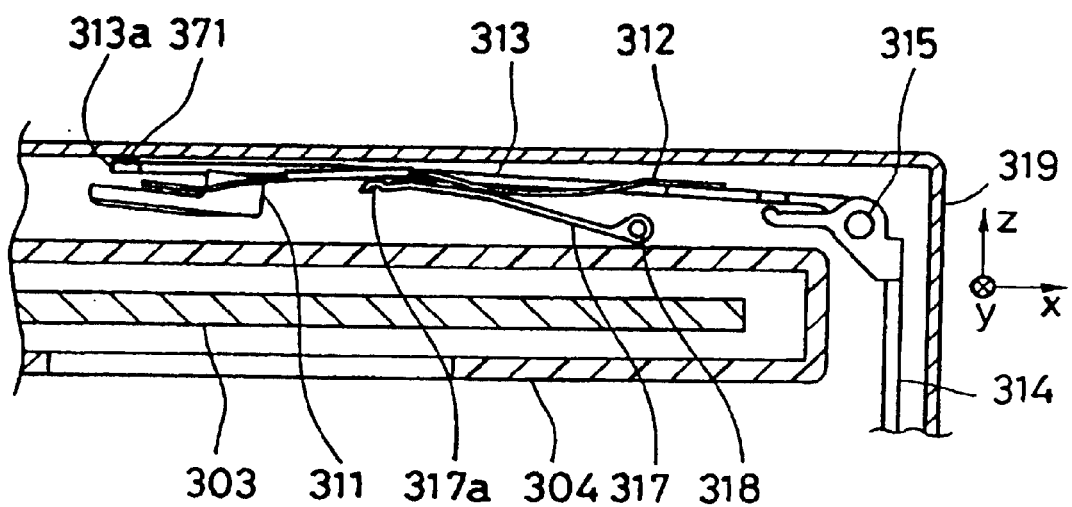
FIG. 47 is a sectional view showing a main portion of a recording/reproducing apparatus of an embodiment III-2 of the present invention III when a reproducing disk is installed.

FIG. 47 is a sectional view showing a main portion of a recording/reproducing apparatus in an embodiment III-2 of the present invention III. A rectangular coordinate system is defined in the directions shown in the figure, and the positive side of the z-axis is called the upper side, the negative side thereof is called the lower side, and the length in the direction parallel to the z-axis is called the height.

In FIG. 47, a reproducing disk 303, a reproducing cartridge 304, a magnetic head main body 311, a suspension 312, a fastening member 313, an angle member 314, a shaft 315, a lifter 317, a rotating pin 318 and an outer case 319 are the same as those in the embodiment III-1.

In the present embodiment III-2, a sliding member 371 is disposed on the inner surface of the outer case 319. The sliding member 371 is a substantially cylindrical member having a length covering a moving amount of the magnetic head main body 311 in a radial direction, and is disposed in parallel to a moving direction of the magnetic head main body 311. The sliding member 371 is made of resin material or the like having sliding characteristics, like the sliding member 370 in the embodiment III-1. As in the embodiment III-1, when the magnetic bead main body 311 is in an unloading state, the lifter 317 lifts the fastening member 313. At this time, the stopper portion 313a of the fastening member 313 is in contact with the sliding member 371 formed on the inner surface of the outer case 319., In the present embodiment III-2, therefore, the stopper portion 313a corresponds to the contacting portion in the present invention III.

Wherever in the radial direction of the reproducing disk 303 the magnetic head main body 311 moves, the contacting state does not change and change in sliding friction is slight in the unloading state, because the sliding member 371 has a length covering the moving amount of the magnetic head main body 311.

In accordance with the present embodiment III-2, it is possible to achieve thinner and lower-cost recording/reproducing apparatus as in the embodiment III-1. When the magnetic head device is too fragile in the step of providing the sliding member 370 with the magnetic head device as in the embodiment III-1, the present embodiment III-2 is more appropriate.

The sliding member 371 was arranged in the position in contact with the stopper portion 313a in the present embodiment III-2, but also can be arranged in the position in contact with the other part of the fastening member 313 or a member connected to the fastening member 313.

In addition, a shape maintaining an appropriate contacting relationship with the sliding member 371 also may be formed on the upper surface of the stopper portion 313a. For example, a cylindrical surface having a generating line parallel to the x-axis is formed integrally on the upper surface of the stopper portion 313a, or a member that is formed in a separate step and has such a cylindrical surface is attached thereto. Then, it becomes substantially in point contact with the sliding member 371 formed to have a cylindrical surface having a generating line parallel to the y-axis, thereby stabilizing the contact state. In addition, a shape that is provided with raised portions at the both ends of the cylindrical surface in the generating line direction may be given to each of the sliding member 371 and the stopper portion 313a that are formed to have cylindrical surfaces as-above. This is effective in preventing the sliding member 371 and the stopper portion 313a from being disengaged from each other.

In the above example, the sliding member 371 had the cylindrical surface. However, in the case where, for example, it is possible to form, a contacting portion having a spherical or elliptic surface as in the embodiment III-1 in a portion on the upper surface of the fastening member 313, the sliding member 371 also can be formed to have a flat plate shape, namely a tape-like shape because the sliding member 371 still will be substantially in point contact with the contacting portion.

(Embodiment III-3)

Figure 48:
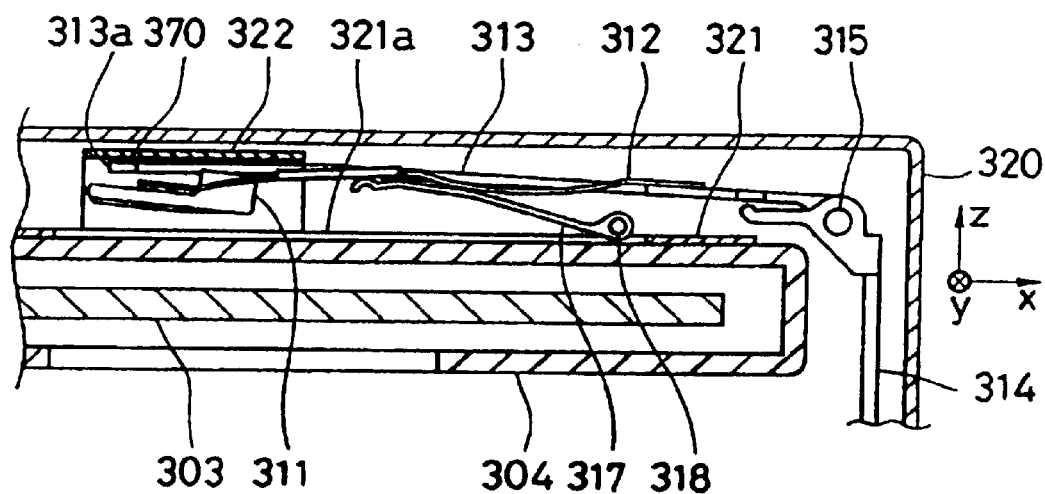
FIG. 48 is a sectional view showing a main portion of a recording/reproducing apparatus of an embodiment III-3 of the present invention III when a reproducing disk is installed.
Figure 49:
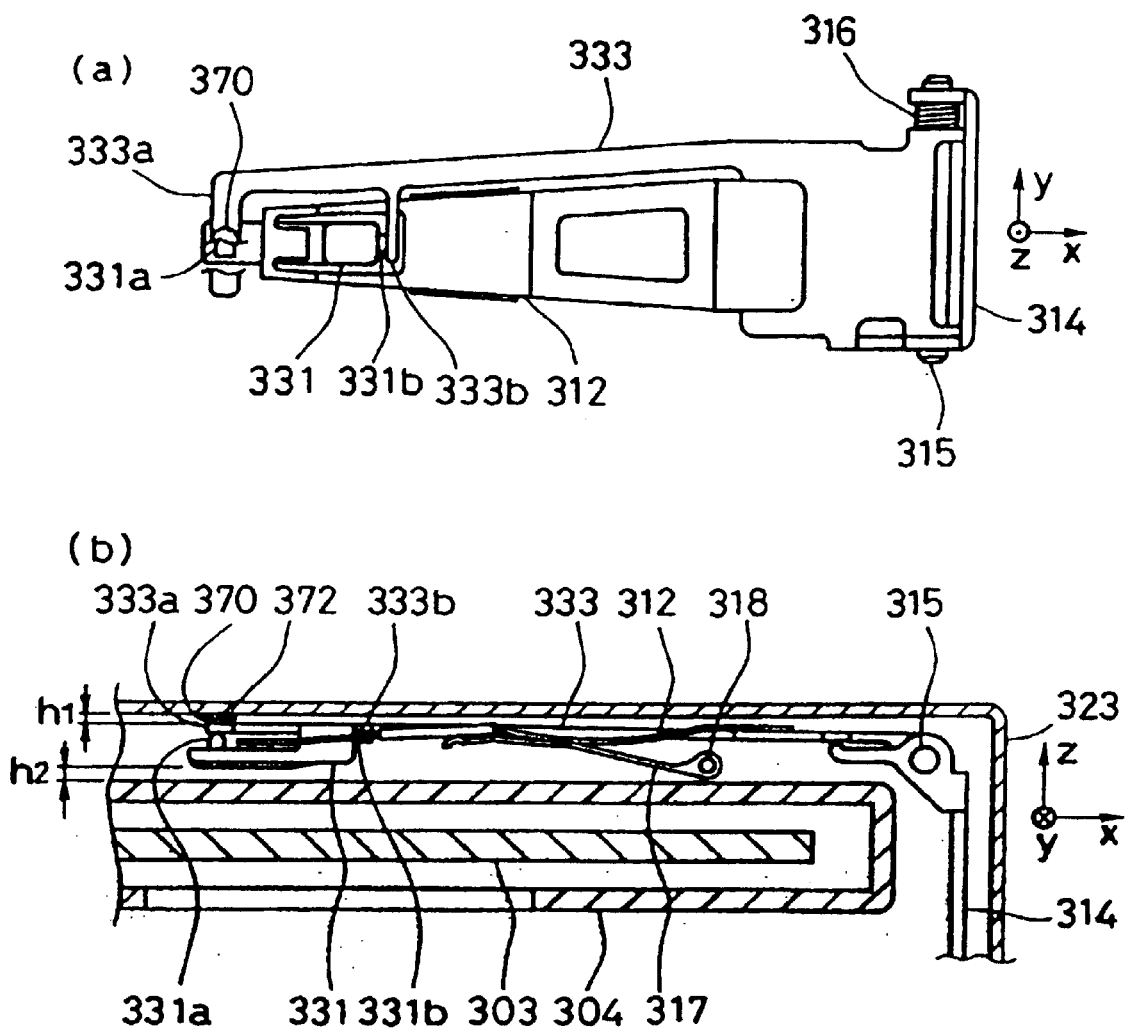
FIG. 49(a) is a plan view showing an entire structure of a magnetic head device of an embodiment III-4 of the present invention III.
FIG. 49(b) is a sectional view showing a main portion of a recording/reproducing apparatus of the embodiment III-4 when a reproducing disk is installed.

FIG. 48 is a sectional view showing a main portion of a recording/reproducing apparatus in an embodiment III-3 of the present invention III. A rectangular coordinate system is defined in the directions shown in the figure, and the positive side of the z-axis is called the upper side, the negative side thereof is called the lower side, and the length in the direction parallel to the z-axis is called the height.

In FIG. 48, a reproducing disk 303, a reproducing cartridge 304, a magnetic head main body 311, a suspension 312, a fastening member 313, an angle member 314, a shaft 315, a lifter 317, a rotating pin 318 and a sliding member 370 are the same as those in the embodiment III-1. An outer case 320 functions in the same manner as an outer case 319 of the embodiment III-1.

Numeral 321 denotes a cartridge holder, which is a part of a mechanism holding the reproducing cartridge 304, and only a plate-like structure above the reproducing cartridge 304 is shown here. The cartridge holder 321 is provided with an opening 321a for arranging the magnetic head main body 311 therein, so that a recording disk also can be mounted into the cartridge holder 321.

A magnetic head main body cover 322 as a fixed structure that is formed by bending a plate-like member is fastened to the upper surface of the cartridge holder 321. A part of the magnetic head main body cover 322 is located between the outer case 320 and the fastening member 313, and above the magnetic head main body 311. The magnetic head main body cover 322 has a length in the y-axis direction that can cover at least a moving range of the magnetic head device in the y-axis direction.

The following is a description of the operation in the embodiment III-3 configured as above.

As in the embodiment III-1, when the magnetic head main body 311 comes to an unloading state because of the rotating force of the lifter 317, the sliding member 370 that is arranged on the upper surface of a stopper portion 313a of the fastening member 313 contacts the lower surface of the magnetic head main body cover 322. Under this state, when the magnetic head main body 311 moves in a radial direction, the sliding member 370 slides on the lower surface of the magnetic head main body cover 322. However, the sliding member 370 does not impose load against the move, nor does it generate noise, as mentioned in the embodiment III-1.

In the embodiments III-1 and III-2, since the fastening member 313 was in direct contact with the inner surface of the outer case 319 via the sliding member 370 etc., a mechanical disturbance to the outer case 319 was transmitted to the fastening member 313 directly. On the other hand, in the present embodiment III-3, the fastening member 313 and the outer case 320 are not in direct contact with each other, thus achieving a form more resistant to the disturbance.

Although the magnetic head main body cover 322 was connected to the cartridge holder 321 in the present embodiment III-3, it may be connected to anywhere as long as it does not contact the outer case directly. For example, it also may be possible to fasten the magnetic head main body cover 322 to a so-called chassis (a structure that supports an optomagnetic head device and a spindle motor for supporting and rotating a disk).

In a usual design of equipment that is subjected to an external vibration, a vibration absorbing mechanism such as a damper is placed between the outer case and an internal structure such as a chassis, thereby reducing the mechanical disturbance to the internal structure. In such apparatus, the magnetic head main body cover 322 can be fastened to an internal system that is supported by the vibration absorbing mechanism, thereby achieving a structure in which the influences of the disturbance are unlikely to be transmitted to the fastening member 313. It is especially preferable that the magnetic head main body cover 322 is arranged where it is possible to maintain the highest accuracy within such a range.

(Embodiment III-4)

FIGS. 49(a) and (b) show a recording/reproducing apparatus in an embodiment III-4 of the present invention III. FIG. 49(a) is a plan view showing an entire structure of a magnetic head device, and FIG. 49(b) is a sectional view showing a main portion of the recording/reproducing apparatus when the reproducing disk is installed. A rectangular coordinate system is defined in the directions shown in the figure, and the positive side of the z-axis is called the upper side, the negative side thereof is called the lower side, and the length in the direction parallel to the z-axis is called the height. FIG. 49(a) shows the state in which a part of a stopper portion 333a is cut out so that a structure of a magnetic head main body 331 hidden under the stopper portion 333a can be indicated.

In FIGS. 49(a) and (b), a reproducing disk 303, a reproducing cartridge 304, a suspension 312, an angle member 314, a shaft 315, a coil spring 316, a lifter 317, a rotating pin 318 and a sliding member 370 are the same as those in the embodiment III-1. An outer case 323 functions in the same manner as an outer case 319 of the embodiment III-1.

A fastening member 333 has substantially the same form including the stopper portion 333a as that of the fastening member 313 of the embodiment III-1, but is different from the fastening member 313 of the embodiment III-1 in that a magnetic head main body contacting portion 333b is formed. The magnetic head main body contacting portion 333b is formed in the mid-way position of an arm-like portion of the fastening member 333 so as to protrude in the y-axis direction.

The magnetic head main body 331 has substantially the same function and shape as those of the magnetic head main body 311 of the embodiment III-1, but is different from the magnetic head main body 311 of the embodiment III-1 in that the magnetic head main body 331 here has a first protrusion 331a protruding in a positive direction of the z-axis near the end portion of a negative direction of the x-axis and a second protrusion 331b protruding in a positive direction of the x-axis at the end portion of a positive direction of the x-axis. These protrusions function as contacting regions that contact the fastening member 333.

The upper surfaces of the first protrusion 331a and the second protrusion 331b are formed in a position lower than the highest part of the magnetic head main body 331 by the thickness of the fastening member 333 when the surface of the magnetic head main body 331 opposing to the disk is placed along the horizontal direction. When the magnetic head main body 331 is in an unloading state, the first protrusion 331a and the second protrusion 331b contact the lower surface of the stopper portion 333a and the lower surface of the magnetic head main body contacting portion 333b respectively.

A sliding tape 372 is attached to the position of the inner surface of the outer case 323 that contacts the sliding portion 370 when the magnetic head main body is in the unloading state. The sliding tape 372 is, for example, a belt-like tape that is coated with fluorocarbon material or the like on its surface, and slides well on the sliding member 370. The sliding tape, 372 has a length covering a moving amount of the magnetic head main body 331 in a radial direction, and is arranged parallel to the moving direction of the magnetic head main body 331.

The following is a description of the operation in the embodiment III-4 configured as above.

As in the embodiment III-1, when the magnetic head main body 331 comes to an unloading state because of the rotating force of the lifter 317, the sliding member 370 that is arranged on the upper surface of the stopper portion 333a of the fastening member 333 contacts the sliding tape 372 attached to the inner surface of the outer case 323. Under this state, when the magnetic head main body 331 moves in the radial direction, the sliding member 370 slides on the sliding tape 372. Therefore, the frictional force becomes still smaller than that in the embodiment III-1.

Also, since the sliding tape 372 is very thin, a distance h1 between the fastening member 333 and the inner surface of the outer case 323 substantially equals that in the embodiment III-1, and can be shortened considerably compared with the conventional example.

In addition, the magnetic head main body 331 is lifted via the suspension 312 by the rotating force of the lifter 317 in the unloading state, so that the suspension 312 is deformed elastically. Then, the upper surfaces of the first protrusion 331a and the second protrusion 331b of the magnetic head main body 331 are pressed against the lower surfaces of the stopper portion 333a and the magnetic head main body contacting portion 333b of the fastening member 333 respectively. Since the upper surfaces of the first protrusion 331a and the second protrusion 331b are located in the position lower than the highest part of the magnetic head main body 331 by the thickness of the fastening member 333, the surface of the magnetic head main body 331 opposing to the disk 303 is held substantially parallel to the disk surface. As a result, in the unloading state, the magnetic head main body 331 is held pressed against the fastening member 333 in such a way that the thickness of the magnetic head main body 331 in the z-axis direction measured from the fastening member 333 is substantially the shortest.

Accordingly, the distance in the z-axis direction that the magnetic head main body 331 extends can be made shorter than that of the conventional example. Also, there is substantially no positional change of the magnetic head main body 331 in the z-axis direction, thereby reducing a distance h2 between the reproducing cartridge 304 and the magnetic head main body 331 considerably. Specifically, the value of the distance h2 that was about 1 to 1.5 mm conventionally can be made about 0.3 to 0.5 mm.

In the embodiment III-4, mechanical accuracy is required in the parts such as the thickness of the sliding member 370, the thickness of the sliding tape 372, the heights of the first protrusion 331a and the second protrusion 331b and the thickness of the fastening member 333. It is very easy to maintain and control the accuracy of these parts. Consequently, the cost can be lowered considerably compared with the conventional maintenance and control of the mechanical accuracy.

In the present embodiment III-4, a coating can be applied directly to the outer case 323 instead of providing the sliding tape 372. Furthermore, by using the magnetic head main body cover 322 described in the embodiment III-3, it is possible to improve the stability against disturbance.

Also, the two protrusions 331a and 331b were disposed on the magnetic head main body 331 as contacting regions with the fastening member 333. However, for example, three protrusions may be disposed so that the magnetic head main body 331 can be fastened to the fastening member 333 in a more stable manner, thereby further reducing the distance h2.

In addition, the two protrusions 331a and 331b were disposed such that the surface of the magnetic head main body 331 opposing to the disk is substantially in parallel to the reproducing disk 303. However, the protrusions 331a and 331b may be disposed so that the magnetic head main body 331 in the unloading state is held inclined with respect to the disk surface, when the stress applied to the suspension 312 for maintaining the parallel state is too large. In this case, although the reducing amount of the distance in the z-axis direction that the magnetic head main body 331 extends and the distance h2 is a little smaller, it is possible to obtain a certain effect of maintaining the positional stability of the magnetic head main body 331.

In the above embodiments III-1 to III-4, MDs were discussed as an example of recording/reproducing apparatus, but the present invention III is not limited to those and can be applied to all the recording/reproducing apparatus that necessitates the operation in the unloading state of the converter.

The inventions I to III may be embodied in other specific forms without departing from the spirit or essential characteristics thereof. The embodiments disclosed in this application are to be considered in all respects as illustrative and not restrictive, the scopes of the inventions I to III being indicated by the appended claims rather than by the foregoing description, all changes that come within the meaning and range of equivalency of the claims are intended to be embraced therein.

What is claimed is:

1. A magnetic head device comprising:
    a suspension that is cantilevered and provided with an elastic portion; and
    a head main body that glides in contact over or floats while keeping a substantially constant distance from an information recording medium, and is supported at a free end of the suspension;
    wherein at least two first holding portions protruding substantially in parallel to a recording surface of the information recording medium and toward a fastened end of the suspension are provided on the head main body so as to be spaced away in a direction substantially perpendicular to the recording surface,
    a second holding portion protruding substantially in parallel to the recording surface of the information recording medium toward the head main body is provided near the free end of the suspension and beyond the head main body on a side of the fastened end,
    the second holding portion is arranged between the at least two first holding portions, and
    the first holding portions and the second holding portion are able to contact each other when the head main body is displaced in at least one direction because of an elastic deformation of the suspension.

2. The magnetic head device according to claim 1, wherein at least one of the first holding portions that is located closest to the information recording medium is formed integrally with a slider of the magnetic head main body.

3. The magnetic head device according to claim 1, wherein the first holding portion and the second holding portion both have a flat plate shape.

4. The magnetic head device according to claim 1, Wherein one of the first holding portion and the second holding portion has a protruding portion, the other has a through hole, and the protruding portion is inserted in the through hole when the head main body is displaced in at least one direction.

5. The magnetic head device according to claim 1, wherein one of the first holding portion and the second holding portion has a through hole, the other has a first protruding portion that passes through the through hole with clearance and a second convex portion that is formed at a front end of the first protruding portion, and the second protruding portion contacts the one holding portion when the head main body is displaced in at least one direction.

6. The magnetic head device according to claim 1, wherein the second holding portion is made of a same material as the suspension and formed integrally with the suspension.

7. The magnetic head device according to claim 1, wherein the suspension comprises;
    a first elastic portion that is supported by a fastened end,
    an intermediary portion that is supported by the first elastic portion and has a rigid body portion made of resin, and
    a second elastic portion that is supported by the intermediary portion, wherein the second holding portion and the rigid body portion are formed in one piece by molding resin.

8. The magnetic head device according to claim 1, wherein the second holding portion is made of resin and integrated with the suspension.

9. The magnetic head device according to claim 1, wherein the first holding portion and the head main body are formed in one piece.

* * * * *

UNITED STATES PATENT AND TRADEMARK OFFICE
CERTIFICATE OF CORRECTION

PATENT NO. : 6,847,591 B1
APPLICATION NO. : 09/673919
DATED : January 25, 2005
INVENTOR(S) : Murakami et al.

It is certified that error appears in the above-identified patent and that said Letters Patent is hereby corrected as shown below:

On the Title Page, Item (75) Inventors: inventor --Hisayuki Enshu, Kyoto (JP)-- should have been included.
Column 34, line 31 (claim 4): "Wherein one" should read --wherein one--.

Signed and Sealed this

Twenty-seventh Day of November, 2007

JON W. DUDAS
*Director of the United States Patent and Trademark Office*